United States Patent
Fukushima et al.

(10) Patent No.: US 12,517,990 B2
(45) Date of Patent: Jan. 6, 2026

(54) AUTHENTICATION SYSTEM, AUTHENTICATION METHOD AND PROGRAM

(71) Applicant: Rakuten Group, Inc., Tokyo (JP)

(72) Inventors: Sachiko Fukushima, Tokyo (JP); Yeongnam Chae, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/911,764

(22) PCT Filed: Jun. 21, 2021

(86) PCT No.: PCT/JP2021/023394
§ 371 (c)(1),
(2) Date: Sep. 15, 2022

(87) PCT Pub. No.: WO2022/269681
PCT Pub. Date: Dec. 29, 2022

(65) Prior Publication Data
US 2024/0126850 A1   Apr. 18, 2024

(51) Int. Cl.
*G06F 21/32* (2013.01)
*G06Q 10/02* (2012.01)

(52) U.S. Cl.
CPC ............. *G06F 21/32* (2013.01); *G06Q 10/02* (2013.01)

(58) Field of Classification Search
CPC .......... G06F 21/32; G06F 21/31; G06Q 10/02
See application file for complete search history.

(56) References Cited

U.S. PATENT DOCUMENTS

| 10,735,411 | B1* | 8/2020 | Hardt | G01S 5/0269 |
| 11,405,189 | B1* | 8/2022 | Bennison | H04L 63/0807 |
| 11,514,155 | B1* | 11/2022 | Bordow | H04W 12/06 |
| 12,067,822 | B2* | 8/2024 | Inoue | G07C 9/38 |
| 12,205,453 | B1* | 1/2025 | Magaletta | H04B 1/3827 |
| 2003/0233573 | A1* | 12/2003 | Phinney | H04L 63/20 726/14 |

(Continued)

FOREIGN PATENT DOCUMENTS

JP   2004-227134 A   8/2004
JP   2008-176493 A   7/2008

(Continued)

OTHER PUBLICATIONS

International Search Report for PCT/JP2021/023394, dated Aug. 17, 2021.

(Continued)

*Primary Examiner* — Michael Won
(74) *Attorney, Agent, or Firm* — Sughrue Mion, PLLC

(57) ABSTRACT

An authentication system, comprising at least one processor configured to: execute first authentication for a first user when the first user is present at or arrives at a first place; determine whether a second user who has a possibility of being authenticated as the first user by the first authentication is present at the first place, or whether the second user has arrived at the first place; and execute, when it is determined that the second user is not present at or has not arrived at the first place, first processing for the first user based on the first authentication.

16 Claims, 26 Drawing Sheets

(56) References Cited

U.S. PATENT DOCUMENTS

| | | | |
|---|---|---|---|
| 2006/0042483 A1* | 3/2006 | Work | H04L 67/306 101/91 |
| 2007/0186106 A1* | 8/2007 | Ting | H04L 63/0815 713/168 |
| 2007/0250920 A1* | 10/2007 | Lindsay | G06F 21/31 726/7 |
| 2010/0306099 A1* | 12/2010 | Hirson | H04L 67/535 455/414.1 |
| 2011/0135168 A1 | 6/2011 | Hosoi | |
| 2013/0191878 A1* | 7/2013 | Mani | G06F 21/31 726/1 |
| 2013/0231954 A1* | 9/2013 | Bryant | G06F 21/40 705/3 |
| 2014/0157381 A1* | 6/2014 | Disraeli | H04L 63/0853 726/7 |
| 2015/0112880 A1* | 4/2015 | Blaylock, IV | H04L 63/102 726/4 |
| 2016/0055327 A1* | 2/2016 | Moran | G06F 21/32 726/19 |
| 2016/0308859 A1* | 10/2016 | Barry | G07C 9/22 |
| 2016/0364716 A1* | 12/2016 | Bakshi | G06Q 20/3224 |
| 2017/0116588 A1* | 4/2017 | Conant | G06Q 20/4016 |
| 2017/0124362 A1 | 5/2017 | Sheng et al. | |
| 2017/0185761 A1* | 6/2017 | Stanwood | G06V 40/1365 |
| 2019/0172279 A1 | 6/2019 | Al-Shaikh et al. | |
| 2020/0143022 A1 | 5/2020 | Frost et al. | |
| 2020/0202110 A1 | 6/2020 | Koichi et al. | |
| 2020/0372743 A1 | 11/2020 | Miller et al. | |
| 2020/0399929 A1* | 12/2020 | Hardter | G07C 9/27 |
| 2021/0264006 A1* | 8/2021 | VanBlon | G06F 21/45 |
| 2022/0027443 A1 | 1/2022 | Chae | |
| 2022/0172202 A1* | 6/2022 | Wedmore | G07F 19/20 |
| 2023/0090508 A1* | 3/2023 | Yoo | G06Q 20/38 713/186 |
| 2023/0259727 A1* | 8/2023 | Lee | G06Q 10/00 235/382 |

FOREIGN PATENT DOCUMENTS

| | | |
|---|---|---|
| JP | 2009-093512 A | 4/2009 |
| JP | 6409929 B1 | 10/2018 |
| JP | 2019-067075 A | 4/2019 |
| WO | 2010/103736 A1 | 9/2010 |
| WO | 2020/208745 A1 | 10/2020 |

OTHER PUBLICATIONS

International Search Report for PCT/JP2021/023395, dated Aug. 17, 2021.

International Search Report for PCT/JP2021/023396, dated Aug. 17, 2021.

United States Office Action dated Dec. 19, 2024 in U.S. Appl. No. 17/911,768.

US Office Action dated Nov. 4, 2025, issued in U.S. Appl. No. 17/911,768.

\* cited by examiner

| USER ID | PASSWORD | CODE ID | EXPIRATION TIME | FULL NAME | FACE IMAGE | FACIAL FEATURE AMOUNT | PASSCODE | OTHER USERS HAVING SIMILAR FACIAL FEATURES |
|---|---|---|---|---|---|---|---|---|
| taro.yamada123 | ******** | 1382 0415 8913 4321 | 2021/6/10 11:42:15 | TARO YAMADA | 00001.jpg | FEATURE AMOUNT1 | **** | yoshida111jiro |
| yoshida111jiro | ********** | 7514 9413 0126 6342 | 2021/6/10 11:50:00 | JIRO YOSHIDA | 00002.jpg | FEATURE AMOUNT2 | **** | taro.yamada123 |
| hanako999 | ****** | 2521 3921 1542 9916 | 2021/6/10 10:14:43 | HANAKO ITO | 00003.jpg | FEATURE AMOUNT3 | **** | — |
| : | : | : | : | : | : | : | : | : |

| USER ID | CHECK-IN DATE/TIME | PASSCODE AUTHENTICATION FLAG | FACIAL FEATURE AMOUNT | PASSCODE |
|---|---|---|---|---|
| taro.yamada123 | 2021/6/10 11:30:25 | 1 | FEATURE AMOUNT1 | **** |
| yoshida111jiro | 2021/6/10 11:35:41 | 1 | FEATURE AMOUNT2 | **** |
| hanako999 | 2021/6/10 09:21:00 | 0 | FEATURE AMOUNT3 | - |
| ... | ... | ... | ... | ... |

FIG.11

| PLACE ID | USER ID | CHECK-IN DATE/TIME | PREDICTED PERIOD | FACIAL FEATURE AMOUNT |
|---|---|---|---|---|
| p00001 | taro.yamada123<br>.<br>.<br>. | 2021/6/10 11:30:25<br>.<br>.<br>. | 2021/6/10 13:00:41<br>.<br>.<br>. | FEATURE AMOUNT1<br>.<br>.<br>. |
| p00002 | yoshida111jiro<br>.<br>.<br>. | 2021/6/10 12:00:41<br>.<br>.<br>. | 2021/6/10 12:30:25<br>.<br>.<br>. | FEATURE AMOUNT2<br>.<br>.<br>. |

DB2

FIG.13
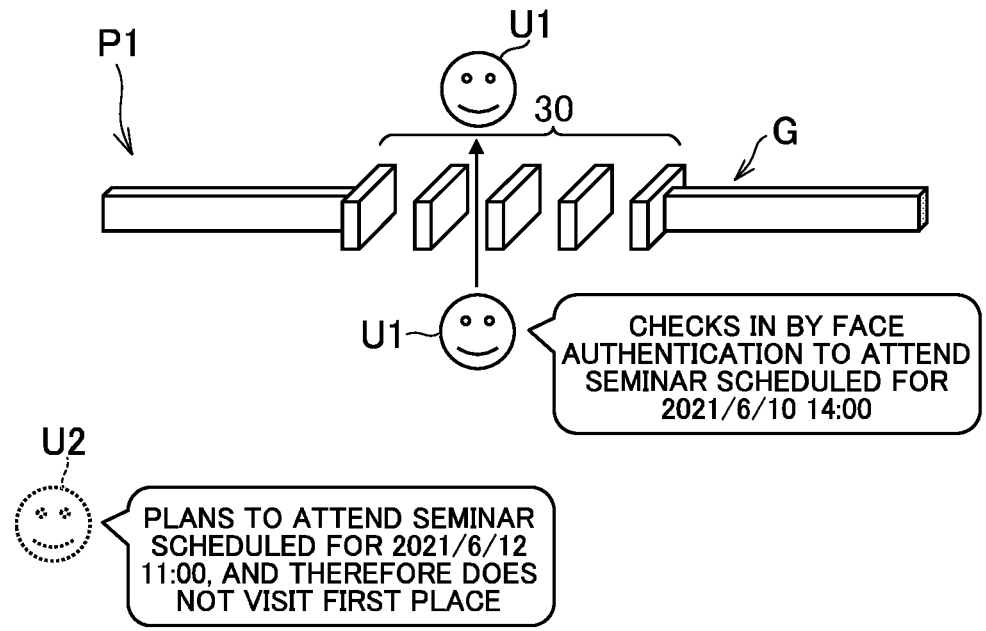
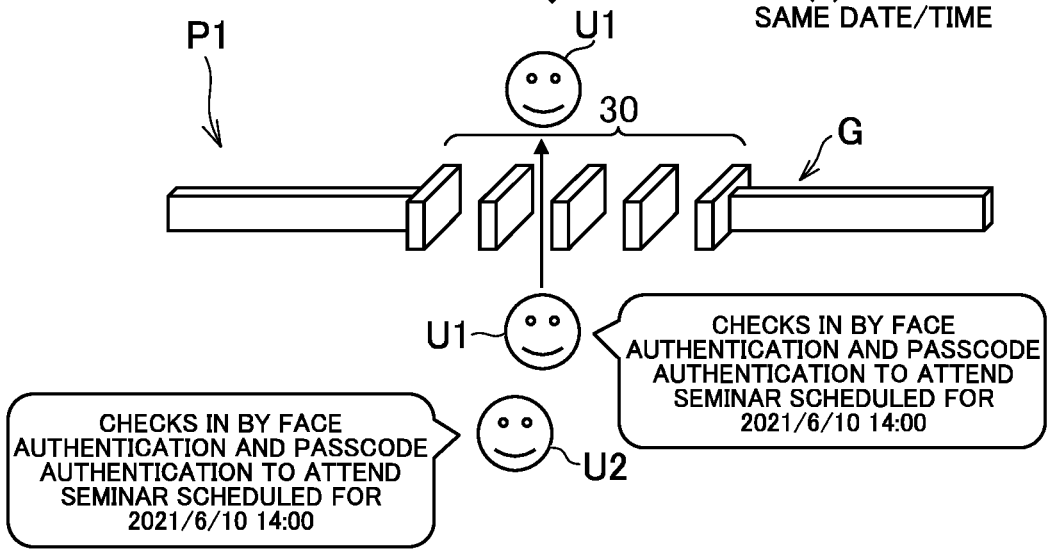

| SCHEDULED DATE OR SCHEDULED DATE/TIME | USER ID | FULL NAME | PASSCODE AUTHENTICATION FLAG | FACIAL FEATURE AMOUNT | PASSCODE |
|---|---|---|---|---|---|
| 2021/6/10 14:00:00 | taro.yamada123 | TARO YAMADA | 1 | FEATURE AMOUNT1 | **** |
| 2021/6/10 14:00:00 | yoshida111jiro | JIRO YOSHIDA | 1 | FEATURE AMOUNT2 | **** |
| 2021/6/10 14:00:00 | hanako999 | HANAKO ITO | 0 | FEATURE AMOUNT3 | - |
| ... | ... | ... | ... | ... | ... |

FIG.18
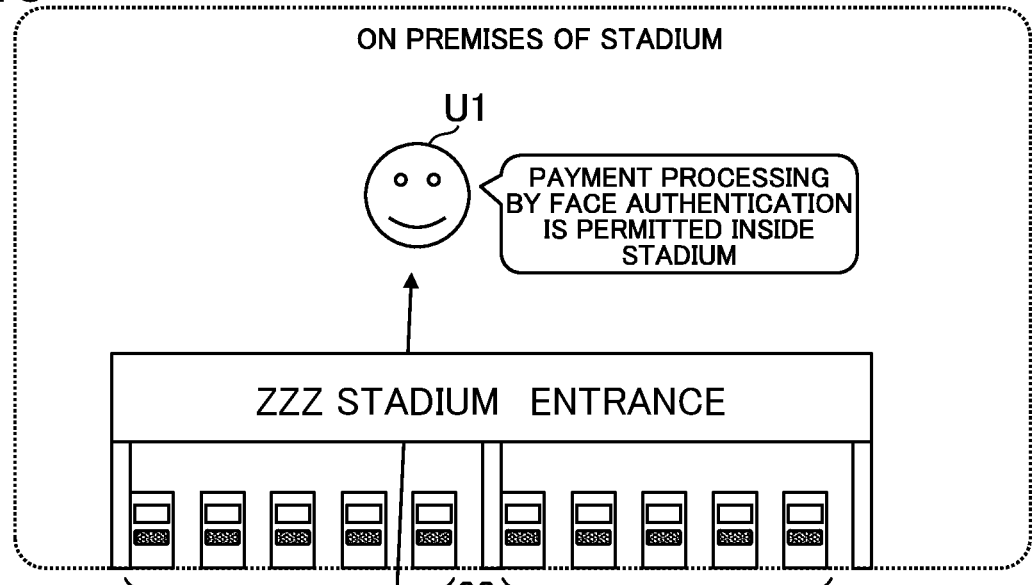
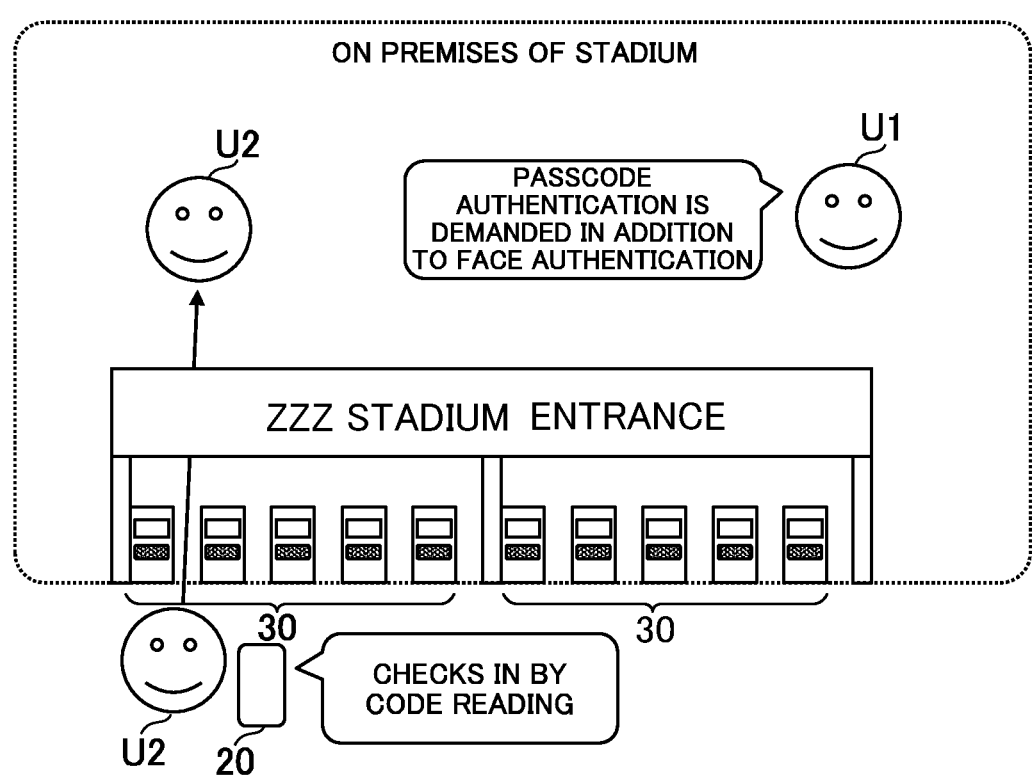

FIG. 19
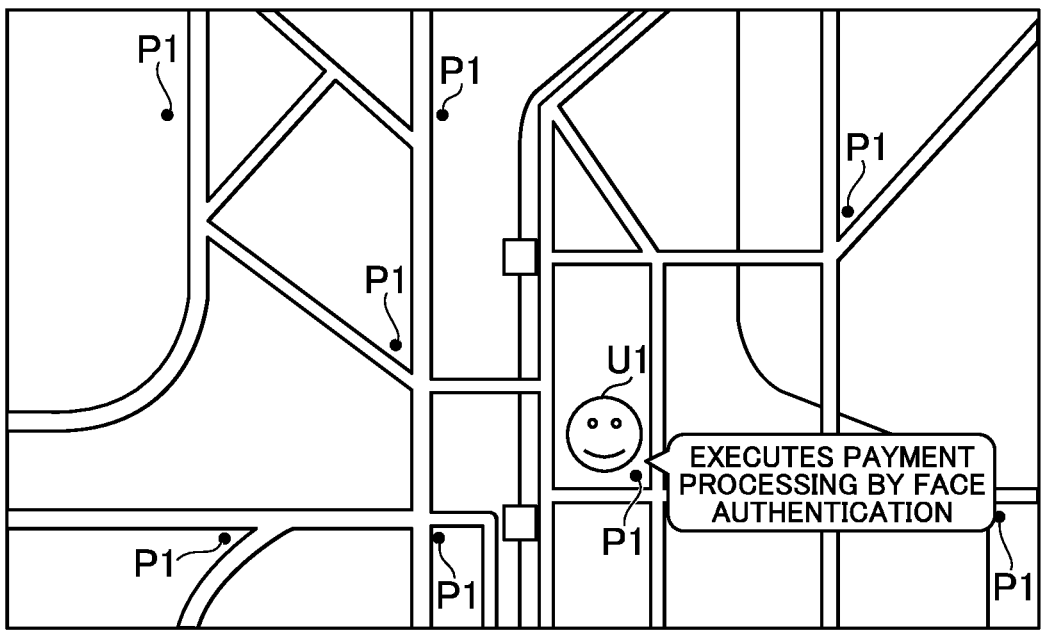
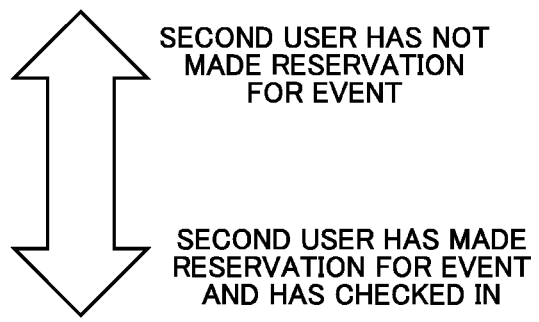
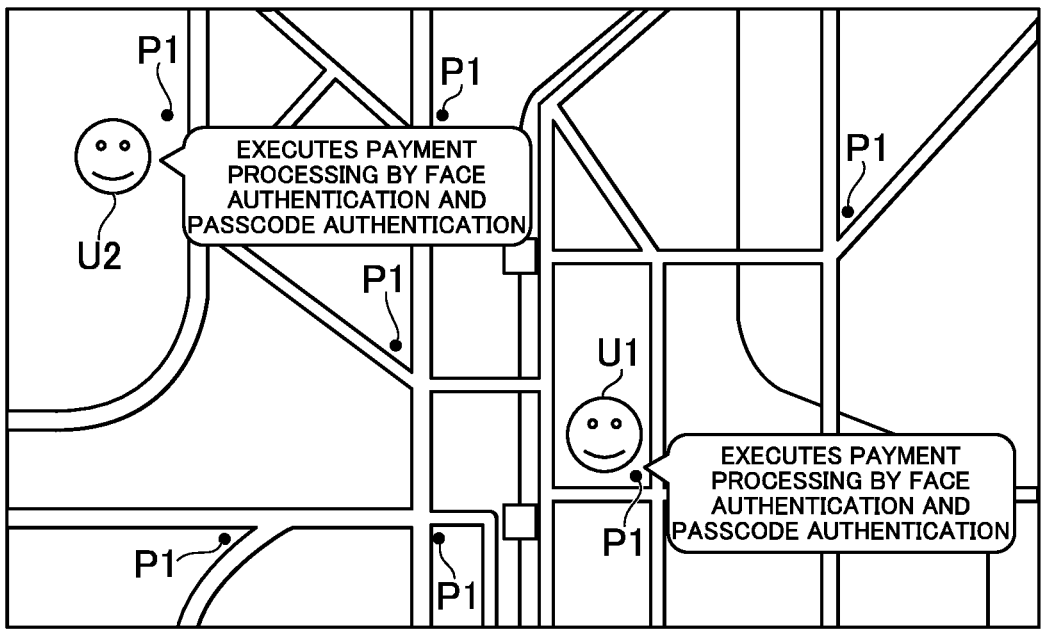

FIG.22
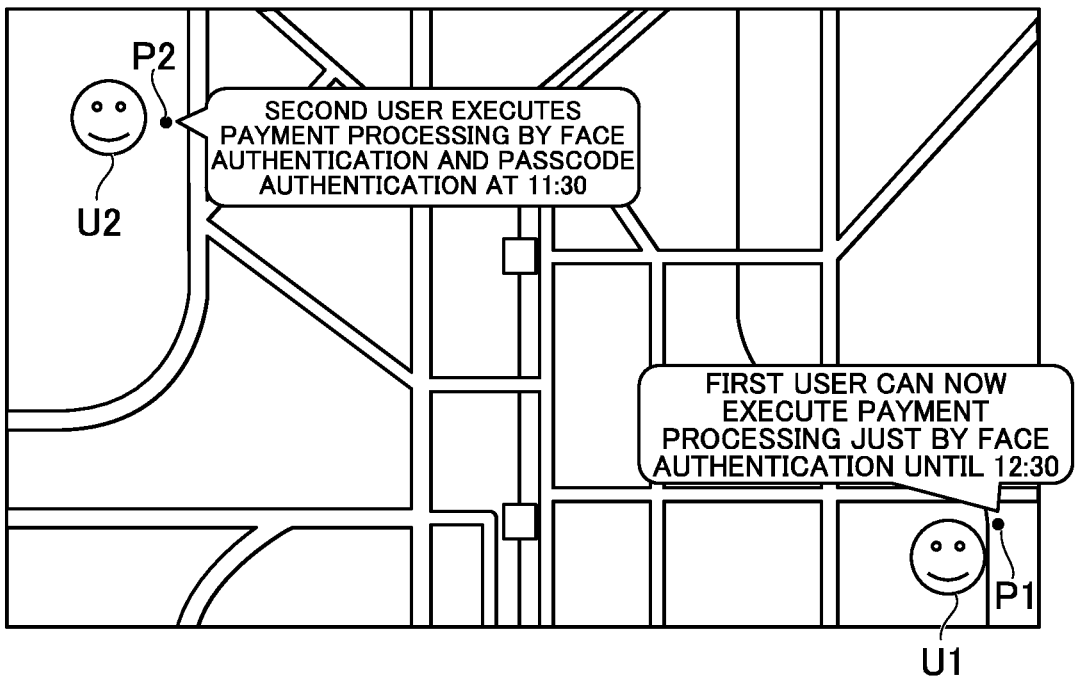
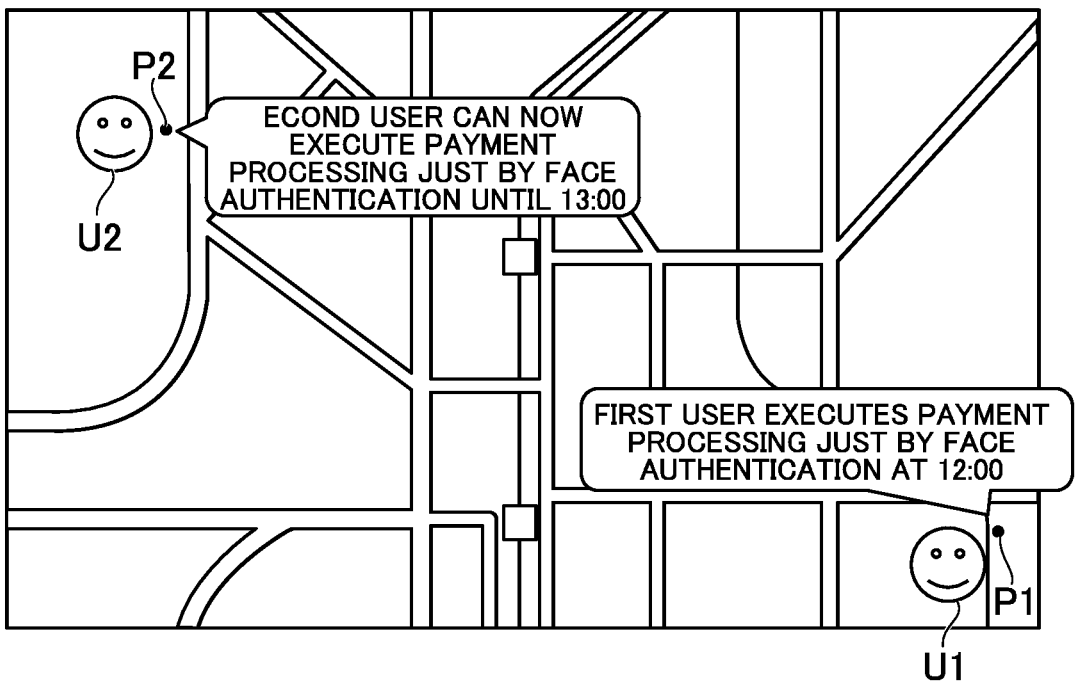

FIG.23
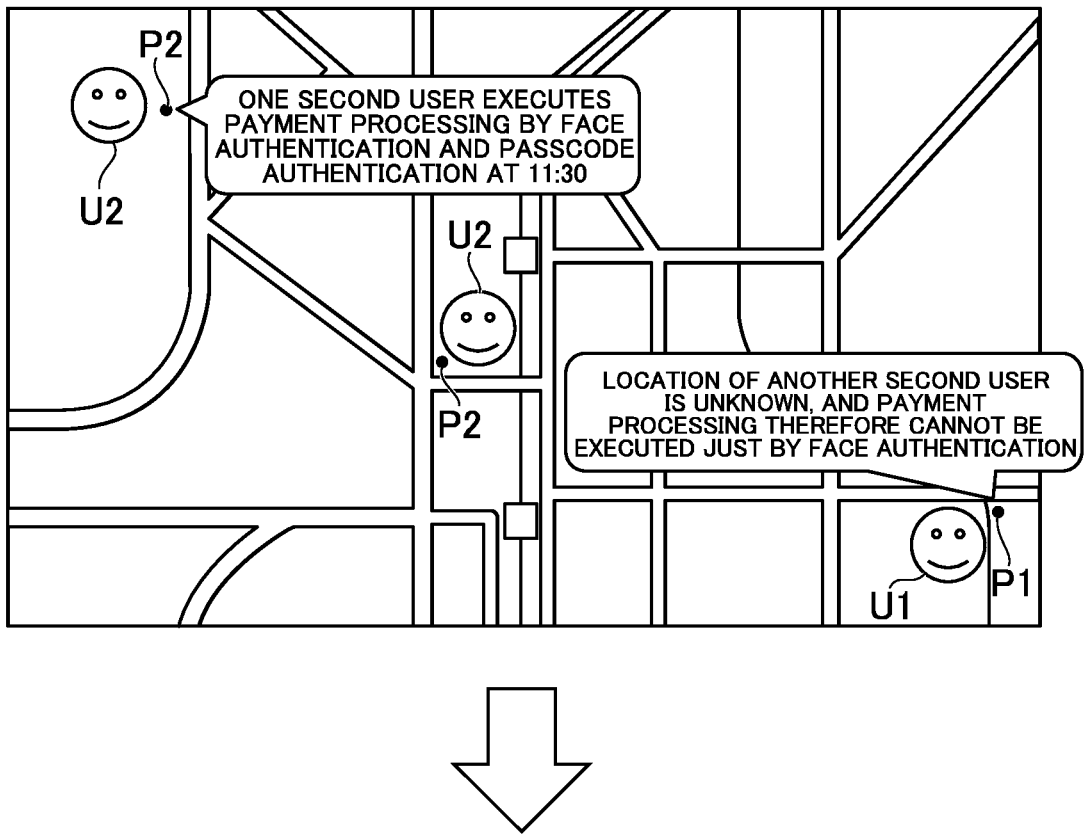
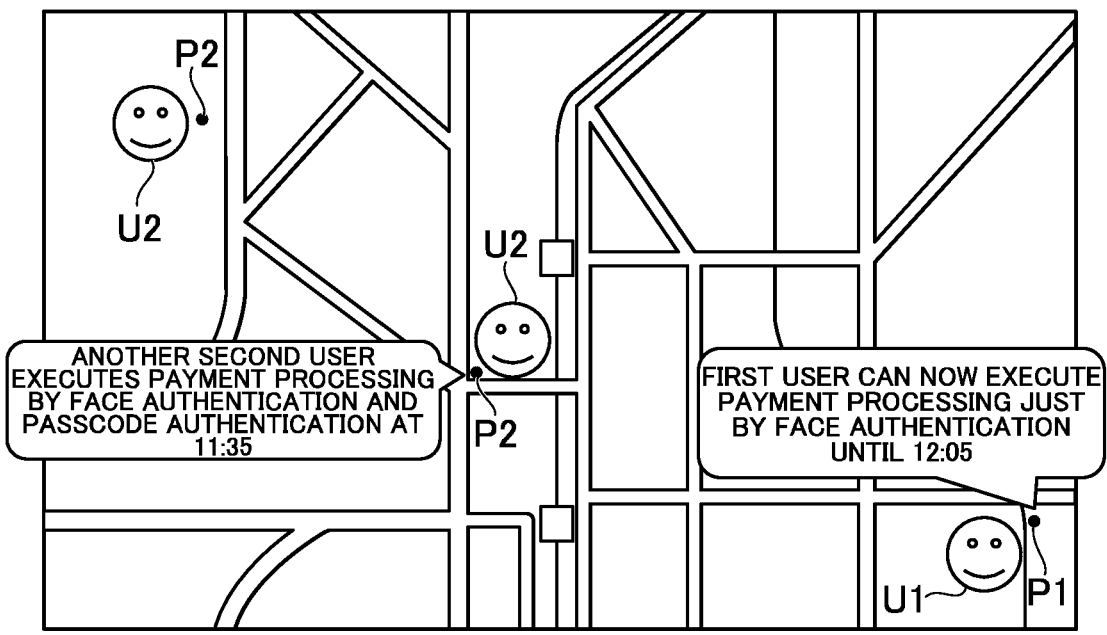

FIG.26
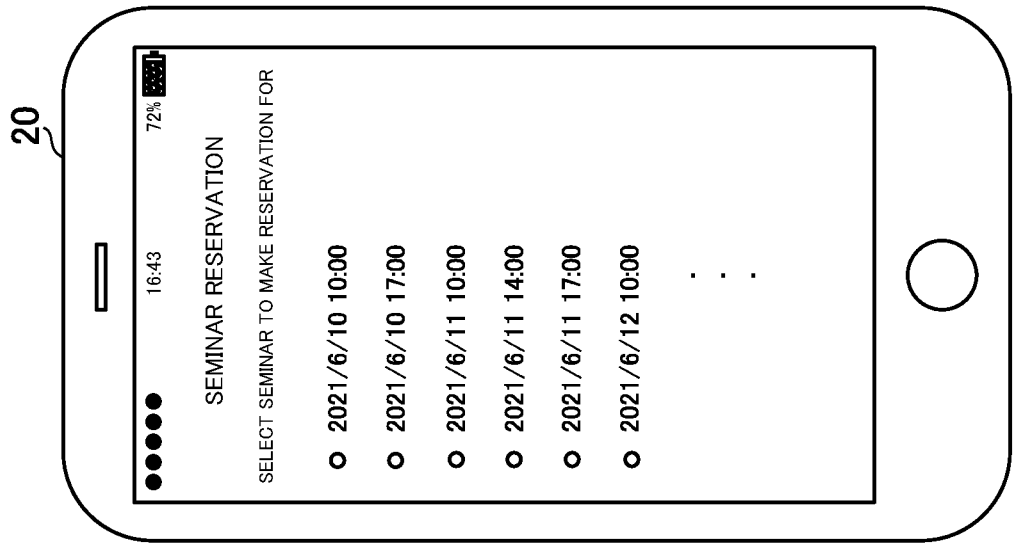
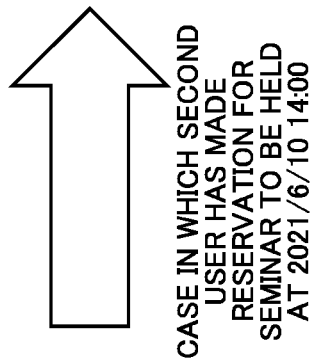
CASE IN WHICH SECOND USER HAS MADE RESERVATION FOR SEMINAR TO BE HELD AT 2021/6/10 14:00
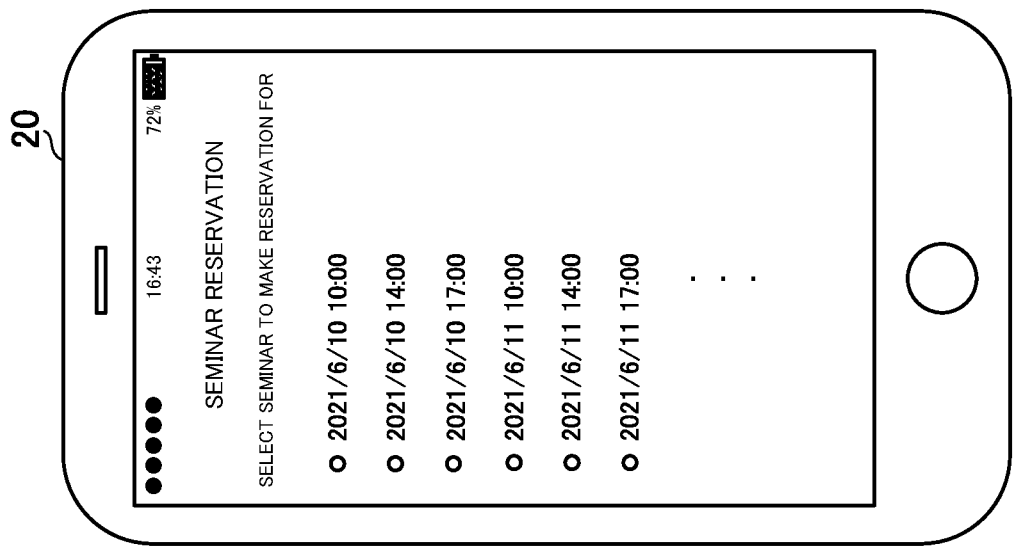

AUTHENTICATION SYSTEM, AUTHENTICATION METHOD AND PROGRAM

CROSS REFERENCE TO RELATED APPLICATIONS

This application is a National Stage of International Application No. PCT/JP2021/023394 filed Jun. 21, 2021.

TECHNICAL FIELD

The present disclosure relates to an authentication system, an authentication method, and a program.

BACKGROUND ART

Hitherto, there have been known various authentication technologies including biometric authentication and passcode authentication. For example, in Patent Literature 1, there is described a system which stores, in a storage unit, user's biometric information input from a terminal in a facility and executes biometric authentication with the use of the biometric information when the user uses a service in the facility. To give another example, in Patent Literature 2, there is described a system with which, when a user checks in to a facility with the use of his or her own terminal, biometric authentication using user's biometric information is enabled in the facility.

CITATION LIST

Patent Literature

[PTL 1] JP 2004-227134 A
[PTL 2] JP 2019-067075 A

SUMMARY OF INVENTION

Technical Problem

With the technologies as described in Patent Literature 1 and Patent Literature 2, however, impersonation is possible when a plurality of users whose biometric information resembles one another (for example, a plurality of users who have similar facial features) are present in the same facility. For example, when biometric information of User A and biometric information of User B are similar to each other and User A and User B are present in the same facility, User A may be authenticated as User B. An opposite case in which User B is authenticated as User A is also a possibility. The technologies as described in Patent Literature 1 and Patent Literature 2 thus unintentionally allow a third party with malicious intent to impersonate, and are accordingly insufficient in terms of security. This is true also for a case of using the technologies as described in Patent Literature 1 and Patent Literature 2 for authentication other than biometric authentication. The technologies of the related art are insufficient in terms of security.

One of objects of the present disclosure is to enhance security.

Solution to Problem

According to one aspect of the present disclosure, there is provided an authentication system including: first authentication means for executing first authentication for a first user when the first user is present at or arrives at a first place; second-user determination means for determining whether a second user who has a possibility of being authenticated as the first user by the first authentication is present at the first place, or whether the second user has arrived at the first place; and processing execution means for executing, when it is determined that the second user is not present at or has not arrived at the first place, first processing for the first user based on the first authentication.

Advantageous Effects of Invention

According to the present disclosure, the security is enhanced.

BRIEF DESCRIPTION OF DRAWINGS

FIG. 5 is a table for showing a data storage example of a user database.
FIG. 6 is a table for showing a data storage example of a check-in database.
FIG. 11 is a table for showing a data storage example of a check-in database in the second embodiment.
FIG. 13 is a diagram for illustrating an example of an authentication system of a third embodiment of the present disclosure.
FIG. 15 is a table for showing a data storage example of a schedule information database.
FIG. 18 is a diagram for illustrating an example of an authentication system of Modification Example 1-1.
FIG. 19 is a diagram for illustrating another example of the authentication system of Modification Example 1-1.

FIG. 22 is a diagram for illustrating an example of an authentication system of Modification Example 2-1.

FIG. 23 is a diagram for illustrating an example of an authentication system of Modification Example 2-2.

FIG. 26 is a diagram for illustrating an example of an authentication system of Modification Example 3-3.

DESCRIPTION OF EMBODIMENTS

1. First Embodiment

A first embodiment which is an example of an embodiment of an authentication system according to the present disclosure is described.

1-1. Overall Configuration of Authentication System

Figure 1:
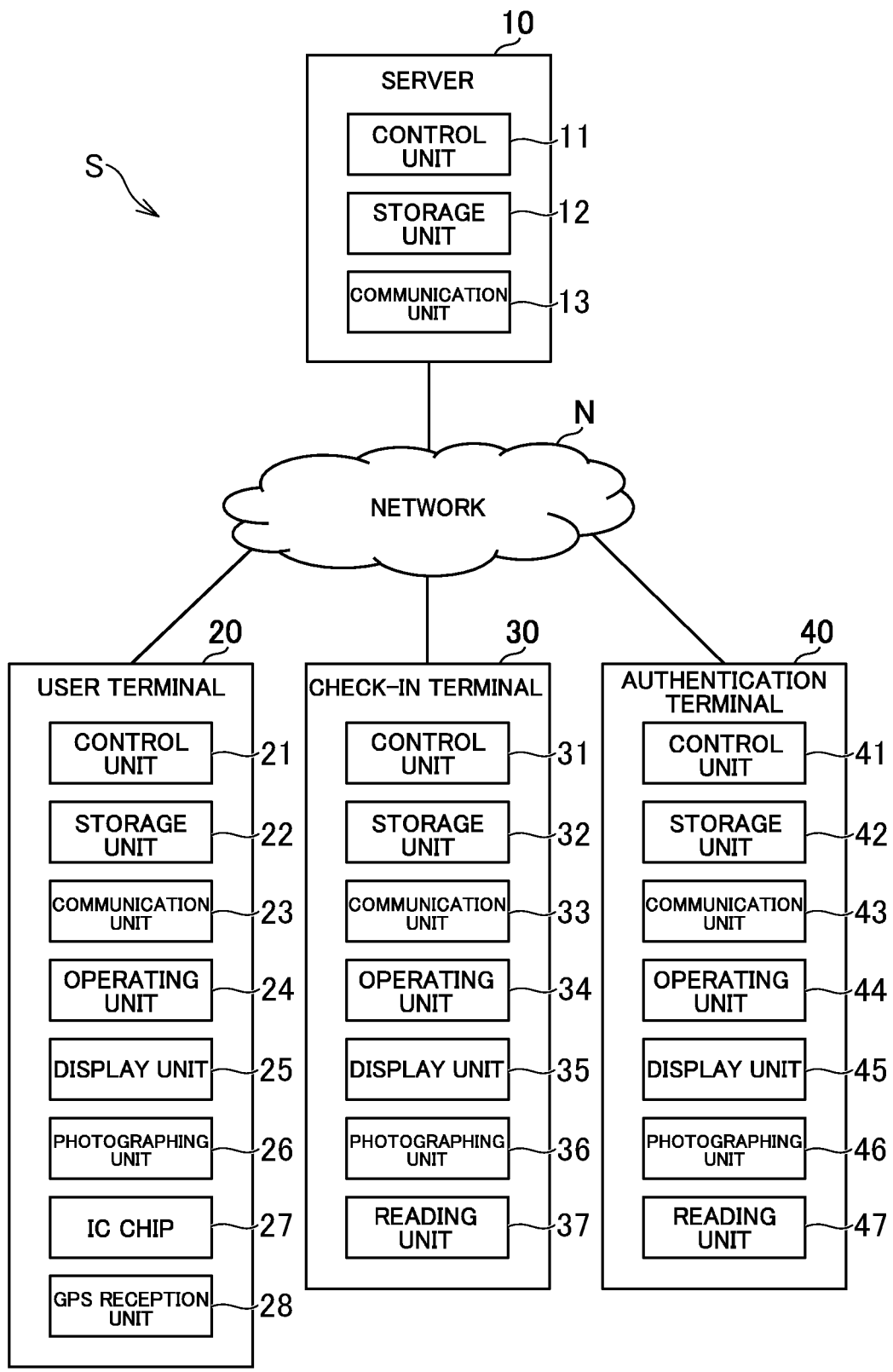
FIG. 1 is a diagram for illustrating an example of an overall configuration of an authentication system.

FIG. 1 is a diagram for illustrating an example of an overall configuration of the authentication system. As illustrated in FIG. 1, an authentication system S includes a server 10, a user terminal 20, a check-in terminal 30, and an authentication terminal 40. The server 10, the user terminal 20, the check-in terminal 30, and the authentication terminal 40 are each connectable to a network N, which is the Internet or the like. A minimum number of computers to be included in the authentication system S is one. Computers included in the authentication system S is not limited to the computers of the example of FIG. 1. For instance, the authentication system S may include more than one server 10, more than one user terminal 20, more than one check-in terminal 30, and more than one authentication terminal 40.

The server 10 is a server computer. The server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The user terminal 20 is a computer to be operated by a user. For example, the user terminal 20 is a smartphone, a tablet computer, a wearable terminal, or a personal computer. The user terminal 20 includes a control unit 21, a storage unit 22, a communication unit 23, an operating unit 24, a display unit 25, a photographing unit 26, an IC chip 27, and a GPS reception unit 28. The control unit 21, the storage unit 22, and the communication unit 23 have the same physical configurations as those of the control unit 11, the storage unit 12, and the communication unit 13, respectively.

The operating unit 24 is an input device such as a touch panel. The display unit 25 is a liquid crystal display or an organic EL display. The photographing unit 26 includes at least one camera. The IC chip 27 may be a chip of any standards, for example, a chip of FeliCa (trademark) or a chip of a so-called Type A or Type B among the non-contact type standards. The GPS reception unit 28 includes a receiver for receiving signals from satellites. The GPS reception unit 28 is used to obtain a current position or a current date/time. The user terminal 20 may use any GNSS other than GPS. It is sufficient for the user terminal 20 to include just a receiver conforming to a used GNSS.

The check-in terminal 30 is a computer placed in a predetermined place. The check-in terminal 30 is, for example, a personal computer, a tablet computer, or a smartphone. The check-in terminal 30 includes a control unit 31, a storage unit 32, a communication unit 33, an operating unit 34, a display unit 35, a photographing unit 36, and a reading unit 37. The control unit 31, the storage unit 32, the communication unit 33, the operating unit 34, the display unit 35, and the photographing unit 36 have the same physical configurations as those of the control unit 11, the storage unit 12, the communication unit 13, the operating unit 24, the display unit 25, and the photographing unit 26, respectively. The reading unit 37 includes a code reader or a reader/writer. The photographing unit 36 and the reading unit 37 may externally be connected to the check-in terminal 30.

The authentication terminal 40 is a computer placed in a predetermined place. The authentication terminal 40 is, for example, a personal computer, a tablet computer, or a smartphone. The authentication terminal 40 includes a control unit 41, a storage unit 42, a communication unit 43, an operating unit 44, a display unit 45, a photographing unit 46, and a reading unit 47. The control unit 41, the storage unit 42, the communication unit 43, the operating unit 44, the display unit 45, the photographing unit 46, and the reading unit 47 have the same physical configurations as those of the control unit 11, the storage unit 12, the communication unit 13, the operating unit 24, the display unit 25, the photographing unit 26, and the reading unit 37, respectively. The photographing unit 46 and the reading unit 47 may externally be connected to the authentication terminal 40.

At least one of programs or data stored in the server 10, the user terminal 20, the check-in terminal 30, and the authentication terminal 40 may be supplied thereto via the network N. Further, each of the server 10, the user terminal 20, the check-in terminal 30, and the authentication terminal 40 may include at least one of a reading unit (for example, an optical disc drive or a memory card slot) for reading a computer-readable information storage medium, or an input/output unit (for example, a USB port) for inputting and outputting data to/from an external device. For example, at least one of the program or the data stored in the information storage medium may be supplied through intermediation of at least one of the reading unit or the input/output unit.

1-2. Outline of Authentication System of First Embodiment

The first embodiment takes as an example a case of applying the authentication system S to a check-in service for detecting a user's presence in or arrival at a predetermined place. The authentication system S is applicable to various services. Examples of application to another service are described later in modification examples. For example, a user checks in at a place of an office building at which a company for which the user works is located. After checking in at this place, the user enters a room of the company for which the user works. This place is hereinafter referred to as "first place."

For example, authentication is executed at a time of checking in at the first place and at a time of entrance to the room. Various publicly known methods are usable for the authentication itself. For instance, one type out of biometric authentication, knowledge-based authentication, and possession-based authentication, or a combination thereof may be used. The first embodiment takes as an example a case in which code authentication with the use of a code displayed on the user terminal 20 is executed at the time of checking in at the first place, and face authentication is executed at the time of entrance to a room in the office building located at the first place. Code authentication is an example of possession-based authentication. Face authentication is an example of biometric information.

Figure 2:
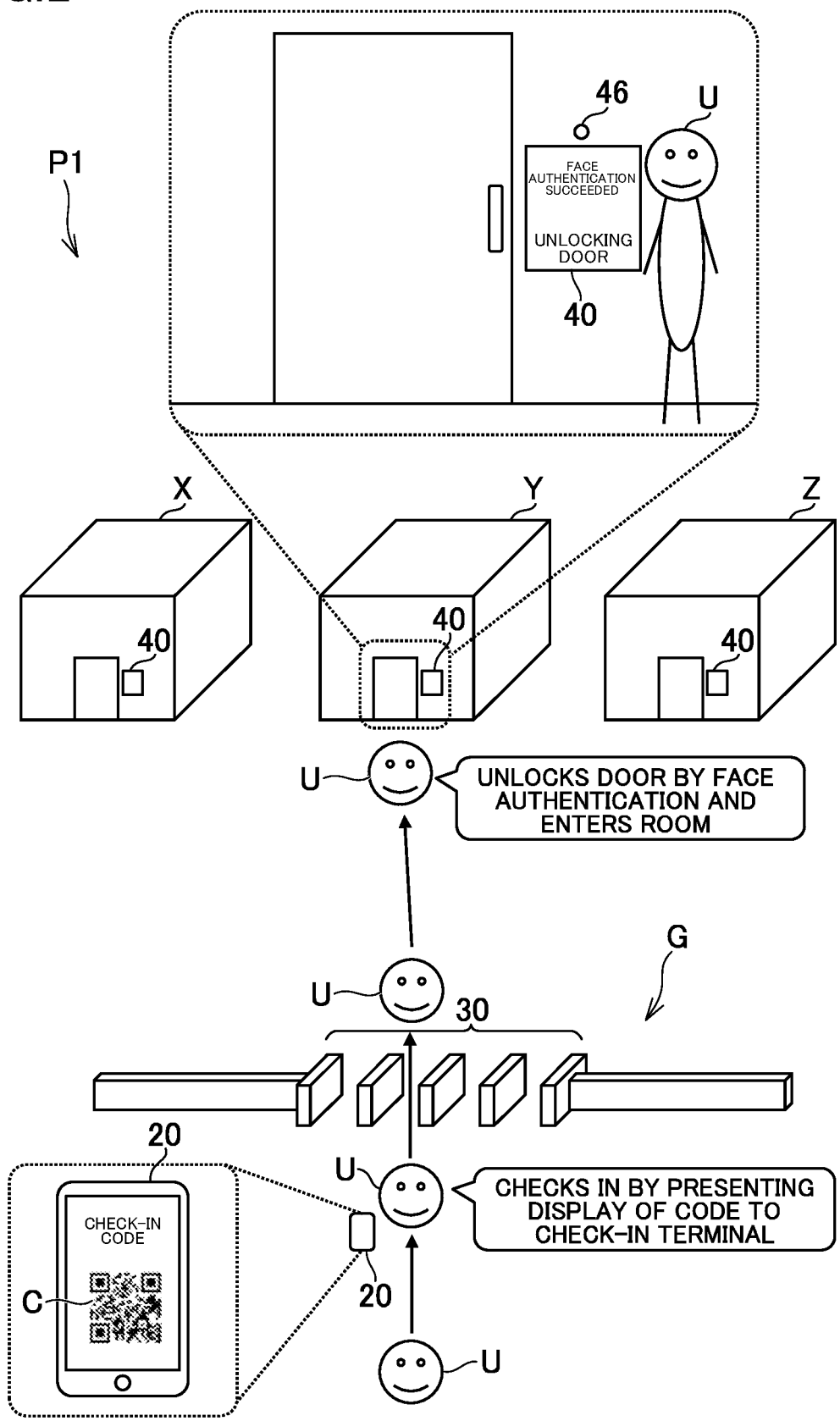
FIG. 2 is a diagram for illustrating an example of a check-in service in a first embodiment of the present disclosure.

FIG. 2 is a diagram for illustrating an example of the check-in service in the first embodiment. As illustrated in FIG. 2, a security gate G including more than one check-in terminal 30 is placed in the office building located at a first place P1. A user U has finished use registration of the check-in service. In the use registration, a full name and a face photograph, or other types of information of the user U are registered in the server 10. When the use registration is complete, the user can check in to the office building with the use of the check-in service and pass through the security gate G.

An application for using the check-in service (hereinafter referred to as "check-in app") is installed in the user terminal 20 of the user U. When the user U activates the check-in app on the user terminal 20, a code C for checking in is displayed on the display unit 25. In the example of FIG. 2, a two-dimensional code is illustrated as an example of the code C. Various types of codes are usable as the code C. For instance, the code C may be a bar code or a code that changes with time.

The code C includes a code ID by which the user U is identifiable. The code ID is authentication information used in code authentication. The code ID is issued by the server 10. The code ID issued by the server 10 is recorded on the user terminal 20. An expiration time is set to the code ID. The user U can use the code C to check in within the expiration time of the code ID. When the expiration time of the code ID expires, the server 10 updates the code ID. The updated code ID is recorded on the user terminal 20. An expiration time is set to the updated code ID as well.

The user U presents display of the code C to the reading unit 37 of the check-in terminal 30. The check-in terminal 30 reads the code C with the reading unit 37, and transmits the code ID included in the code C to the server 10. The server 10 verifies the legitimacy of the code ID and transmits a result of the verification to the check-in terminal 30. The check-in terminal 30 opens the security gate G when the result of the verification is received and the received result indicates that the code ID is legitimate, and keeps the security gate G closed when the received result of the verification indicates that the code ID is not legitimate. In this case, the user U updates the code ID and tries again to be authenticated. When another type of authentication is available as an alternative in the event of a failure of authentication using the code C, the user U may try the another type of authentication.

In the example of FIG. 2, a company for which the user U works is a tenant of leased rooms X to Z in the office building at the first place P1. Doors to the rooms X to Z are locked to prevent outsiders from entering the rooms. The authentication terminal 40 is placed at an entrance to each of the rooms X to Z. In order to enter the rooms X to Z, the user U is required to successfully be authenticated in face authentication by the authentication terminal 40. The example of FIG. 2 is a case in which the user U enters the room Y. The user U has the photographing unit 46 of the authentication terminal 40 placed at the entrance to the room Y photograph his or her face.

The authentication terminal 40 transmits a photographed image generated by the photographing unit 46 to the server 10. The server 10 receives the photographed image and calculates a feature amount of the face from the photographed image. The server 10 executes face authentication based on the calculated feature amount of the face and a feature amount of a face that is registered in the server 10. The server 10 transmits a result of executing the face authentication to the authentication terminal 40. When the execution result is received and the received execution result indicates that the face authentication is a success, the authentication terminal 40 unlocks the door to the room Y. The user U enters the room Y in this case. When the received execution result indicates that the face authentication is a failure, the authentication terminal 40 keeps the door to the room Y locked. The user U tries again to be authenticated in this case. When another type of authentication is available as an alternative in the event of a failure of face authentication, the user U may try the another type of authentication.

The user U can similarly unlock the doors to the other rooms X and Z by face authentication. However, when the face of the user U and a face of another user U resemble each other, the faces may be indistinguishable from each other by face authentication. One user U may be authenticated as another user U. The first embodiment addresses this by executing passcode authentication in addition to face authentication when more than one user U with similar facial features checks in at the first place P1 and passes through the security gate G. The following description uses a first user U1 and a second user U2 as an example of more than one user U with similar facial features. However, more than one user U with similar facial features may be three or more users.

Figure 3:
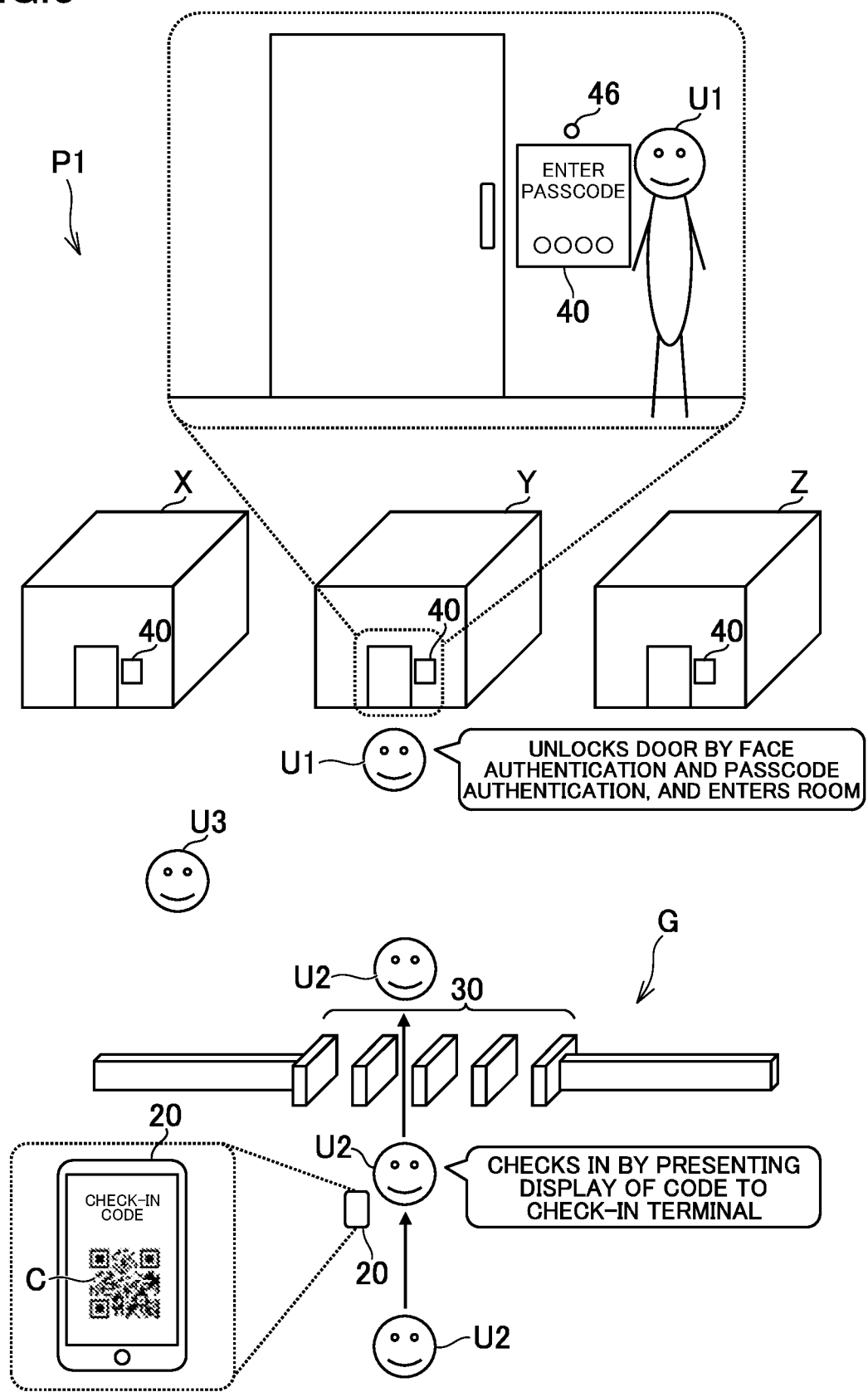
FIG. 3 is a diagram for illustrating an example for a case in which a first user and a second user separately check in to a first place.

FIG. 3 is a diagram for illustrating an example of a case in which the first user U1 and the second user U2 separately check in at the first place P1. In FIG. 3, the first user U1 has already checked in at the first place P1 by following the flow of steps described with reference to FIG. 2. The second user U2 who resembles the first user U1 in facial features also checks in at the first place P1 by following the same flow of steps. A case in which the second user U2 works for the same company as the company for which the first user U1 works is described in the first embodiment. However, the second user U2 may work for another company located in the same office building. To give another example, the second user U2 may be an outsider who can check in at the first place P1 by some means.

When the second user U2 checks in at the first place P1 and passes through the security gate G, the first user U1 and the second user U2 who resemble each other in facial features are now both at the first place P1. In this state, the server 10 cannot distinguish whether the person in front of the authentication terminal 40 of the room Y is the first user U1 or the second user U2. Another example of possible scenarios is that the first user U1 is authenticated as the second user U2. Conversely, the second user U2 may be authenticated as the first user U1 in face authentication by the authentication terminal 40.

For that reason, when the state of FIG. 3 occurs, passcode authentication in addition to face authentication is demanded of each of the first user U1 and the second user U2 as authentication for entry to the rooms X to Z. Different passcodes are set as a passcode of the first user U1 and a passcode of the second user U2. A third user U3 who does not resemble the first user U1 and the second user U2 in facial features can enter the rooms X to Z by face authentication alone when none of persons who have checked in at the first place P1 resembles the third user U3 in facial features.

The example of FIG. 3 is a case in which the first user U1 enters the room Y. The server 10 executes face authentication and passcode authentication of the first user U1 with the use of the authentication terminal 40 placed at the entrance to the room Y. The face authentication is executed by following the same flow of steps as the flow of steps described with reference to FIG. 2. The passcode authentication is executed by inputting the passcode from the first user U1 to the operating unit 34 of the authentication terminal 40 placed at the entrance to the room Y. When a result of the execution is received from the server 10 and the received result indicates that the face authentication and the passcode authentication are a success, the authentication terminal 40 unlocks the door to the room Y. When the received result of execution indicates that at least one type out of the face authentication and the passcode authentication is a failure, the authentication terminal 40 keeps the door to the room Y locked.

Face authentication and passcode authentication are executed by following the same flow of steps as the flow of steps for the case of the first user U1 also when the second user U2 enters one of the rooms X to Z. After the first user U1 checks out of the office building, the second user U2 can enter the rooms X to Z by face authentication alone. In the first embodiment, checking out is executed by a flow of steps similar to the flow of steps for checking in. For instance, the first user U1 checks out of the office building by holding his or her user terminal 20 displaying the code C above the check-in terminal 30. Similarly, after the second user U2 checks out of the office building, the first user U1 can again enter the rooms X to Z by face authentication alone.

As described above, the authentication system S of the first embodiment permits entry to the rooms X to Z by face authentication alone as long as the second user U2 does not check in at the first place P1 when the first user U1 checks in at the first place P1. After the second user U2 checks in at the first place P1, the authentication system S allows the first user U1 to enter the rooms X to Z when the first user U1 is successfully authenticated by face authentication and passcode authentication. This prevents impersonation and consequently enhances security. Details of the technology of the authentication system S of the first embodiment are described below.

1-3. Functions Implemented in Authentication System of First Embodiment

Figure 4:
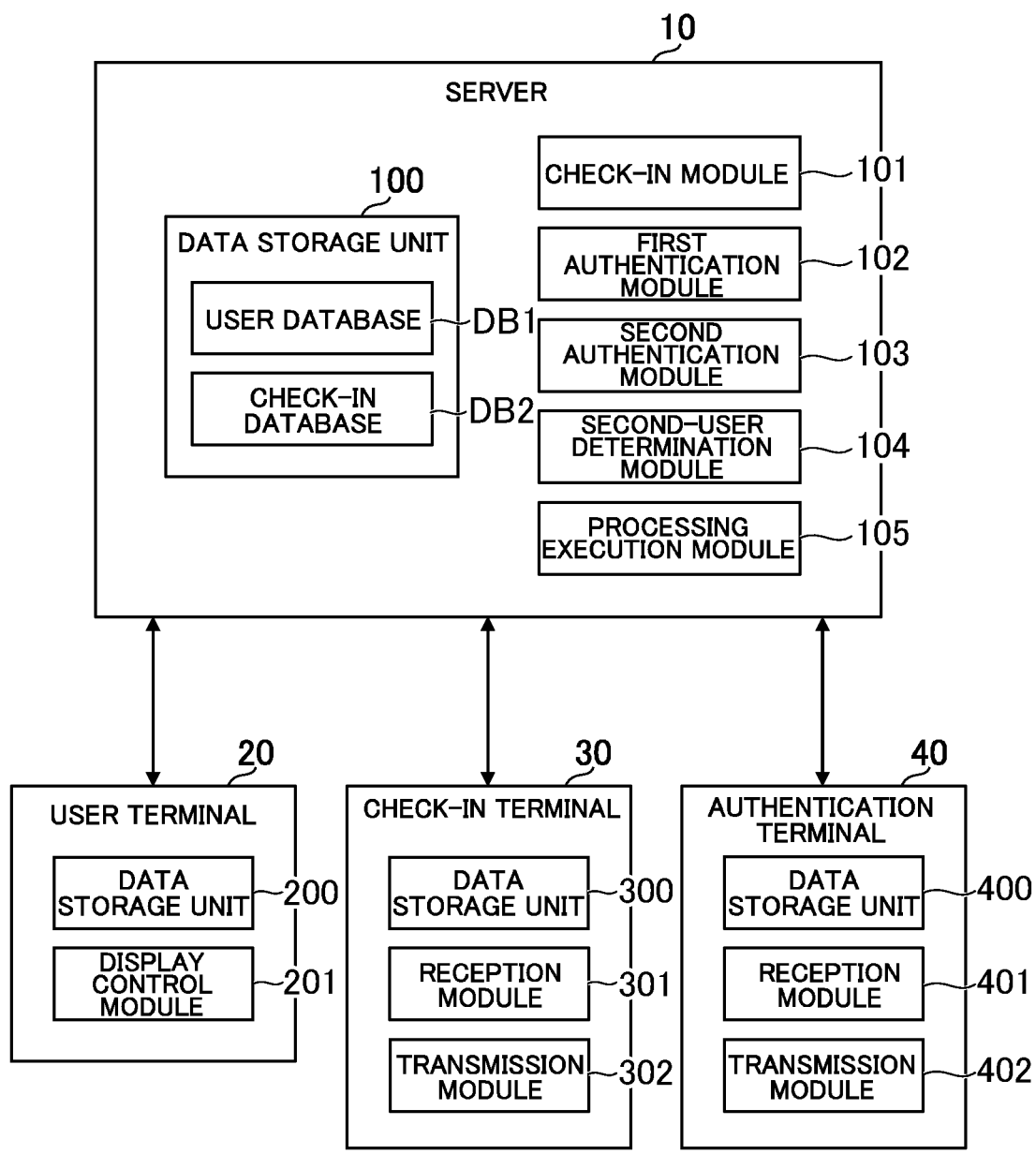
FIG. 4 is a function block diagram for illustrating an example of functions implemented in an authentication system of the first embodiment.

FIG. 4 is a function block diagram for illustrating an example of functions implemented in the authentication system S of the first embodiment. A simple notation "user U" refers to the first user U1 or the second user U2 when the first user U1 and the second user U2 are not discriminated from each other. The simple notation "user U" also refers to a person other than the first user U1 and the second user U2.

[1-3-1. Functions Implemented on Server]

As illustrated in FIG. 4, a data storage unit 100, a check-in module 101, a first authentication module 102, a second authentication module 103, a second-user determination module 104, and a processing execution module 105 are implemented on the server 10. The data storage unit 100 is implemented mainly by the storage unit 12. The other functions are implemented mainly by the control unit 11.

[Data Storage Unit]

The data storage unit 100 stores data required for processing in the authentication system S. For example, the data storage unit 100 stores a user database DB1 and a check-in database DB2.

FIG. 5 is a table for showing a data storage example of the user database DB1. As shown in FIG. 5, the user database DB1 is a database in which information relating to users U who have completed use registration of the check-in service is stored. For example, the user database DB1 stores, for each user U, a user ID of the user U, a password, a code ID, an expiration time of the code ID, a full name, a face photograph, a facial feature amount, a passcode, and a user ID of another user U who has similar facial features. When one user U executes use registration of the check-in service, a record associated with the user U is created in the user database DB1 to store ID and other types of information of this user U.

The user ID is information by which the user U is identifiable. The user U may be identified by, instead of the user ID, information called by another name. For instance, the user U may be identified by a user account, an email address, or other types of information. The password is authentication information for logging in to the check-in service. For example, the user U can log in to the check-in service from the user terminal 20 to update his or her face photograph or the passcode.

The code ID is issued at any time and stored in the user database DB1. A publicly known rule is applicable to a rule for issuing the code ID. The server 10 issues the code ID of one user U by taking care that the issued code ID is not a duplicate of the code ID of another user U that is within its expiration time. The code ID is updated when, for example, an application for displaying the code C is activated on the user terminal 20, when a fixed length of time elapses since display of the code C, or when the user U performs predetermined operation. A time that arrives when a predetermined length of time (for example, from about 5 minutes to about 30 minutes) elapses since the generation of the code ID is set as the expiration time of the code ID. The code ID is not required to have an expiration time set thereto.

The face photograph is a photographed image of the face of the user U. For example, the user U photographs his or her face with the photographing unit 26 of the user terminal 20, and uploads the face photograph to the server 10. The face photograph may be stored in advance on the user terminal 20 or another computer. The facial feature amount is information digitizing facial features. The facial feature amounts indicate, for example, features such as relative positions, sizes, or shapes of facial parts. In this embodiment, the facial feature amount captured on the face photograph is calculated in advance. However, the facial feature amount may be calculated on site at the time of authentication. The facial feature amount registered in the user database DB1 is authentication information that is a correct answer in face authentication.

Various methods are applicable to the face authentication itself. Examples of the methods useable for the face authentication include principal component analysis, linear discriminant analysis, elastic matching, and the hidden Markov model. It suffices that calculation expressions suitable for those methods are used to calculate the facial feature amount. For example, the facial feature amount is expressed by a multi-dimensional vector. The facial feature amount is not limited to the vector format. Another format such as an array or a single numerical value may be used to express the facial feature amount. In the face authentication, respective facial feature amounts of a plurality of face photographs may be used. Authentication called 3D face authentication may be used for the face authentication.

The passcode registered in the user database DB1 is information that serves as a correct answer in the passcode authentication. The number of digits of the passcode may be the same for every user U, or each user U may specify the number of digits at his or her discretion. For example, the passcode may have two digits to eight digits or so. The passcode may be specified by the user U, or may automatically be generated by the authentication system S. Limitations are placed on the passcode so as to avoid issuing the same passcode to one user U and another user U who resemble each other in facial features. For example, when one User A specifies a passcode at the time of use registration or at any subsequent time, the server 10 refers to the user database DB1 and determines whether the same passcode has been registered by User B who resembles User A in facial features.

"Resembling in facial features" means that a difference in facial feature amount is less than a threshold value. In other words, similarity in facial feature amount is equivalent to resemblance in facial features. For example, when a facial feature amount is expressed in a vector format, a distance in a vector space corresponds to a difference in facial feature amount. When a facial feature amount is expressed in another format, the fact that an indicator indicating similarity between facial feature amounts is less than a threshold value is similarly equivalent to resemblance in facial features.

For example, when User A specifies a passcode, and the passcode specified by User A and a passcode already registered by User B who is similar in facial features are not a match, the server 10 registers the passcode specified by User A in the user database DB1. When the passcode specified by User A and the passcode already registered by User B are a match, the server 10 does not register the passcode specified by User A in the user database DB1. In this case, the server 10 prompts User A to specify another passcode.

In the user database DB1, a record of each user U holds the user ID of another user U as well who is similar in facial features. At the time when the user U executes use registration or updates his or her face photograph, or at any other time, the server 10 identifies a combination of one user U and another user U who resemble each other in facial features, based on the facial feature amount of each user U and the facial feature amount of every other user U. The server 10 stores the user ID of the another user U who is similar in facial features in the user database DB1 based on this identification result.

In the data storage example of FIG. 5, the user U who has a user ID "taro.yamada123" and the user U who has a user ID "yoshida111jiro" resemble each other in facial features. Accordingly, "yoshida111jiro" is stored in a record for the user ID "taro.yamada123" as the user ID of another user U who is similar in facial features. A record for the user ID "yoshida111jiro" holds "taro.yamada123" as the user ID of another user U who is similar in facial features. No other user U resembles the user U who has a user ID "hanako999" in facial features.

FIG. 6 is a table for showing a data storage example of the check-in database DB2. As shown in FIG. 6, the check-in database DB2 is a database in which information about the user U who has checked in at the first place P1 is stored. For example, the check-in database DB2 stores the user ID of the user U who has checked in, a check-in date/time, a passcode authentication flag, a facial feature amount, and a passcode.

When one user U checks in at the first place P1, a record associated with this user U is newly added to the check-in database DB2. The user ID, the facial feature amount, and the passcode to be stored in this record are the same as those stored in the user database DB1. A current date/time that is the time of execution of the checking in is stored as the check-in date/time. Those processing steps are executed by the check-in module 101 described later.

The passcode authentication flag is a flag indicating whether passcode authentication is required. In the example of FIG. 6, passcode authentication is required of the user U whose passcode authentication flag is "1". Passcode authentication is not required of the user U whose passcode authentication flag is "0". For example, when one user U checks in at the first place P1, the user database DB1 is referred to with respect to the user ID of another user U that is associated with the one user U as the user ID of a user who has similar facial features. In a case in which the another user U identified by the associated user ID has already checked in, "1" is set to the passcode authentication flag. In a case in which no user ID is associated or the another user U identified by the associated user ID has not checked in, "0" is set to the passcode authentication flag. Those processing steps are executed by the check-in module 101 described later. Records of the check-in database DB2 that have "0" as the passcode authentication flag may hold no passcode.

When there is more than one first place P1, there may be a separate check-in database DB2 for each place, or there may be a single check-in database DB2 for integrated management of the more than one first place P1. The first place P1 is not limited to a site on which an office building is located as in the descriptions given with reference to FIG. 2 and FIG. 3, and may be any place. For example, the first place P1 may be a site of a lodging facility, a sight-seeing facility, a public facility, an event venue, a department store, a shopping mall, an arena, an airport, a station, or other facilities. To give another example, the first place P1 may be a site of no particular facility, such as an outdoor space or a bus stop.

Data stored in the data storage unit 100 is not limited to the example given above. The data storage unit 100 can store any type of data. For example, the data storage unit 100 may store a terminal ID by which each check-in terminal 30 is identifiable and a terminal ID by which each authentication terminal 40 is identifiable. When the authentication system S is applied to more than one first place P1, the data storage unit 100 may store, for each place ID by which one first place P1 out of the more than one first place P1 is identifiable, a terminal ID by which each check-in terminal 30 placed at this first place P1 is identifiable and a terminal ID by which each authentication terminal 40 placed at this first place P1 is identifiable.

[Check-In Module]

The check-in module 101 executes check-in at the first place P1 for each of more than one user U. For example, when the first user U1 is present at or arrives at the first place P1, the check-in module 101 executes check-in at the first place P1 for the first user U1. When the second user U2 is present at or arrives at the first place P1, the check-in module 101 executes check-in at the first place P1 for the second user U2. Being present at the first place P1 means that some time has passed since the arrival at the first place P1. Being present at the first place P1 means the same as staying at the first place P1. Arriving at the first place P1 means having moved to the first place P1 from another place. Arriving at the first place P1 means the same as visiting the first place P1.

Check-in corresponds to detection of the user U's presence or arrival at the first place P1. Identification of the user U who is present at or arrives at the first place P1 is equivalent to check-in. Identification of the first place P1 at which the user U is present or arrives is equivalent to check-in. For example, an act of storing information about the user U who is present at or arrives at the first place P1 in the check-in database DB2 is equivalent to check-in. For example, transmission of information about the user U to the check-in terminal 30 or the authentication terminal 40 at the first place P1 that is the site of arrival of the user U is equivalent to check-in.

For instance, when the user U presents display of the code C to the check-in terminal 30, the check-in terminal 30 transmits its own terminal ID and the code ID included in the code C to the server 10. When the server 10 receives the terminal ID and the code ID, the check-in module 101 executes check-in at the first place P1 for the user U identified by this code ID. The check-in module 101 executes check-in at the first place P1 for the user U by, for example, referring to the user database DB1 to obtain a combination of a user ID, a facial feature amount, and a passcode that is associated with this code ID, and storing the obtained pieces of data in the check-in database DB2. In a case in which another user U who has similar facial features has already checked in, the check-in module 101 sets the passcode authentication flag to "1". In a case in which no other user U has similar facial features or another user U who has similar facial features has not checked in, the check-in module 101 sets the passcode authentication flag to "0".

Check-out may be executed by following the same flow of steps. For example, when the user U who has checked in presents display of the code C to the check-in terminal 30, the check-in terminal 30 transmits its own terminal ID and the code ID included in the code C to the server 10. When the server 10 receives the terminal ID and the code ID, the check-in module 101 executes check-out from the office building for the user U identified by this code ID. For example, the check-in module 101 refers to the user database DB1 to obtain a user ID associated with this code ID. The check-in module 101 deletes a record in which the obtained user ID is stored from the check-in database DB2, to thereby execute check-out from the first place P1 for the user U. When the passcode authentication flag of the checked-out user U is "1", the check-in module 101 sets the passcode authentication flag of another user U who resembles the checked-out user U in facial features to "0". However, in a case in which still another user U resembles the another user U in facial features and has checked in, the change of the passcode authentication flag to "0" is not executed.

[First Authentication Module]

The first authentication module 102 can execute face authentication concerning the first user U1 when the first user U1 is present at or arrives at the first place P1. Face authentication concerning the first user U1 is face authentication for identity confirmation of the first user U1. In the first embodiment, check-in at the first place P1 is executed, and the user having checked in at the first place P1 is accordingly equivalent to the user being present at the first place P1. The user checking in at the first place P1 is equivalent to the user arriving at the first place P1.

Face authentication is an example of first authentication. Face authentication in the description can therefore be read as the first authentication. Any authentication method is usable for the first authentication itself. For example, the first authentication may be biometric authentication other than face authentication (for example, fingerprint authentication, vein authentication, voiceprint authentication, or iris authentication). The biometric authentication is not limited to authentication utilizing physical features. The biometric authentication may be authentication utilizing behavioral features such as handwriting or a gait.

In the first embodiment, a case in which the first authentication is authentication determined to be a success or a failure based on similarity between pieces of authentication information as in face authentication is described. However, the first authentication may be authentication determined to be a success or a failure based on whether pieces of authentication information match as in password authentication. For example, the first authentication may be passcode authentication, password authentication, or other forms of knowledge-based authentication. The first authentication may also be, for example, possession-based authentication utilizing the user terminal 20, an IC card, or another item possessed by the user U.

The first authentication module 102 executes face authentication at any timing instead of executing face authentication whenever the presence or arrival of the first user U1 at the first place P1 is detected. The first authentication module 102 is therefore only required to be ready to execute face authentication when the first user U1 is present at or arrives at the first place P1. The first authentication module 102 executes face authentication of the first user U1 based on a facial feature amount obtained with the use of the authentication terminal 40 and a facial feature amount registered in advance in the server 10. The face authentication is a success when a difference between those facial feature amounts is less than a threshold value. When the difference between the facial feature amounts is equal to or more than the threshold value, the face authentication is a failure.

In the first embodiment, check-in at the first place P1 is executed, and the face authentication by the first authentication module 102 is accordingly executable when the first user U1 is present at the first place P1 at which the first user U1 has checked in. For example, the first user U1 has the photographing unit 46 of the authentication terminal 40 photograph his or her face. The authentication terminal 40 transmits a photographed image generated by the photographing unit 46 to the server 10. The first authentication module 102 calculates a facial feature amount based on this photographed image.

The first authentication module 102 refers to the check-in database DB2, and determines whether there is a record in which a facial feature amount different from the calculated facial feature amount by an amount less than a threshold value is stored. When this record exists, the face authentication is a success.

When there is no such record, the face authentication is a failure. The face authentication may be executed with the use of the user database DB1. However, the number of pieces of data indicating facial feature amounts to be compared at the time of the face authentication can be reduced by using the check-in database DB2, because the user database DB1 includes a record of every user U who has not checked in.

[Second Authentication Module]

The second authentication module 103 can execute passcode authentication concerning the first user U1 when the first user U1 is present at or arrives at the first place P1. In the first embodiment, check-in at the first place P1 is executed, and the passcode authentication by the second authentication module 103 is accordingly executable when the first user U1 is present at the first place P1 at which the first user U1 has checked in.

Passcode authentication is an example of second authentication. Passcode authentication in the description can therefore be read as the second authentication. Any authentication method is usable for the second authentication itself. For example, the second authentication may be another form of knowledge-based authentication, such as password authentication, countersign authentication, or authentication that demands input of a phone number or another type of personal information. The second authentication may be biometric authentication or possession-based authentication. The second authentication is only required to be a type of authentication different from the first authentication.

In the first embodiment, a case in which the second authentication is higher in authentication rate than the first authentication is described. However, the first authentication may be higher in authentication rate than the second authentication. The authentication rate here means a probability of no false authentication. Although a case in which the second authentication is authentication determined to be a success or a failure based on whether pieces of authentication information match as in passcode authentication is described in the first embodiment, the second authentication may be authentication determined to be a success or a failure based on similarity between pieces of authentication information as in biometric authentication. For instance, when fingerprint authentication or iris authentication is used as the second authentication, the second authentication is higher in authentication rate than the face authentication, which is the first authentication. However, the user U may find the second authentication to be a little more trouble or to be processing that takes a longer time than the first authentication.

The second authentication module 103 executes passcode authentication at any timing instead of executing passcode authentication whenever the presence or arrival of the first user U1 at the first place P1 is detected. The second authentication module 103 is therefore only required to be ready to execute passcode authentication when the first user U1 is present at or arrives at the first place P1. The second authentication module 103 executes passcode authentication based on a passcode obtained with the use of the authentication terminal 40 and a passcode registered in advance in the server 10. When those passcodes match, the passcode authentication is a success. The passcode authentication is a failure when the passcodes do not match. The passcode authentication may use user IDs in addition to passcodes. In the first embodiment, however, user IDs are not used and passcodes are used alone.

In the first embodiment, a case in which the passcode authentication is executed after the face authentication is described. The face authentication, however, may be executed before the passcode authentication. Instead of executing one type of authentication first out of the face authentication and the passcode authentication, both of the face authentication and the passcode authentication may concurrently be executed in parallel with each other. When execution of the passcode authentication is to follow execution of the face authentication, the passcode authentication is equivalent to additional authentication of the face authentication. For example, the second authentication module 103 refers to the check-in database DB2 and refers to the passcode authentication flag in a record in which a facial feature amount determined to have successfully passed the face authentication is stored. When the passcode authentication flag is "0", the second authentication 103 does not execute the passcode authentication and, when the passcode authentication flag is "1", the second authentication 103 executes the passcode authentication.

When the passcode authentication flag is "1", the second authentication module 103 issues a request for the passcode authentication to the authentication terminal 40. The authentication terminal 40 transmits a passcode input by the user U to the server 10. The second authentication module 103 executes the passcode authentication based on the passcode obtained from the authentication terminal 40 and a passcode in the record in which the facial feature amount determined to have successfully passed the face authentication is stored. When the passcodes match, the passcode authentication is a success. The passcode authentication is a failure when the passcodes do not match. The passcode authentication may be executed with the use of the user database DB1. However, the number of passcodes to be compared at the time of the passcode authentication can be reduced by using the check-in database DB2, because the user database DB1 includes a record of every user U who has not checked in.

[Second-User Determination Module]

The second-user determination module 104 determines whether the second user U2 who has a possibility of being authenticated as the first user U1 in the face authentication is present at the first place P1, or whether the second user U2 has arrived at the first place P1. In the first embodiment using face authentication, resemblance to the first user U1 in facial features is equivalent to the possibility of being authenticated as the first user U1 in the face authentication.

When biometric authentication other than face authentication is used, similarity to or a match with the first user U1 in terms of biometric information used in the biometric authentication is equivalent to the possibility of being authenticated as the first user U1 in the biometric authentication. As in the face authentication, the similarity here means that a difference between pieces of biometric information is less than a threshold value. The match here means that pieces of biometric information are the same as each other, although a possibility of that happening is small. A type of biometric information suitable for biometric authentication is usable. In a case of fingerprint authentication, for example, a fingerprint pattern corresponds to the biometric information. In iris authentication, an iris pattern corresponds to the biometric information.

When authentication other than biometric information is used as the first authentication, the second user U2 is a person who is similar to or matches with the first user U1 in terms of authentication information used in that authentication. As in the biometric authentication, the similarity here means that a difference between pieces of authentication information is less than a threshold value. The match here means that pieces of authentication information are the same as each other. A type of authentication information suitable for authentication is usable. In a case of passcode authentication, for example, a passcode corresponds to the authentication information. In password authentication, a password corresponds to the authentication information.

The second-user determination module 104 uses the user terminal 20 of the second user U2 and at least one terminal out of the check-in terminal 30 and the authentication terminal 40 placed in the first place P1 to determine whether the second user U2 is present at the first place P1, or whether the second user U2 has arrived at the first place P1. In the first embodiment, check-in at the first place P1 is executed, and a case in which the second-user determination module 104 uses the check-in terminal 30 to determine whether the second user U2 is present at the first place P1, or whether the second user U2 has arrived at the first place P1 is accordingly described. However, the method of the determination by the second-user determination module 104 is not limited to the method used in the example of the first embodiment. The second-user determination module 104 may use other determination methods as in modification examples described later.

When the first user U1 is present at the first place P1 at which the first user U1 has checked in, for example, the second-user determination module 104 determines whether the second user U2 is present at the first place P1, or whether the second user U2 has arrived at the first place P1. The second-user determination module 104 determines whether the second user U2 is present at the first place P1, or whether the second user U2 has arrived at the first place P1 by determining whether the second user U2 has checked in at the first place P1. When there is a record associated with the second user U2 in the check-in database DB2, the second-user determination module 104 determines that the second user U2 is present at the first place P1. When a record associated with the second user U2 is added to the check-in database DB2, the second-user determination module 104 determines that the second user U2 has just arrived at the first place P1. The presence and the arrival may be determined based on the passcode authentication flag, or similarity in facial feature amount may be determined on site without particularly preparing the passcode authentication flag or similar information.

[Processing Execution Module]

The processing execution module 105 executes, when it is determined that the second user U2 is not present at or has not arrived at the first place P1, first processing concerning the first user U1, based on the first authentication. The first processing is processing permitted when the first authentication is a success. The first processing may be processing executed with the use of some information about the user U who has successfully been authenticated in the first authentication. In the first embodiment, a case in which the first processing is unlocking processing for unlocking the door to a relevant room out of the rooms X to Z is described. Thus, a description about the unlocking processing can be read as a description about the first processing. The first processing may be any type of processing. Other examples of the first processing are described in the modification examples described later. For example, the first processing may be payment processing in an electronic payment service.

The processing execution module 105 executes the unlocking processing based on the face authentication when it is determined that the second user U2 is not present at or has not arrived at the first place P1. In the first embodiment, the processing execution module 105 executes the unlocking processing based on the face authentication and the passcode authentication when it is determined that the second user U2 is present in or has arrived at the office building. The processing execution module 105 executes the unlocking processing when both of the face authentication and the passcode authentication succeed. When at least one type of authentication out of the face authentication and the passcode authentication is a failure, the processing execution module 105 does not execute the unlocking processing.

For example, in a case in which the second user U2 is determined to be present at or have arrived at the first place P1 and is subsequently determined to be not present at or have not arrived at the first place P1, the processing execution module 105 executes the unlocking processing based on the face authentication. In a case in which the first user U1 is present at the first place P1 at which the first user U1 has checked in, the processing execution module 105 executes the unlocking processing based on the face authentication. In a case in which the second user U2 is determined to be present at or has arrived at the first place P1, the unlocking processing may be executed when a condition other than successful face authentication is satisfied.

[1-3-2. Functions Implemented on User Terminal]

As illustrated in FIG. 4, a data storage unit 200 and a display control module 201 are implemented on the user terminal 20. The data storage unit 200 is implemented mainly by the storage unit 22. The display control module 201 is implemented mainly by the control unit 21.

[Data Storage Unit]

The data storage unit 200 stores data required for check-in. For example, the data storage unit 200 stores the check-in app and a code ID. The user terminal 20 receives a code ID issued by the server 10 and records the code ID in its own data storage unit 200. When an expiration time of the code ID is received as well, the user terminal 20 also records the expiration time in its own data storage unit 200.

[Display Control Module]

The display control module 201 displays the code C on the display unit 25. For example, the display control module 201 can display the code C including a code ID based on the check-in app. The display control module 201 has the code C displayed by encoding the code ID stored in the data storage unit 200.

[1-3-3. Functions Implemented on Check-In Terminal]

As illustrated in FIG. 4, a data storage unit 300, a reception module 301, and a transmission module 302 are implemented on the check-in terminal 30. The data storage unit 300 is implemented mainly by the storage unit 32. The other functions are implemented mainly by the control unit 31.

[Data Storage Unit]

The data storage unit 300 stores data required for check-in. For example, the data storage unit 300 stores a terminal ID by which the check-in terminal 30 is identifiable and information by which the server 10 is identifiable. The data storage unit 300 may additionally store, for example, information usable to identify a place in which the check-in terminal 30 is placed.

[Reception Module]

The reception module 301 receives any type of operation. The contents of the operation received by the reception module 301 are transmitted to the server 10 by the transmission module 302.

[Transmission Module]

The transmission module 302 transmits information required for check-in to the server 10. For example, the transmission module 302 transmits a code ID obtained by the check-in terminal 30. In the first embodiment, a code ID is recorded in the data storage unit 200 of the user terminal 20, and the transmission module 302 accordingly obtains the code ID recorded on the user terminal 20. In the first embodiment, the transmission module 302 obtains the code ID when, for example, the code C is read by the check-in terminal 30. The check-in terminal 30 may be any terminal for obtaining the code ID, and a terminal suitable for a method of obtaining the code ID suffices as the check-in terminal 30.

The code ID is not required to be optically obtained and may be obtained through communication. In this case, the check-in terminal may be a communication device capable of holding communication to and from the user terminal 20.

The communication itself may use any protocol, and may be, for example, Wi-Fi (trademark) communication, Bluetooth (trademark) communication, or infrared communication, or near field communication employed by publicly known IC cards.

[1-3-4. Functions Implemented on Authentication Terminal]

As illustrated in FIG. 4, a data storage unit 400, a reception module 401, and a transmission module 402 are implemented on the authentication terminal 40. The data storage unit 400 is implemented mainly by the storage unit 42. The other functions are implemented mainly by the control unit 41.

[Data Storage Unit]

The data storage unit 400 stores data required for authentication. For example, the data storage unit 400 stores a terminal ID by which the authentication terminal 40 is identifiable and information by which the server 10 is identifiable. The data storage unit 400 may additionally store, for example, information usable to identify a place in which the authentication terminal 40 is placed.

[Reception Module]

The reception module 401 receives input of a passcode. The reception module 401 can receive any other type of operation. The contents of the operation received by the reception module 401 are transmitted to the server 10 by the transmission module 402.

[Transmission Module]

The transmission module 402 transmits information required for the face authentication and information required for the passcode authentication to the server 10. For example, the transmission module 402 transmits a photographed image photographed by the photographing unit 46 of the authentication terminal 40 to the server 10. The authentication terminal 40, instead of the server 10, may calculate the facial feature amount. In this case, the transmission module 402 transmits the facial feature amount calculated by the authentication terminal 40 to the server 10. The transmission module 402 also transmits, for example, the input passcode received by the reception module 401, to the server 10.

1-4. Processing Executed by Authentication System of First Embodiment

Figure 7:
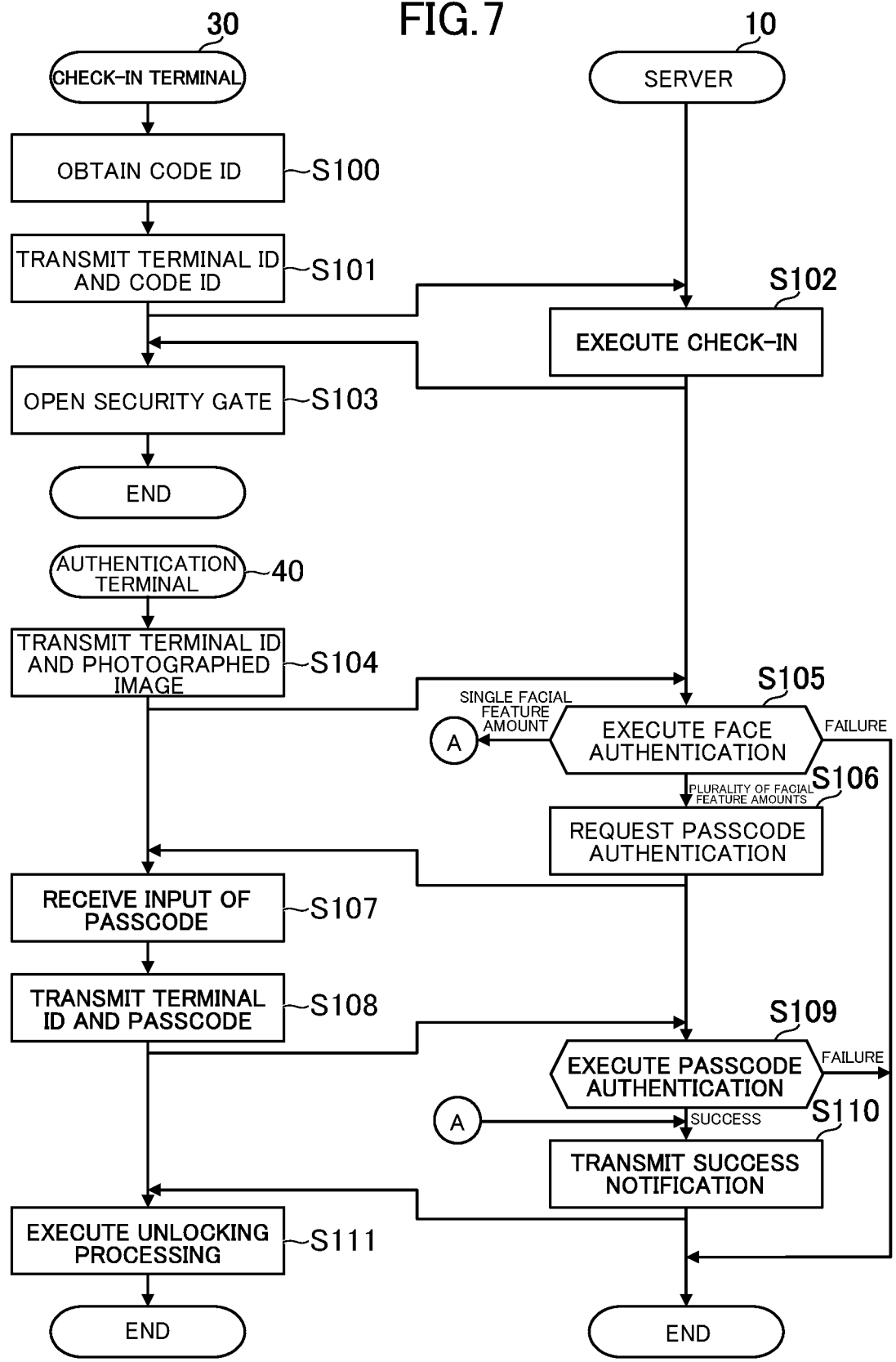
FIG. 7 is a flow chart for illustrating an example of processing executed by the authentication system of the first embodiment.

FIG. 7 is a flow chart for illustrating an example of processing executed by the authentication system S of the first embodiment. The processing illustrated in FIG. 7 is executed by the control units 11, 21, 31, and 41 operating in accordance with the programs stored in the storage units 12, 22, 32, and 42, respectively. The processing of FIG. 7 is an example of processing executed by the functional blocks of FIG. 4. It is assumed that the user U has completed the use registration prior to the execution of the processing of FIG. 7. In FIG. 7, the first user U1 and the second user U2 are not discriminated from each other and are simply referred to as "user U."

First, the user U arrives at the first place P1 and activates the check-in app to display the code C on the display unit 25, based on the code ID stored in the storage unit 22. This processing is omitted in FIG. 7. As illustrated in FIG. 7, when the user U presents display of the code C to the reading unit 37 of the check-in terminal 30, the check-in terminal 30 obtains the code ID included in the code C read by the reading unit 37 (Step S100). The check-in terminal 30 transmits its own terminal ID stored in the storage unit 32 and the code ID obtained in Step S100 to the server 10 (Step S101).

The server 10 receives the terminal ID and the code ID, and refers to the user database DB1 to execute check-in (Step S102). In Step S102, the server 10 checks the code ID and its expiration time. In the case of a code ID within the expiration time, the server 10 obtains a user ID, a facial feature amount, and a passcode that are associated with this code ID, and stores the user ID, the facial feature amount, and the passcode in the check-in database DB2 along with a check-in date/time and the passcode authentication flag. The server 10 transmits a result of executing check-in to the check-in terminal 30. When the received code ID is an expired code ID, this processing is ended without executing check-in.

The check-in terminal 30 receives the result of executing check-in, and executes processing for opening the security gate G (Step S103). In Step S103, when the received execution result indicates that check-in has been executed, the check-in terminal 30 executes the processing for opening the security gate G. When the received execution result indicates that check-in has not been executed, the processing for opening the security gate G is not executed. This processing includes, among others, processing of controlling a motor so that a door of the security gate G is opened.

The user U subsequently enters the office building at the first place P1, and can now execute the unlocking processing by the face authentication. The user U moves toward a room of his or her choice, stops in front of the authentication terminal 40 of the room, and has the photographing unit 46 of the authentication terminal 40 photograph his or her face. The authentication terminal 40 then transmits its own terminal ID and a photographed image generated by the photographing unit 46 to the server 10 (Step S104). The server 10 receives the photographed image and executes the face authentication based on the check-in database DB2 (Step S105).

In Step S105, the server 10 calculates a facial feature amount of the face photographed in the photographed image. The server 10 refers to the check-in database DB2 to obtain facial feature amounts associated with the terminal ID of the authentication terminal 40 from which the photographed image has been transmitted. The server 10 executes the face authentication based on the facial feature amount calculated from the photographed image and the facial feature amounts obtained from the check-in database DB2. The server 10 determines the face authentication to be a success when a difference of at least one obtained facial feature amount from the calculated facial feature amount is less than a threshold value. In a case in which one user U and another user U who resemble each other in facial features have checked in, the face authentication is a success for a plurality of facial feature amounts.

When the face authentication is a success for a plurality of facial feature amounts (Step S105: "plurality of facial feature amounts"), that is, in a case in which the second user U2 has checked in at the first place P1 and the passcode authentication flag is "1" in records holding the facial feature amounts successfully authenticated by the face authentication, the server 10 issues a request for the passcode authentication to the authentication terminal 40 (Step S106). The authentication terminal 40 receives the request, displays a screen prompting input of a passcode on the display unit 45, and receives input of a passcode (Step S107). The authentication terminal 40 transmits its own terminal ID and the passcode input through the operating unit 44 to the server 10 (Step S108).

The server 10 receives the passcode and the terminal ID, and executes the passcode authentication (Step S109). In Step S109, the server 10 refers to the check-in database DB2 to obtain a passcode stored in the record for which the face authentication has been a success in Step S105. The server determines whether the obtained passcode and the passcode received from the authentication terminal 40 match. When the passcodes match, the passcode authentication is a success.

When the passcode authentication is a success (Step S109: "success"), the server 10 transmits a success notification indicating that the authentication has succeeded to the authentication terminal 40 (Step S110). The authentication terminal 40 receives the success notification and executes the unlocking processing for unlocking the door (Step S111), and this processing is ended. In Step S111, output of a signal for unlocking an electronic key, or the like, is executed. The user U having successfully been authenticated by the face authentication and the passcode authentication is allowed to enter the room. When the passcode authentication is a failure (Step S109: "failure"), a predetermined error message is displayed on the display unit 45 of the authentication terminal 40, and this processing is ended.

When the face authentication is a success for only one facial feature amount in Step S105 (Step S105: "single facial feature amount"), that is, in a case in which the second user U2 has not checked in to the office building and the passcode authentication flag is "0" in a record holding the facial feature amount successfully authenticated by the face authentication, the process proceeds to Step S110 without a request for the passcode authentication being issued. In this case, the user U can enter a room just by the face authentication. When the face authentication is not a success in Step S105 (Step S105: "failure"), a predetermined error message is displayed on the display unit 45 of the authentication terminal 40, and this processing is ended.

According to the authentication system S of the first embodiment, when it is determined that the second user U2 who has a possibility of being authenticated as the first user U1 by face authentication is not present at or has not arrived at the first place P1, the unlocking processing is executed based on face authentication. This prevents a situation in which distinction between the first user U1 and the second user U2 is impossible, to thereby execute foolproof identity confirmation and consequently enhance security. For example, entrance of the second user U2 impersonating the first user U1 to a room can be prevented. An opposite case in which the first user U1 impersonating the second user U2 enters a room is also preventable. When it is determined that the second user U2 is not present at or has not arrived at the first place P1, the first user U1 can enter a room just by face authentication, and hence convenience for the first user U1 is raised. In addition, with execution of passcode authentication unrequired, processing load on the authentication system S can be lightened in this case.

When the second user U2 is determined to be present at or have arrived at the first place P1 and is subsequently determined to be not present at or have not arrived at the first place P1, the authentication system S executes the unlocking processing based on face authentication. With the second user U no longer present at the first place P1, the use of just face authentication does not invite a situation in which distinction between the first user U1 and the second user U2 is impossible. Foolproof identity confirmation is thus executed and security is consequently enhanced. The first user U1 can enter a room just by face authentication, and hence convenience for the first user U1 is raised. In addition, with execution of passcode authentication unrequired, processing load on the authentication system S can be lightened in this case.

When it is determined that the second user U2 is present at or has arrived at the first place P1, the authentication system S executes the unlocking processing based on face authentication and passcode authentication. This enhances security by executing foolproof identity confirmation through passcode authentication even in a situation in which distinction between the first user U1 and the second user U2 is impossible.

When the first user U1 is present at the first place P1 at which the first user U1 has checked in, the authentication system S executes the unlocking processing based on face authentication. This prevents impersonation at the first place P1 at which the first user U1 has checked in, to thereby execute foolproof identity confirmation at the first place P1 and consequently enhance security.

The authentication system S determines whether the second user U2 is present at the first place P1, or whether the second user U2 has arrived at the first place P1, by determining whether the second user U2 has checked in at the first place P1. This ensures accurate determination on whether the second user U2 is present at the first place P1, or whether the second user U2 has arrived at the first place P1. This also prevents impersonation at the first place P1 at which the second user U2 has checked in, to thereby execute foolproof identity confirmation at the first place P1 and consequently enhance security.

2. Second Embodiment

The authentication system S of a second embodiment of the present disclosure is described next. The first embodiment takes as an example a case in which the second user U2 checks in at the same place as a place of checking in of the first user U1. The second embodiment takes as an example a case in which the second user U2 checks in at a place that is not a place of checking in of the first user U1. In the second embodiment, descriptions on what are common between the first embodiment and the second embodiment are omitted.

2-1. Outline of Authentication System of Second Embodiment

Figure 8:
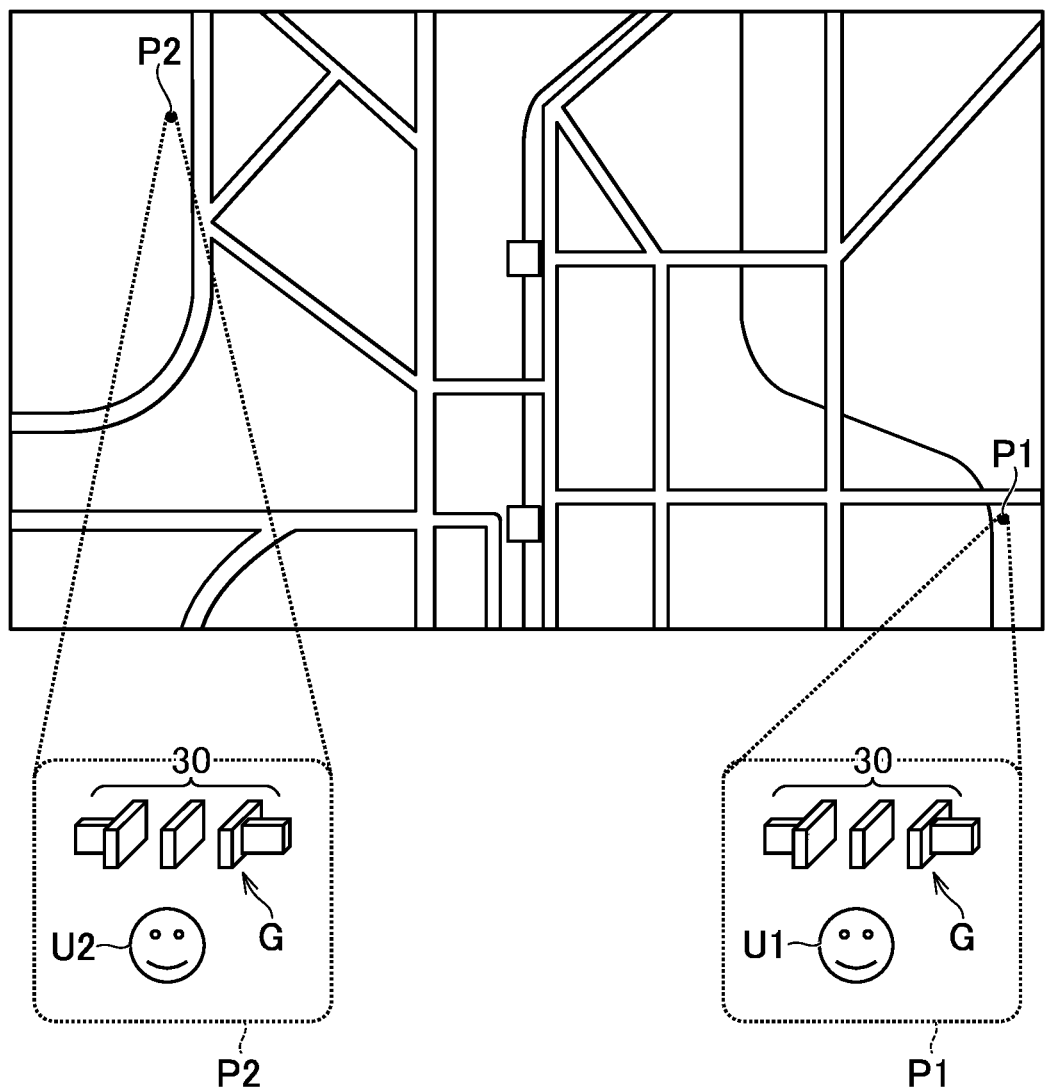
FIG. 8 is a diagram for illustrating an example of an authentication system of a second embodiment of the present disclosure.
Figure 9:
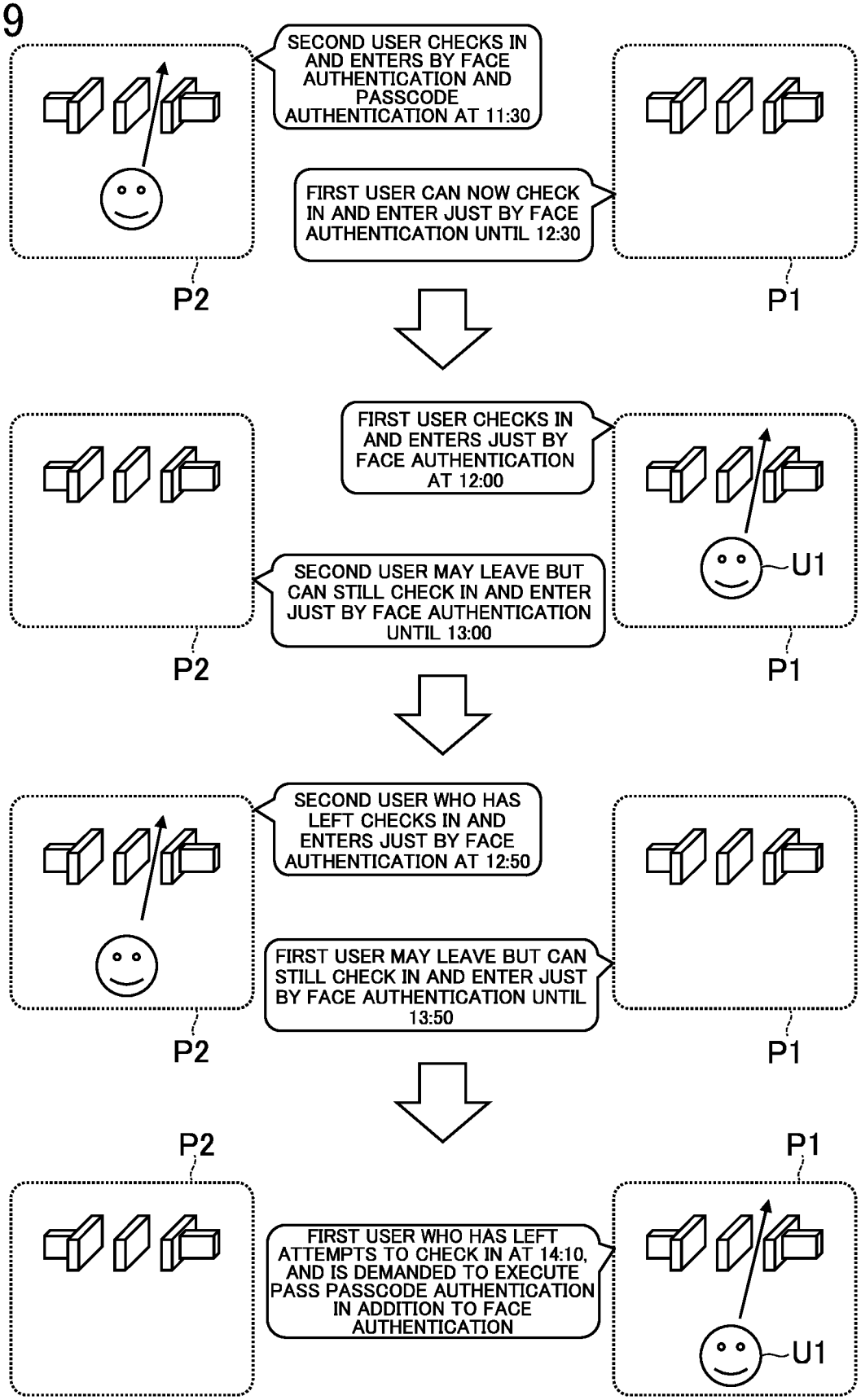
FIG. 9 is a diagram for illustrating the example of the authentication system of the second embodiment.

FIG. 8 and FIG. 9 are diagrams for illustrating an example of the authentication system S of the second embodiment. In the second embodiment, it is assumed that the second user U2 works for the same company as the company of the first user U1. This company has an office in each of a first office building located at the first place P1 and a second office building located at a second place P2. The same security gate G as the one in the first embodiment is placed at each of the first place P1 and the second place P2.

In the second embodiment, the first user U1 can check in at any place out of the first place P1 and the second place P2. For example, the first user U1 can move to the second place P2 after checking in at the first place P1. The second user U2 can also check in at any place out of the first place P1 and the second place P2. For example, the second user U2 can move to the first place P1 after checking in at the second place P2.

Authentication in check-in can be the same as in the first embodiment. The second embodiment takes as an example a case in which face authentication is used as authentication in check-in. That is, a case in which face authentication is executed in check-in at the first place P1 and in check-in at the second place P2 is taken as an example. However, as a general rule, passcode authentication is executed in addition to face authentication in check-in because the first user U1 and the second user U2 resemble each other in facial features.

An example in which the second user U2 attempts to check in at the second place P2 when none of the first user U1 and the second user U2 has checked in at the first place P1 or the second place P2 is discussed. In this case, the authentication system S cannot determine by face authentication alone whether a person trying to check in at the second place P2 is the first user U1 or the second user U2, and accordingly demands passcode authentication in addition to face authentication.

The second user U2 executes face authentication and passcode authentication via the check-in terminal 30 at the second place P2. When the face authentication and the passcode authentication of the second user U2 are a success, the second user U2 checks in at the second place P2. The second user U2 passes through the security gate G at the second place P2. The same flow of steps as the flow of steps in the first embodiment may be followed for entrance to a room in the office building located at the second place P2. A description on this flow is omitted in the second embodiment.

When the second user U2 is successfully authenticated by the face authentication and the passcode authentication, the authentication system S can figure out that the second user U2 is present at the second place P2. The first place P1 and the second place P2 are at some distance from each other and, accordingly, the second user U2 who has checked in at the second place P2 requires some time to finish a move to the first place P1. In the second embodiment, the first user U1 is therefore allowed to check in at the first place P1 just by face authentication within a period that is expected to be too short for the second user P2 to finish the move to the first place P1. This period is hereinafter referred to as "predicted period."

For example, a travel time required for a move between the first place P1 and the second place P2 is assumed to be 1 hour. As illustrated in FIG. 9, in a case in which the second user U2 checks in at the second place P2 at 11:30, it is predicted that the second user U2 cannot finish the move to the first place P1 until 12:30, which is 1 hour after 11:30. The first user U1 can accordingly check in at the first place P1 just by face authentication as long as the checking in takes place before 12:30.

In a case in which the first user U1 checks in at the first place P1 just by face authentication at 12:00, for example, it is predicted that the first user U1 cannot finish a move to the second place P2 until 13:00, which is 1 hour after 12:00. The second user U2 who temporarily leaves the second place P2 for, for example, a lunch break can accordingly check in at the second place P2 just by face authentication as long as the checking in takes place before 13:00.

Check-out from the first place P1 and check-out from the second place P2 may be executed, but the second embodiment does not involve execution of check-out. For that reason, even when the second user U2 leaves the second place P2, the authentication system S has no way of knowing that the second user U2 has left the second place P2. Similarly, even when the first user U1 leaves the first place P1, the authentication system S has no way of knowing that the first user U1 has left the first place P1.

An example in which the second user U2 temporarily leaves the second place P2 and then attempts to check in at the second place P2 at 12:50 is discussed. In this case, the second user U2 can check in at the second place P2 just by face authentication because 12:50 is within a prediction period that is expected to be too short for the first user U1 to finish the move to the second place P2. The second user U2 in this case is expected to be unable to finish the move to the first place P1 until 13:50, which is 1 hour after 12:50. The first user U1 who temporarily leaves the first place P1 can accordingly check in at the first place P1 just by face authentication as long as the checking in takes place before 13:50.

After 13:50, however, there is a possibility that the second user U2 who has left the second place P2 arrives at the first place P1. Accordingly, the first user U1 can no longer check in at the first place P1 by face authentication alone. An example in which the first user U1 temporarily leaves the first place P1 and then attempts to re-enter the first place P1 at 14:10 is discussed. In this case, it is past 13:50 and the first user U1 is accordingly required to successfully be authenticated by face authentication and passcode authentication in order to check in at the first place P1. After the first user U1 is successfully authenticated by face authentication and passcode authentication and checks in at the first place P1, the second user U2 can check in at the second place P2 just by face authentication until 15:10, which is 1 hour after 14:10.

As described above, in the authentication system S of the second embodiment, in a case in which the second user U2 has checked in at the second place P2 and the current time is within a predicted period that is expected to be too short for the second user U2 to finish the move to the first place P1, the first user U1 can check in at the first place P1 just by face authentication. The same applies to the second user U2 and, in a case in which the current time is within a predicted period that is expected to be too short for the first use U1 to finish the move to the second place P2, the second user U2 can check in at the second place P2 just by face authentication. This raises convenience for the first user U1 and the second user U2 as well as enhancing security. Details of the second embodiment are described below.

2-2. Functions Implemented in Authentication System of Second Embodiment

Figure 10:
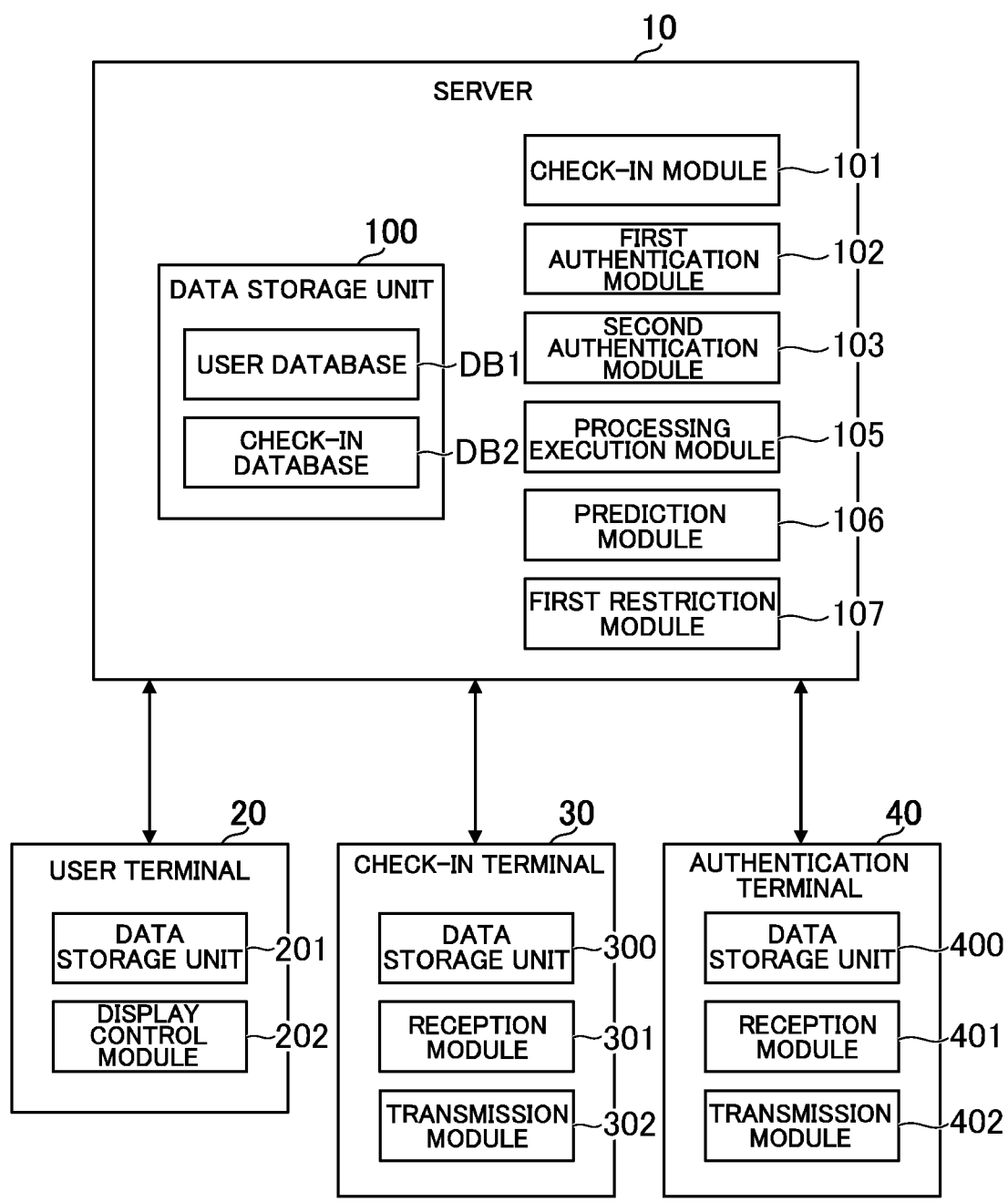
FIG. 10 is a function block diagram for illustrating an example of functions implemented in the authentication system of the second embodiment.

FIG. 10 is a function block diagram for illustrating an example of functions implemented in the authentication system S of the second embodiment. As illustrated in FIG. 10, the data storage unit 100, the check-in module 101, the first authentication module 102, the second authentication module 103, the processing execution module 105, a prediction module 106, and a first restriction module 107 are implemented on the server 10. The prediction module 106 and the first restriction module 107 are each implemented mainly by the control unit 11.

[Data Storage Unit]

The data storage unit 100 stores substantially the same data as in the first embodiment, but differs in the contents of the check-in database DB2 from the data storage unit 100 in the first embodiment. The data storage unit 100 may store a database pertaining to the first place P1 and the second place P2. This database stores first-place information about the first place P1 and second-place information about the second place P2. Locations of those places are identifiable by any type of information, for example, longitude-latitude information, an address, a postal code, or coordinate information, or a combination thereof. In the second embodiment, a case in which the first-place information is longitude-latitude information of the first place P1 and the second-place information is longitude-latitude information of the second place P2 is described.

FIG. 11 is a table for showing a data storage example of the check-in database DB2 in the second embodiment. In the second embodiment, a case of using a single check-in database DB2 to manage check-in at the first place P1 and check-in at the second place P2 is described. However, a separate check-in database DB2 may be used for each of management of check-in at the first place P1 and management of check-in at the second place P2. As shown in FIG. 11, the check-in database DB2 stores, for each of the first place P1 and the second place P2, a place ID, the user ID of the user U who has checked in, a check-in date/time, a predicted period, and a facial feature amount of the user U who is allowed to check in just by face authentication.

In the data storage example of FIG. 11, the first user U1 identified by the user ID "taro.yamada123" is checked in at the first place P1, which has a place ID "p00001." For the first place P1, "2021/06/10 13:00:41" is set as a predicted period within which the first user U1 can check in just by face authentication. This predicted period is 1 hour after a check-in date/time "2021/06/10 12:00:41" at which the second user U2 has most recently checked in at the second place P2. "Feature amount 1" shown in FIG. 11 is the facial feature amount of the first user U1. When the first user U1 checks in at the first place P1 just by face authentication, this "feature amount 1" is a facial feature amount that is the correct answer in the face authentication.

The second user U2 identified by the user ID "yoshida111jiro" is checked in at the second place P2, which has a place ID "p00002." For the second place P2, "2021/06/10 12:30:25" is set as a predicted period within which the second user U2 can check in just by face authentication. This predicted period is 1 hour after a check-in date/time "2021/06/10 11:30:25" at which the first user U1 has most recently checked in at the first place P1. "Feature amount 2" shown in FIG. 11 is the facial feature amount of the second user U2. When the second user U2 checks in at the second place P2 just by face authentication, this "feature amount 2" is a facial feature amount that is the correct answer in the face authentication.

[Check-In Module, First Authentication Module, and Second Authentication Module]

The check-in module 101, the first authentication module 102, and the second authentication module 103 are substantially the same as those in the first embodiment. However, face authentication performed by the first authentication module 102 and passcode authentication performed by the second authentication module 103 which are executed at the time of entrance to a room in the first embodiment are executed at the time of check-in in the second embodiment. How the face authentication and the passcode authentication are performed is as described in the first embodiment. Although a case in which a photographed image and a passcode are obtained from the authentication terminal 40 is described in the first embodiment, in the second embodiment, a photographed image and a passcode are obtained from the check-in terminal 30.

For example, in a case in which none of the first user U1 and the second user U2 has checked in at the first place P1 or the second place P2, the check-in module 101 executes check-in at the first place P1 for the first user U1. The check-in module 101 also executes check-in at the second place P2 for the second user U2. When a predicted period is set after check-in is completed for one user out of the first user U1 and the second user U2, check-in is executed by the processing execution module 105. In the second embodiment, check-in outside a predicted period is described as processing of the check-in module 101, and check-in within a predicted period is described as processing of the processing execution module 105.

For example, when the second user U2 is successfully authenticated by face authentication and passcode authentication via the check-in terminal 30 at the second place P2, the check-in module 101 stores the user ID and the check-in date/time of the second user U2 in the check-in database DB2. The check-in module 101 also stores a predicted period predicted by the prediction module 106 and the facial feature amount of the first user U1 that is stored in the user database DB1. The check-in module 101 may identify the first user U1 having facial features similar to facial features of the second user U2 who has checked in at the second place P2 out of every user U stored in the user database DB1, or, as described in the first embodiment, similarity between the second user U2 and the first user U1 in facial features may be stored in the user database DB1 in advance.

[Prediction Module]

The prediction module 106 predicts, based on at least one type of information out of second-time information about a second time at which the second user U2 who may possibly be authenticated as the first user U1 by face authentication has been present at or has arrived at the second place P2 and the second-place information about the second place P2, a predicted period in which the second user U2 is not expected to be present at or arrive at the first place P1. In the second embodiment, a case of predicting the predicted period based on both of the second-time information and the second-place information is described. However, the predicted period may be predicted based on one type of information out of the second-time information and the second-place information.

In the second embodiment, the second user U2 checks in at the second place P2, and the second time is accordingly a check-in date/time of check-in at the second place P2. The time here may refer to only a point in time, or only a date, instead of a date and a time. The time here may also refer to a time slot having a certain width. A check-in time of check-in at the second place P2 in the description can be read as the second time. When check-in at the second place P2 is not executed, a time at which the presence or arrival of the second user U2 at the second place P2 is detected in some manner is adequate as the second time. A method of this detection is described in the modification examples described later.

For example, the prediction module 106 obtains a distance between the first place P1 and the second place P2 based on the first-place information about the first place P1 and the second-place information, and predicts a predicted period based on the second-time information and a travel time derived from the distance. The travel time can be calculated with the use of a publicly known navigation algorithm. A normal travel speed is set down for each mode of travel, for example, on foot, by car, by bicycle, by train, or by bus. The prediction module 106 calculates the travel time based on this travel speed and the distance between the first place P1 and the second place P2. The prediction module 106 predicts, as the predicted period, a period from the second time indicated by the second-time information to a time reached upon elapse of the travel time.

The method of predicting the predicted period is not limited to the example described above. It is sufficient to predict the predicted period based on at least one type of information out of the second-time information and the second-place information. For example, the prediction module 106 may predict, as the predicted period, a period from the second time indicated by the second-time information to a time reached upon elapse of a predetermined length of time. In this case, the predicted period is obtained without the use of the second-place information. To give another example, the prediction module 106 may predict, as the predicted period, a period associated with the second-place information. In this case, the predicted period is obtained without the use of the second-time information.

In the second embodiment, when at least one type of information out of the second-time information and the second-place information is updated, the prediction module 106 updates the predicted period based on the at least one type of updated information out of the second-time information and the second-place information. The method of predicting the predicted period itself is the same as the method described above, except that the updated information is used. In the second embodiment, check-in at the second place P2 is executed, and the prediction module 106 accordingly predicts the predicted period when the second user U2 checks in at the second place P2.

[First Restriction Module]

The first restriction module 107 restricts execution of check-in based on face authentication once the predicted period elapses. In the second embodiment, check-in at the first place P1 corresponds to the first processing. Check-in at the first place P1 in the description of the second embodiment can accordingly be read as the first processing. The first processing in the first embodiment and the first processing in the second embodiment differ from each other in processing contents. However, also in the second embodiment, the unlocking processing described in the first embodiment may correspond to the first processing. The first processing can be any type of processing as described in the first embodiment.

The first restriction module 107 restricts execution of check-in based on face authentication by, for example, issuing a request for passcode authentication so that check-in is executed based on face authentication and passcode authentication. The method of restriction by the first restriction module 107 is not limited to the example of the second embodiment. For instance, the first restriction module 107 may restrict execution of check-in based on face authentication by issuing a request for another type of authentication, without executing face authentication. The another type of authentication may be the authentication using the user terminal 20 that is described in the first embodiment, or may be authentication with a higher authentication rate, such as fingerprint authentication or iris authentication. To give another example, the first restriction module 107 may restrict execution of check-in based on face authentication by requesting a superintendent of the office building to perform check-in face to face.

[Processing Execution Module]

The processing execution module 105 executes check-in at the first place P1 based on face authentication executed in the predicted period. When the face authentication executed in the predicted period is a success, the processing execution module 105 executes check-in at the first place P1. Once the predicted period elapses, the processing execution module 105 does not execute check-in at the first place P1 that is based solely on face authentication. Check-in in this case is executed by the check-in module 101, and additionally demands passcode authentication. Processing of check-in itself executed by the processing execution module 105 is the same as the processing of the check-in module 101.

2-3. Processing Executed by Authentication System of Second Embodiment

Figure 12:
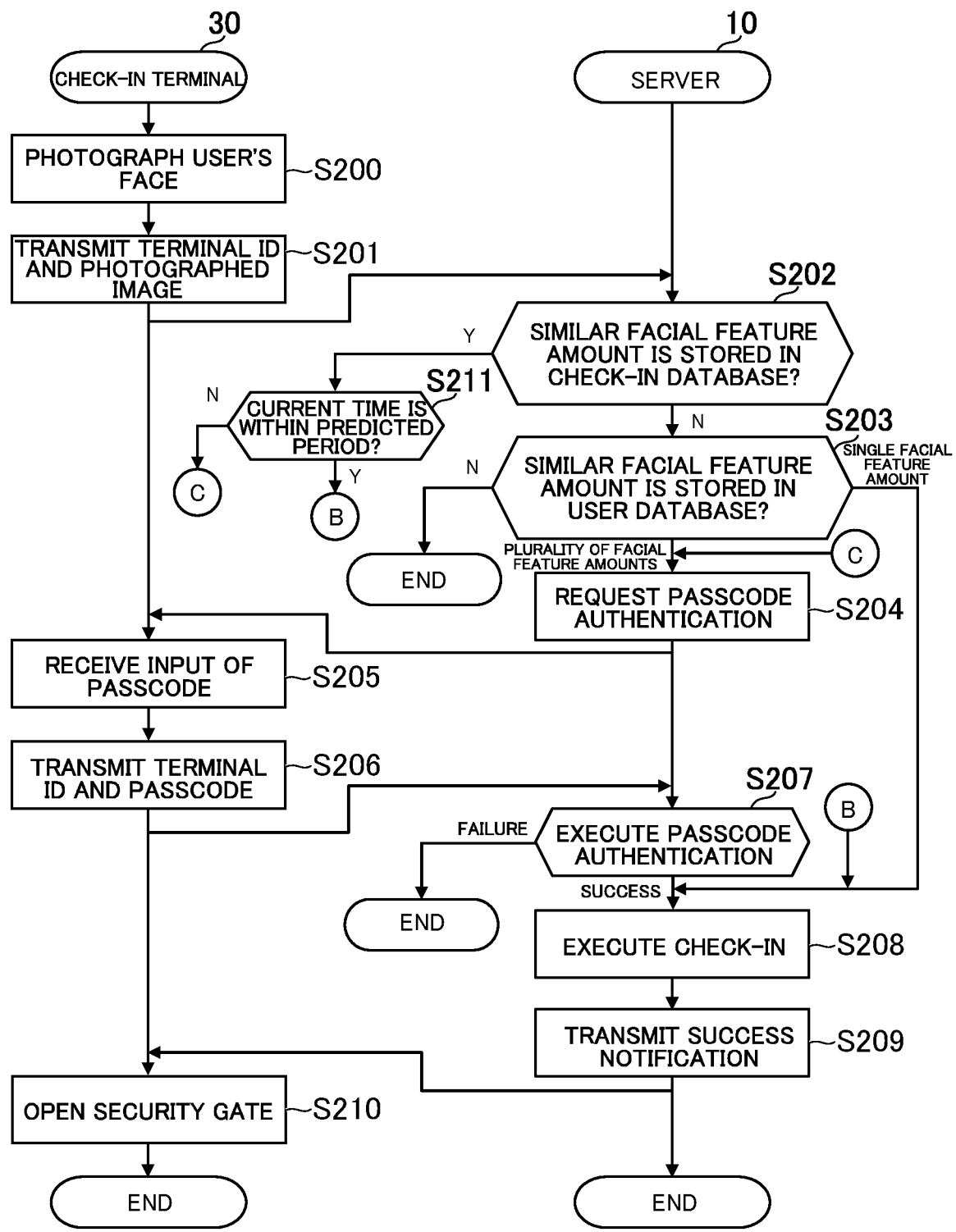
FIG. 12 is a flow chart for illustrating an example of processing executed by the authentication system of the second embodiment.

FIG. 12 is a flow chart for illustrating an example of processing executed by the authentication system S of the second embodiment. The processing illustrated in FIG. 12 is executed by the control units 11, 21, 31, and 41 operating in accordance with the programs stored in the storage units 12, 22, 32, and 42, respectively. The processing of FIG. 12 is an example of processing executed by the functional blocks illustrated in FIG. 10. It is assumed that the user U has completed the use registration prior to the execution of the processing of FIG. 12.

The first user U1 may check in at the second place P2 without checking in at the first place P1. The opposite is true for the second user U2 and the second user U2 may check in at the first place P1 without checking in at the second place P2. In FIG. 12, each of the first user U1 and the second user U2 is therefore simply referred to as "user U" without discrimination of one from another. This user U is a person who attempts to check in at one place out of the first place P1 and the second place P2. Similarly, each of the first place P1 and the second place P2 is simply referred to as "place P" without discrimination of one from another. This place P is a place at which the user U attempts to check in.

As illustrated in FIG. 12, when the user U is present at or arrives at one place P, the check-in terminal 30 at this place P uses the photographing unit 36 to photograph the face of the user U (Step S200). The check-in terminal 30 transmits to the server 10 its own terminal ID and a photographed image in which the face of the user U is photographed (Step S201). The server 10 receives the photographed image and the terminal ID, obtains a feature amount of the face photographed in the photographed image, and determines whether a facial feature amount similar to the facial feature amount obtained from the photographed image is stored in a record of the check-in database DB2 that holds a place ID associated with the received terminal ID (Step S202).

When it is determined that a similar facial feature amount is not stored (Step S202: N), the server 10 determines whether a facial feature amount similar to the facial feature amount obtained in Step S202 is stored in the user database DB1 (Step S203). When it is determined that a facial feature amount similar to the facial feature amount obtained in Step S202 is not stored (Step S203: "N"), a predetermined error message is displayed on the display unit 35 of the check-in terminal 30, and this processing is ended.

When it is determined in Step S203 that a plurality of facial feature amounts similar to the facial feature amount obtained in Step S202 are stored (Step S203: "plurality of facial feature amounts"), the server 10 issues a request for passcode authentication to the check-in terminal 30 (Step S204). The check-in terminal 30 receives the request for passcode authentication, and display a screen prompting input of a passcode on the display unit 45, and receives input of a passcode (Step S205). The check-in terminal 30 transmits the passcode input through the operating unit 34 and its own terminal ID to the server 10 (Step S206).

The server 10 receives the passcode and the terminal ID, and executes the passcode authentication (Step S207). In Step S207, the server 10 refers to the user database DB1 to obtain a passcode stored in the record for which the face authentication has been a success in Step S203. The server determines whether the obtained passcode and the passcode received from the check-in terminal 30 match. When the passcodes match, the passcode authentication is a success.

When the passcode authentication is a success (Step S207: "success"), the server 10 executes check-in (Step S208), and transmits a success notification indicating that the authentication has succeeded to the check-in terminal 30 (Step S209). The check-in terminal 30 receives the success notification and executes processing for opening the security gate G (Step S210), and this processing is ended. In Step S210, output of a signal for opening the security gate G, or the like, is executed. The user U having successfully been authenticated by the face authentication and the passcode authentication is allowed to enter a room. When the passcode authentication is a failure (Step S207: "failure"), a predetermined error message is displayed on the display unit 35 of the check-in terminal 30, and this processing is ended.

When it is determined in Step S202 that a similar facial feature amount is stored (Step S202: "Y"), the server 10 determines whether the current time is within the predicted period (Step S211). When it is determined that the current time is outside the predicted period (Step S211: "N"), the process proceeds to Step S204 and passcode authentication is executed. That is, passcode authentication is demanded because the predicted period has elapsed. When it is determined that the current time is within the predicted period (Step S211: "Y"), the process proceeds to Step S208 and check-in is executed. That is, check-in just by face authentication is executed.

According to the authentication system S of the second embodiment, a predicted period in which the second user U2 is not expected to be present at or arrive at the first place P1 is predicted based on at least one type of information out of the second-time information about the second time at which the second user U2 has been present at or has arrived at the second place P2 and the second-place information about the second place P2, and check-in at the first place P1 is executed based on the first authentication executed within the predicted period. This prevents a situation in which distinction between the first user U1 and the second user U2 is impossible, to thereby execute foolproof identity confirmation and consequently enhance security. For example, check-in of the second user U2 impersonating the first user U1 can be prevented. The first user U1 can check in just by face authentication as long as the checking in takes place within the predicted period, and hence convenience for the first user U1 is raised. In addition, with execution of passcode authentication unrequired, processing load on the authentication system S can be lightened in this case.

The authentication system S can also predict the predicted period with precision by obtaining the distance between the first place P1 and the second place P2 based on the first-place information about the first place P1 and the second-place information, and predicting the predicted period based on the second-time information and a travel time that is derived from the distance. Prediction of the accurate predicted period even more reliably prevents the situation in which distinction between the first user U1 and the second user U2 is impossible, to thereby execute foolproof identity confirmation and consequently enhance security.

When at least one type of information out of the second-time information and the second-place information is updated, the authentication system S updates the predicted period based on the at least one type of updated information out of the second-time information and the second-place information. The predicted period can thus be revised based on the latest information. As a result, the predicted period during which the first user U1 can check in just by face authentication is extended, and convenience is accordingly raised for the first user U1.

The authentication system S also restricts check-in at the first place P1 based on face authentication when the predicted period elapses. In this manner, check-in of the first user U1 by face authentication alone is prohibited when the current time is within a period in which the second user U2 may arrive at the first place P1, to thereby prevent the situation in which distinction between the first user U1 and the second user U2 is impossible. Foolproof identity confirmation is thus executed and security is consequently enhanced. For example, check-in of the second user U2 impersonating the first user U1 can be prevented. An opposite case in which the first user U1 impersonating the second user U2 checks in is also preventable.

The authentication system S also accomplishes accurate prediction of the predicted period through definite detection of the presence or arrival of the second user U2 at the second place P2 by predicting the predicted period when the second user U2 checks in at the second place P2. The prediction of the accurate predicted period more reliably prevents the situation in which distinction between the first user U1 and the second user U2 is impossible, to thereby execute foolproof identity confirmation and consequently enhance security.

3. Third Embodiment

The authentication system S of a third embodiment of the present disclosure is described next. In the first embodiment and the second embodiment, a case in which the arrival of the second user U2 at the first place P1 or the second place P2 is detected by check-in of the second user U2 is described. However, in a case in which the first user U1 and the second user U2 each make some reservation or in similar cases, a place and a time at which the first user U1 or the second user U2 is going to be present or arrive can be known in advance. Thus, the third embodiment gives a description on a case of allowing the first user U1 to check in at the first place P1 just by face authentication when it is known in advance that the second user U2 does not check in at the first place P1 at a scheduled date or a scheduled date/time at which the first user U1 is scheduled to check in at the first place P1. In the third embodiment, descriptions on what are common between the third embodiment and the first and second embodiments are omitted.

3-1. Outline of Authentication System of Third Embodiment

FIG. 13 is a diagram for illustrating an example of the authentication system S of the third embodiment. In the third embodiment, it is assumed that seminars are held at predetermined dates/times in the office building located at the first place P1, and the first user U1 and the second user U2 each have reserved a seat at one of the seminars. In this case, the authentication system S can figure out, in advance, for each of the first user U1 and the second user U2, when the user is to arrive at the first place P1. The authentication system S can further figure out in advance that the first user U1 and the second user U2 resemble each other in facial features in a case in which the first user U1 and the second user U2 have finished the use registration of the check-in service.

In the third embodiment, the authentication system S allows the first user U1 to check in at the first place P1 just by face authentication, unless the first user U1 and the second user U2 have reserved seats at the same seminar or seminars held at the same date and time. Similarly, the authentication system S allows the second user U2 to check in at the second place P2 just by face authentication. An example in which the first user U1 has reserved a seat at a seminar to be held at 14:00 on Jun. 10, 2021, and the second user U2 has reserved a seat at a seminar to be held at 11:00 on Jun. 12, 2021 is discussed. In this case, the first user U1 and the second user U2 each visit the first place P1 at different dates/times, and are accordingly allowed to check in just by face authentication.

As another example, in a case in which the first user U1 has reserved a seat at a seminar to be held at 14:00 on Jun. 10, 2021, and the second user U2 has reserved a seat at the seminar to be held at 14:00 on Jun. 10, 2021 as well, the first user U1 and the second user U2 each visit the first place P1 at the same or substantially the same date/time. In this case, check-in just by face authentication is not available to the first user U1 and the second user U2, and passcode authentication is additionally demanded. The flow of steps of check-in using face authentication and passcode authentication is as described in the second embodiment.

As described above, the authentication system S of the third embodiment allows check-in at the first place P1 just by face authentication when it is determined that the first user U1 and the second user U2 are not going to be present or arrive at the first place P1 at the same or substantially the same date/time. This raises convenience for the first user U1 as well as enhancing security. Details of the third embodiment are described below.

3-2. Functions Implemented in Authentication System of Third Embodiment

Figure 14:
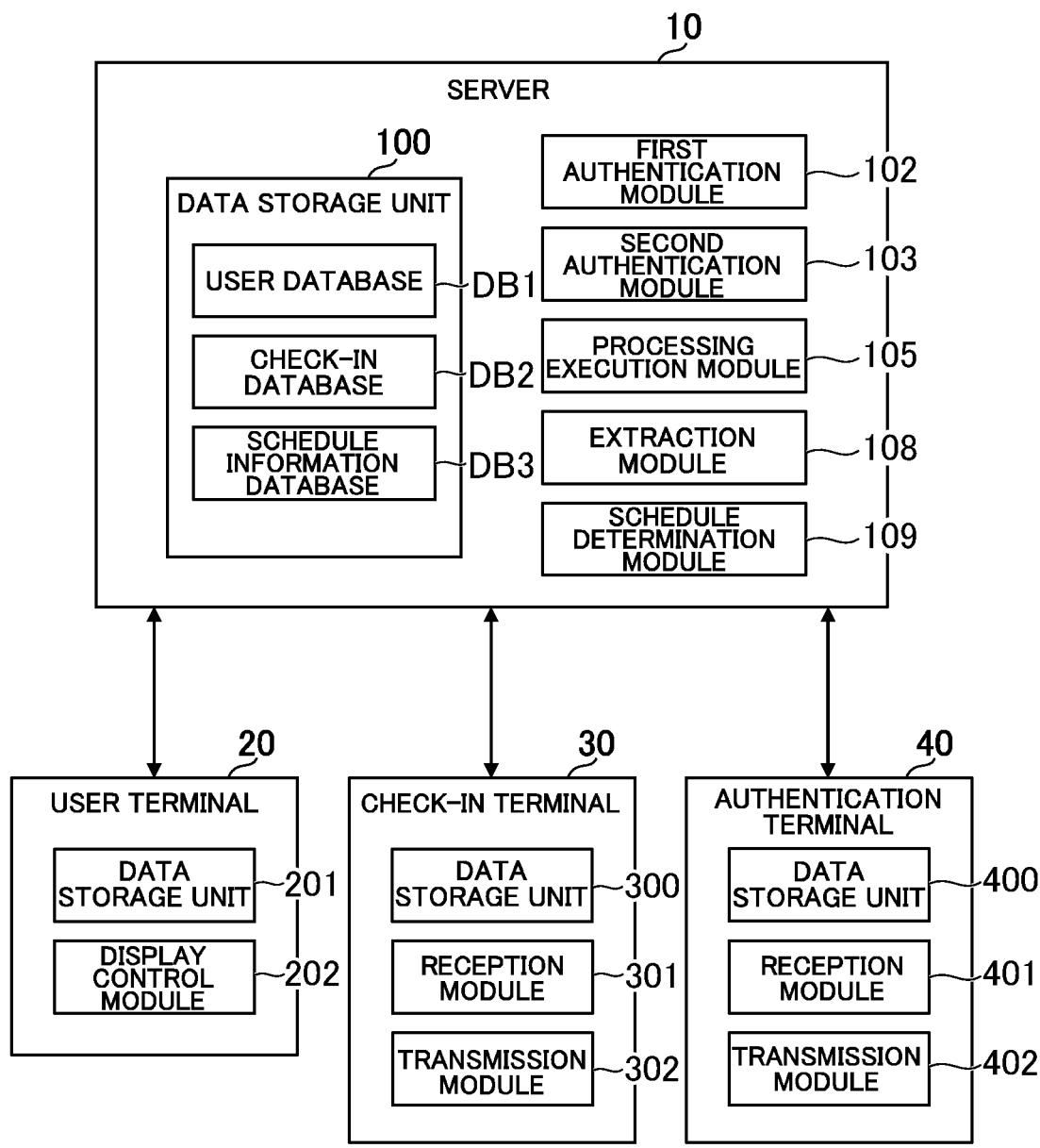
FIG. 14 is a function block diagram for illustrating an example of functions implemented in the authentication system of the third embodiment.

FIG. 14 is a function block diagram for illustrating an example of functions implemented in the authentication system S of the third embodiment. As illustrated in FIG. 14, the data storage unit 100, the first authentication module 102, the second authentication module 103, the processing execution module 105, an extraction module 108, and a schedule determination module 109 are implemented on the server 10. The extraction module 108 and the schedule determination module 109 are each implemented mainly by the control unit 11.

[Data Storage Unit]

The data storage unit stores substantially the same data as in the first embodiment and the second embodiment, but stores, as additional data, a schedule information database DB3. FIG. 15 is a table for showing a data storage example of the schedule information database DB3. As shown in FIG. 15, the schedule information database DB3 is a database storing schedule information about scheduled visits to the first place P1. For example, the schedule information database DB3 stores a scheduled date or a scheduled date/time of a seminar, a user ID and a full name of the user U scheduled to attend the seminar, a passcode authentication flag, a facial feature amount, and a passcode. The passcode authentication flag is as described in the first embodiment. In the third embodiment, the scheduled date or the scheduled date/time of a seminar is a scheduled date or a scheduled date/time at which the user U who has reserved a seat at this seminar is scheduled to be present at or arrive at the first place P1. In a case of a seminar held once on one day, a scheduled date indicating just a date without a time may be used.

When reservation made by the user U for a seminar is received, the server 10 adds a new record to the schedule information database DB3. The user U specifies a scheduled date or a scheduled date/time at which the user U is to attend the seminar. The server 10 stores the scheduled date or the scheduled date/time of the seminar specified by the user U, a user ID and a full name of this user U, the passcode authentication flag, a facial feature amount, and a passcode. The passcode authentication flag is "1" in a case in which another user U who has similar facial features has reserved a seat at the same seminar or a seminar to be held at the same scheduled date or the same scheduled date/time. The passcode authentication flag in this case is set to "1" for the another user U as well. In the case of the user U for whom the passcode authentication flag is "0", a passcode is not required to be stored in the schedule information database DB3. Those processing steps are executed by the extraction module 108 or the schedule determination module 109 described later.

[Extraction Module]

In the second embodiment, at a first scheduled date or a first scheduled date/time, a plurality of users including the first user U1 are scheduled to be present at or arrive at the first place P1, and the extraction module 108 extracts facial feature amounts of the plurality of users in advance from the user database DB1. The extraction module 108 stores, in the schedule information database DB3, the facial feature amounts and passcodes extracted from the user database DB1. Although a case in which the extraction module 108 extracts passcodes as well as facial feature amounts from the user database DB1 and stores the passcodes and the facial feature amounts in the schedule information database DB3 is described in the second embodiment, passcodes are not particularly required to be extracted.

[First Authentication Module and Second Authentication Module]

The first authentication module 102 and the second authentication module 103 are substantially the same as in the first embodiment and the second embodiment. In the second embodiment, however, the first authentication module 102 executes face authentication for each of more than one user U based on authentication information of each of more than one user U that is extracted from the user database DB1. When executing the face authentication, the first authentication module 102 may refer to the user database, but, in that case, there are many facial feature amounts to compare. The first authentication module 102 therefore refers to the schedule information database DB3 to execute the face authentication. The schedule information database DB3 stores only a facial feature amount of each user U scheduled to be present at or arrive at the scheduled date or the scheduled date/time of the seminar, and there are accordingly fewer facial feature amounts to compare in the face authentication.

[Schedule Determination Module]

The schedule determination module 109 determines, based on the schedule information about scheduled visits to the first place P1, whether the second user U2 who may possibly be authenticated as the first user U1 in the first authentication is going to be present at, or whether the second user U2 is going to arrive at, the first place P1 at the first scheduled date or the first scheduled date/time at which the first user U1 is scheduled to be present at or arrive at the first place P1. For example, in a case in which the first user U1 makes a reservation for a seminar after the second user U2, and specifies the first scheduled date or the first scheduled date/time in the reservation for the seminar, the schedule determination module 109 refers to the schedule information database DB3 to determine whether the second user U2 who has similar facial features has made a reservation for the same date or date/time.

In a case in which the second user U2 makes a reservation for a seminar after the first user U1, the schedule determination module 109 refers to the schedule information database DB3 when the second user U2 makes the reservation for the seminar, and determines whether a date or a date/time specified by the second user U2 is the first scheduled date or the first scheduled date/time for which the second user U2 who has similar facial features has made a reservation. The schedule determination module 109 determines the value of the passcode authentication flag in the schedule information database DB3 based on results of those determination processes. When it is determined that the second user U2 is going to be present at or arrive at the first place P1 at the first scheduled date or the first scheduled date/time, the passcode authentication flag is "1". When it is determined that the second user U2 is not going to be present at or arrive at the first place P1 at the first scheduled date or the first scheduled date/time, the passcode authentication flag is "0".

[Processing Execution Module]

The processing execution module 105 executes processing for checking in at the first place P1 based on face authentication, when it is determined that the second user U2 is not going to be present at or arrive at the first place P1 at the first scheduled date or the first scheduled date/time. In the third embodiment, the processing for checking in at the first place P1 is an example of the first processing concerning the first user U1. Thus, the processing for checking in at the first place P1 in the description can be read as the first processing. How processing of check-in is executed is as described in the first embodiment and the second embodiment. A record associated with the user U who has checked in is created in the check-in database DB2. Information indicating whether check-in has been completed may be stored in the schedule information database DB3. In this case, check-in is executed by updating this information.

For example, when it is determined that the second user U2 is going to be present at or arrive at the first place P1 at the first scheduled date or the first scheduled date/time, the processing execution module 105 executes check-in at the first place P1 based on face authentication and passcode authentication. The first user U1 and the second user U2 can each check in at the first place P1, the first authentication is biometric authentication, and the schedule information is information about scheduled check-in at the first place P1. The second user U2 is the user U who is similar to the first user U1 in terms of biometric information used in the biometric authentication.

3-3. Processing Executed by Authentication System of Third Embodiment

Figure 16:
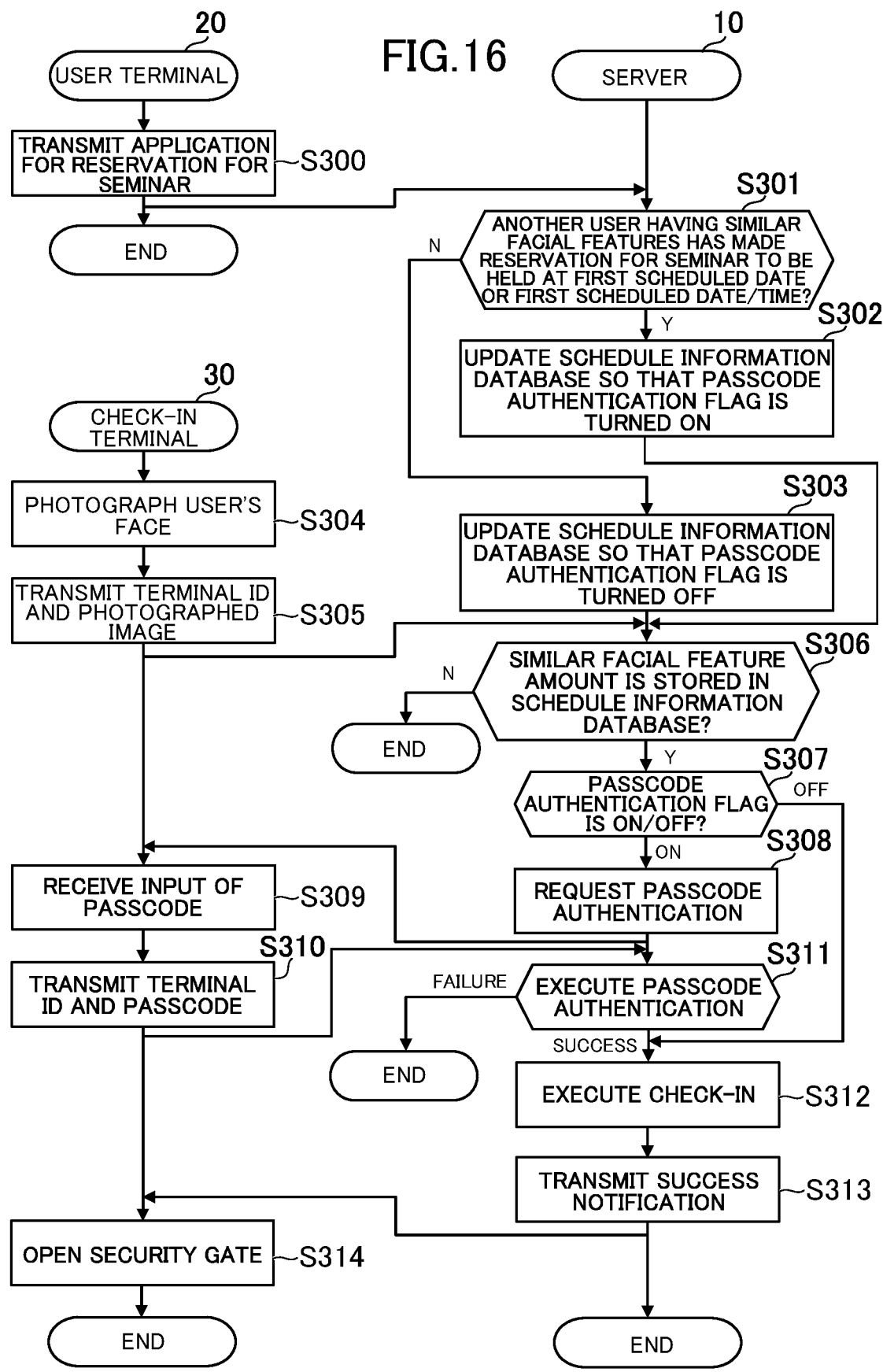
FIG. 16 is a flow chart for illustrating an example of processing executed by the authentication system of the third embodiment.

FIG. 16 is a flow chart for illustrating an example of processing executed by the authentication system S of the third embodiment. The processing illustrated in FIG. 16 is executed by the control units 11, 21, 31, and 41 operating in accordance with the programs stored in the storage units 12, 22, 32, and 42, respectively. The processing of FIG. 16 is an example of processing executed by the functional blocks illustrated in FIG. 14. It is assumed that the user U has completed the use registration prior to the execution of the processing of FIG. 16.

As illustrated in FIG. 16, when the user U performs, via the operating unit 24, operation for making a reservation for a seminar to be held at the first place P1, the user terminal 20 transmits a reservation application for the seminar to the server 10 (Step S300). In Step S300, the user U specifies, as the first scheduled date or the first scheduled date/time, a date or a date/time of the seminar to be attended by the user U out of a plurality of candidate dates or candidate dates/times. The reservation application includes the first scheduled date or the first scheduled date/time specified by the user U.

The server 10 receives the reservation application, and determines, based on the schedule information database DB3, whether another user U who has similar facial features has made a reservation for a seminar to be held at the first scheduled date or the first scheduled date/time (Step S301). When it is determined that another user U who has similar facial features has made a reservation for a seminar to be held at the first scheduled date or the first scheduled date/time (Step S301: "Y"), the server 10 updates the schedule information database based on the user database DB1 so that the passcode authentication flag is turned on (Step S302). In Step S302, the server 10 obtains a facial feature amount and a passcode of each of the user U who has submitted the reservation application and the another user U who has similar facial features. The server 10 stores the facial feature amount and the passcode in a record associated with the user U or the another user U, and turns the passcode authentication flag on.

When it is determined that another user who has similar facial features has not made a reservation for a seminar to be held at the first scheduled date or the first scheduled date/time (Step S301: "N"), the server 10 updates the schedule information database based on the user database DB1 so that the passcode authentication flag is turned off (Step S303). In Step S302, the server 10 obtains a facial feature amount of the user U who has submitted the reservation application. The server 10 stores the facial feature amount in a record associated with this user U, and turns the passcode authentication flag off.

Through the processing described above, reservation for a seminar by the user U is completed. When the date/time of the seminar for which the user U has made a reservation approaches, the user U travels to the first place P1. When the user U is present at or arrives at the first place P1, the user U has the photographing unit 36 of the check-in terminal 30 photograph his or her face (Step S304). Processing in a subsequent step, which is Step S305, is the same as the processing in Step S201. The server 10 receives the terminal ID and the photographed image, obtains a facial feature amount based on the photographed image, and determines whether a similar facial feature amount is stored in the schedule information database (Step S306). The determination in Step S306 is executed for pieces of schedule information about seminars that have a scheduled date or a scheduled date/time close to the current date/time, out of pieces of schedule information stored in the schedule information database DB3.

When it is determined that a similar facial feature amount is stored (Step S306: "Y"), the server 10 refers to the passcode authentication flag in a record for which face authentication has been a success, based on the schedule information database DB3 (Step S307). When the passcode authentication flag is "on" (Step S307: "on"), processing in subsequent steps of from Step S308 to Step S314 is the same as the processing steps of from Step S204 to Step S210, and passcode authentication is executed. When the passcode authentication is a success, the security gate G is opened. When the passcode authentication flag is "off" (Step S307: off), the process proceeds to Step S312. In this case, passcode authentication is not executed, and check-in just by face authentication is allowed.

According to the authentication system S of the third embodiment, when it is determined that the second user U2 is not going to be present at or arrive at the first place P1 at the first scheduled date or the first scheduled date/time, processing for checking the first user U1 in at the first place P1 based on face authentication. This prevents a situation in which distinction between the first user U1 and the second user U2 is impossible, to thereby execute foolproof identity confirmation and consequently enhance security. For example, when it is determined that the second user U2 is not going to be present at or arrive at the first place P1, it is highly likely that the second user U2 is not going to attempt to check in at the first place P1 to begin with, and prevention of check-in of the second user U2 impersonating the first user U1 is therefore accomplished even when the first user U1 is allowed to check in just by face authentication. Convenience is raised for the first user U1 who is allowed to check in just by face authentication when it is determined that the second user U2 is not going to be present at or arrive at the first place U1. In addition, with execution of passcode authentication unrequired, processing load on the authentication system S can be lightened in this case.

When it is determined that the second user U2 is going to be present at or arrive at the first place P1 at the first scheduled date or the first scheduled date/time, the authentication system S executes processing for checking the first user U1 in at the first place P1 based on face authentication and passcode authentication. This ensures that foolproof identity confirmation is executed through passcode authentication even in a situation in which distinction between the first user U1 and the second user U2 is impossible, and consequently enhances security.

When the first scheduled date or the first scheduled date/time arrives or approaches, the authentication system S extracts a facial feature amount of each of more than one user U from the user database DB1 in advance, and executes face authentication for each of more than one user U based on the facial feature amount of each of more than one user U extracted from the user database DB1. In this way, there are fewer facial feature amounts to compare in face authentication, and processing load on the server 10 can accordingly be lightened. This also leads to quick completion of face authentication.

The second user U2 is the user U who resembles the first user U1 in facial feature amount used in face authentication, and the authentication system S executes processing for checking the second user U2 in at the first place P1 by face authentication. This enhances security in check-in at the first place P1.

4. Modification Examples

The present disclosure is not limited to the embodiments described above, and can be modified suitably without departing from the spirit of the present disclosure.

4-1. Modification Examples of First Embodiment

Figure 17:
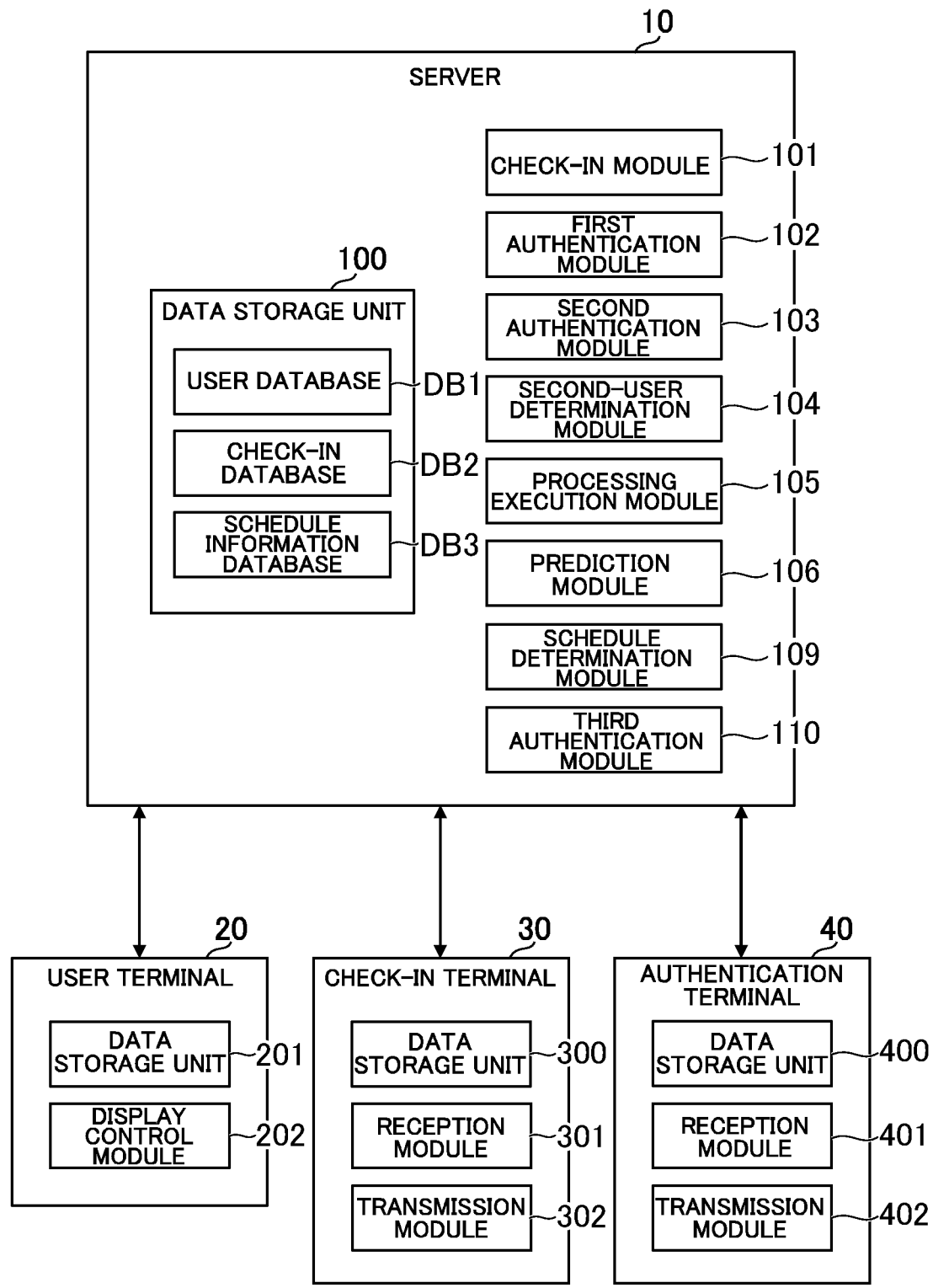
FIG. 17 is an example of a function block diagram in modification examples of the first embodiment.

Modification examples of the first embodiment are described. FIG. 17 is an example of a function block diagram in the modification examples of the first embodiment. As illustrated in FIG. 17, in the modification examples of the first embodiment, the prediction module 106, the schedule determination module 109, and a third authentication module 110 are implemented in addition to the functions described in the first embodiment with reference to FIG. 4. The third authentication module 110 is implemented mainly by the control unit 11. Descriptions of the prediction module 106 and the schedule determination module 109 focus on differences from the descriptions given in the second embodiment and the third embodiment.

Modification Example 1-1

For example, the authentication system S is applicable to any service. The modification examples of the first embodiment described below take as an example a case in which the authentication system S is applied to an electronic payment service. The same applies to modification examples of the second embodiment. The electronic payment service is a service that provides electronic payment with the use of payment means of the user U. Any type of payment means, for example, credit cards, debit cards, electronic money, electronic cash, reward points, bank accounts, wallets, and virtual currency, or combinations thereof, may be usable by the user U.

For example, an application of the electronic payment service (hereinafter referred to as "electronic payment app") is installed in the user terminal 20. The user U activates the electronic payment app on the user terminal 20 to display the same code C as the one in the first embodiment. The code C for check-in and the code C for electronic payment may differ from each other. In Modification Example 1-1, this code C is usable not only for check-in at a predetermined place but also for electronic payment. A publicly known method is employable as a method of payment using the code C.

Payment information about payment means of the user U is registered in the user database DB1, and electronic payment is executed based on a piece of payment information that is associated with a code ID. It suffices that the payment information includes information suited to the payment means, for example, a credit card number, a debit card number, an electronic money ID, an electronic cash ID, a reward point ID, bank account information, wallet information, or a virtual currency ID. Payment using a barcode and payment using a two-dimensional code are sometimes called barcode payment and two-dimensional code payment, respectively, and those codes are therefore types of payment means as well.

FIG. 18 is a diagram for illustrating an example of the authentication system S of Modification Example 1-1. As illustrated in FIG. 18, Modification Example 1-1 takes as an example a case in which the first user U1 and the second user U2 separately check in to a baseball stadium or a similar stadium. It is assumed that the first user U1 and the second user U2 each have purchased a ticket for a game in advance. It is also assumed that the code C doubles as an electronic ticket in addition to being a code for executing electronic payment. Various publicly known electronic tickets are usable as the electronic ticket. It is also assumed that the server stores an electronic ticket ID by which the electronic ticket is identifiable, and the electronic ticket ID is included in the code C as well.

As illustrated in FIG. 18, at least one check-in terminal 30 is placed at an entrance to the stadium. For example, the first user U1 checks in to the stadium by presenting display of the code C on the user terminal 20 to the check-in terminal 30. The flow of steps of this check-in can use the flow of steps of check-in with a publicly known electronic ticket. When completing check-in to the stadium, the first user U1 enters the inside of the stadium from the entrance. Check-in using the user terminal 20 enables the server 10 to FIG. out that the first user U1, not the second user U2, has checked in. The server 10 updates the check-in database DB2 so that a facial feature amount of the first user U1, a passcode, and other types of information are stored in the same manner as in the first embodiment.

Once the user U1 has checked in to the stadium, electronic payment by face authentication becomes available to the first user U1 inside the stadium. The authentication terminal 40 is placed at a shop inside the stadium. When using electronic payment by face authentication, the first user U1 has a photographing unit 46 of the authentication terminal 40 photograph his or her face. The authentication terminal 40 transmits a photographed image to the server 10. The server 10 executes face authentication in the same manner as in the first embodiment. That is, for this face authentication, the check-in database DB2 instead of the user database DB1 is referred to. At this point, the second user U2 has not checked in to the stadium, and there is accordingly no risk of occurrence of a situation in which distinction between the first user U1 and the second user U2 is impossible. The terminal ID or the like may be used to determine whether the payment processing is being executed in a shop inside the stadium.

When the first user U1 is successfully authenticated by face authentication, the server 10 executes payment processing based on the payment information of the first user U1 stored in the user database DB1. In Modification Example 1-1, the payment processing using the payment information of the first user U1 is the first processing. The same applies to Modification Examples 1-2 to 1-8 described below. Publicly known processing is usable for the payment processing itself. For example, when a credit card is used as the payment means, credit processing or the like is executed. When electronic money is used as the payment means, processing of subtracting from the balance of the electronic money is executed. When another type of payment means is used, processing suitable for that type of payment means is executed.

In Modification Example 1-1, as a general rule, the electronic payment service by face authentication cannot be used at a shop outside the stadium. The first user U1 can use the electronic payment service by face authentication on the premises of the stadium to which the first user U1 has checked in with the use of the user terminal 20. Inside the stadium, the first user U1 may use the electronic payment service with the use of the code C displayed on the user terminal 20, instead of face authentication. To give another example, the first user U1 may use the electronic payment service with the use of the IC chip 27 of the user terminal 20.

As illustrated in FIG. 18, the second user U2 checks in to the stadium by displaying the code C on his or her user terminal 20 and presenting the display of the code C to the check-in terminal 30. With both of the first user U1 and the second user U2 present inside the stadium in this case, the server 10 cannot distinguish the first user U1 and the second user U2 from each other. The processing execution module 105 accordingly executes the payment processing based on face authentication and passcode authentication. The flow of processing to be followed when those two types of authentication are executed is as described in the first embodiment.

For example, when the first user U1 is successfully authenticated by face authentication and passcode authentication on the authentication terminal 40 at a shop inside the stadium, the processing execution module 105 executes the payment processing based on the payment information of the first user U1. Similarly, when the second user U2 is successfully authenticated by face authentication and passcode authentication on the authentication terminal 40 at a shop inside the stadium, the processing execution module 105 executes the payment processing based on the payment information of the second user U2.

After the second user U2 checks out of the stadium, the first user U1 can again use the electronic payment service by passing just face authentication. The flow of steps of check-out is the same as in the first embodiment, and check-out is executed by presenting display of the code C to the check-in terminal 30 at the entrance to the stadium. Similarly, after the first user U1 checks out of the stadium, the second user U2 can use the electronic payment service by passing just face authentication.

The authentication system S is applicable to an electronic payment service at any facility other than a stadium. The authentication system S is also applicable to an electronic service at a facility, for example, a shopping mall, a lodging facility, an amusement park, a sight-seeing facility, a supermarket, a convenience store, a restaurant, a day-spa facility, an event venue, or a department store. To give another example, the authentication system S is also applicable to an electronic payment service at a site of no particular facility, such as an outdoor event site. In still another example, instead of permitting payment processing that uses just face authentication at one particular first place P1, the payment processing that uses just face authentication may be permitted at the first place P1 discretionarily selected out of more than one first place P1.

FIG. 19 is a diagram for illustrating another example of the authentication system S of Modification Example 1-1. As illustrated in FIG. 19, a restaurant is located at each of more than one first place P1, and the authentication system S is also applicable to an event hosted by those restaurants in cooperation with one another. For example, this event is a beer tasting event or a flower viewing event, and a reservation is required to participate in this event. This reservation may be made in the same manner as the method of the reservation described in the third embodiment. It is assumed that the server 10 stores the schedule information database DB3 holding information about the user U who has made a reservation for the event. At least one terminal out of the check-in terminal 30 and the authentication terminal 40 is placed at the restaurant at each first place P1. The check-in terminal 30 and the authentication terminal 40 may be a POS terminal of the restaurant.

The server 10 refers to the schedule information database DB3 to determine, for each of the first user U1 and the second user U2, whether the user has made a reservation for the event. An example in which the first user U1 has made a reservation for the event and the second user U2 has not made a reservation for the event is discussed. In this case, it is predicted that the second user U2 is not going to appear at the first place P1, and the first user U1 can accordingly use the electronic payment service by passing just face authentication at the restaurant at each first place P1. Even when this is the case, the first user U1 may check in to the event with the use of the user terminal 20 when using the electronic payment service for the first time after arrival at the event. This check-in may be executed by presenting display of the code C to the check-in terminal 30 or the authentication terminal 40 that is placed at the restaurant at the first place P1 visited by the first user U1, or by other methods.

As another example, in a case in which the first user U1 has made a reservation for the event and the second user U2 has also made a reservation for the event, the second user U2 is going to appear at the first place P1. The first user U1 and the second user U2 are accordingly required to pass face authentication and passcode authentication to use the electronic payment service at the restaurant at each first place P1. After one user out of the first user U1 and the second user U2 checks out of the event, the remaining user may be allowed to use the electronic payment service by passing just face authentication.

According to Modification Example 1-1, security is enhanced for a case in which payment processing is executed by using face authentication. For example, even when the first user U1 and the second user U2 both check in to a stadium or an event, distinction between the first user U1 and the second user U2 is accomplished by passcode authentication, and execution of fraudulent payment processing by impersonation can accordingly be prevented.

Modification Example 1-2

For example, when it is determined that the second user U2 is present at or has arrived at the first place P1, the processing execution module 105 may execute payment processing based not on face authentication but on passcode authentication. In this case, execution of face authentication may be omitted, or execution of face authentication may be included without using a result of the execution of face authentication as a condition for determining whether to execute payment processing. However, there is a case in which one user U and another user U who do not resemble each other in facial features have the same passcode, and passcode authentication in Modification Example 1-2 therefore uses user IDs as well. When it is determined that the second user U2 is present at or has arrived at the first place P1, the processing execution module 105 executes payment processing based on passcode authentication that uses a user ID and a passcode, instead of face authentication.

For example, in the case of the example of FIG. 18, the authentication terminal 40 inside the stadium receives input of a user ID and a passcode. The authentication terminal 40 transmits the input user ID and passcode to the server 10. The server 10 receives the user ID and the passcode, and determines whether a combination of the received user ID and passcode is found in the user database DB1. When this combination is found, the passcode authentication is a success. When this combination is not found, the passcode authentication is a failure.

As described in the first embodiment, face authentication is an example of the first authentication. Passcode authentication is an example of the second authentication. Any combination of authentication types can be used as a combination of the first authentication and the second authentication. For example, the first authentication may be face authentication and the second authentication may be fingerprint authentication or iris authentication. To give another example, the first authentication may be face authentication and the second authentication may be authentication using the code C of the user terminal 20, such as the one described in the first embodiment.

According to Modification Example 1-2, when it is determined that the second user U2 is present at or has arrived at the first place P1, payment processing is executed based on passcode authentication instead of face authentication. This ensures that foolproof identity confirmation is executed through passcode authentication even in a situation in which distinction is impossible between the first user U1 and the second user U2 who are both inside the stadium of FIG. 18, and consequently enhances security.

Modification Example 1-3

For example, the authentication system S may further include the schedule determination module 109 for determining, based on schedule information about scheduled check-in at the first place P1, whether the second user U2 is scheduled to check in at the first place P1 at the first scheduled date or the first scheduled date/time at which the first user U1 is to check in at the first place P1. Processing of the schedule determination module 109 is as described in the third embodiment. An example in which, prior to arrival at the first place P1, the first user U1 and the second user U2 each have made a reservation for a game at the stadium described with reference to FIG. 18, the event described with reference to FIG. 19, or the like is discussed. The schedule information database DB3 stores schedule information indicating, for each of the first user U1 and the second user U2, whether the user is scheduled to arrive at the first place P1. In a case in which arrival at the first place P1 is scheduled, the schedule information also includes a scheduled date or a scheduled date/time of the arrival.

When it is determined that the second user U2 is not scheduled to check in at the first place P1 at the first scheduled date or the first scheduled date/time, the check-in module 101 checks the first user U1 in at the first place P1 based on face authentication. Processing of the check-in module 101 is the same as the processing of the processing execution module 105 described in the third embodiment. This processing may be executed as processing of the processing execution module 105 in Modification Example 1-3 as well. That is, the processing execution module 105 may include the function of the check-in module 101. For example, in the case of the example of FIG. 18, when it is determined that the second user U2 is not scheduled to check in at the stadium, the first user U1 can check in just by face authentication on the check-in terminal 30 at the entrance to the stadium. Similarly, when check-in is executed at a restaurant at the first place P1 in the example of FIG. 19, just face authentication is required to check in.

According to Modification Example 1-2, when it is determined that the second user U2 is not scheduled to check in at the first place P1 at the first scheduled date or the first scheduled date/time, the first user U1 is checked in at the first place P1 based on face authentication. This prevents a situation in which distinction between the first user U1 and the second user U2 is impossible, to thereby execute foolproof identity confirmation and consequently enhance security. For example, when it is determined that the second user U2 is not going to be present at or arrive at the first place P1, it is highly likely that the second user U2 is not going to attempt to check in at the first place P1 to begin with, and prevention of check-in of the second user U2 impersonating the first user U1 is therefore accomplished even when the first user U1 is allowed to check in just by face authentication. Convenience is raised for the first user U1 who is allowed to check in just by face authentication when it is determined that the second user U2 is not going to be present at or arrive at the first place U1. In addition, with execution of passcode authentication unrequired, processing load on the authentication system S can be lightened in this case.

Modification Example 1-4

Although a case in which the first place P1 is a place at which the first user U1 checks in is described in the first embodiment, the first place P1 may be, for example, a place at which the first user U1 uses an electronic payment service.

An example in which the first user U1 uses a paper ticket to enter the stadium of the example of FIG. 18 is discussed. In this case, the server 10 cannot detect the entrance of the first user U1 to the stadium. Consequently, the first user U1 cannot use the electronic payment service by passing just face authentication. The server 10 can detect the presence of the first user U1 at the stadium when the first user U1 uses the electronic payment service inside the stadium with the use of the code C displayed on the user terminal 20. In this case, the first user U1 may be allowed to use the electronic payment service by passing face authentication inside the stadium.

Similarly, when the first user U1 uses the electronic payment service at any restaurant in the example of FIG. 19 with the use of the code C displayed on the user terminal 20, the server 10 can detect that the first user U1 is at the restaurant. In this case, the first user U1 may be allowed to use the electronic payment service by passing face authentication at each of the restaurants hosting the event.

The authentication system S of Modification Example 1-4 further includes the third authentication module 110 capable of executing third authentication for the first user U1 when the first user U1 is present at or arrives at the first place P1. The third authentication is code authentication using the code C of the user terminal 20. Accordingly, the code authentication in the description can be read as the third authentication. The third authentication is authentication different from the first authentication and the second authentication. For example, the third authentication may be any type of authentication, but it is assumed that the third authentication is authentication in which the first user U1 and the second user U2 can be distinguished from each other, and is not a type of authentication in which distinction between the first user U1 and the second user U2 is not always possible as in face authentication. When the first authentication is face authentication and the second authentication is passcode authentication, the third authentication may be authentication different from those, for example, fingerprint authentication, iris authentication, password authentication, or countersign authentication.

The processing execution module 105 of Modification Example 1-4 executes the payment processing based on code authentication. The processing execution module 105 executes the payment processing when code authentication is a success. When code authentication is a failure, the processing execution module 105 does not execute the payment processing. The first authentication module 102 can execute face authentication after the payment processing based on code authentication is executed. The second-user determination module 104 determines, after the payment processing based on code authentication is executed, whether the second user U2 is present at, or whether the second user U2 has arrived at, the first place P1.

The processing execution module 105 executes the payment processing based on face authentication after the payment processing based on code authentication is executed. As illustrated in FIG. 18, when the presence of the first user U1 at the stadium is detected through the payment processing based on code authentication, the processing execution module 105 executes the payment processing based on face authentication. In a case in which check-in of the second user U2 is detected or the second user U2 executes the payment processing based on code authentication inside the stadium, the payment processing is not executed by passing just face authentication, and passcode authentication is additionally demanded. Similarly, in a case in which the arrival of the second user U2 at the event is detected in the example of FIG. 19, the payment processing is not executed by passing just face authentication, and passcode authentication is additionally demanded.

According to Modification Example 1-4, whether the second user U2 is present at, or whether the second user U2 has arrived at, the first place P1 is determined after the payment processing based on code authentication is executed, and the payment processing is executed based on face authentication after the payment processing based on code authentication is executed. In this manner, at which first place P1 the first user U1 is present or has arrived is reliably detected by the payment processing based on code authentication, to thereby execute foolproof identity confirmation and consequently enhance security.

Modification Example 1-5

For example, the user terminal 20 may obtain first-position information about a first position of the first user U1. The first position is the current position of the first user U1. Any method is usable to obtain the first-position information. Examples of the usable method include a method using the GPS reception unit 28 or another GNSS, a method using access points of a wireless LAN, and a method using communication base stations. The first-position information may have any format, as is the case for the first-place information. The first-position information may be, for example, longitude-latitude information, address information, or coordinate information.

Figure 20:
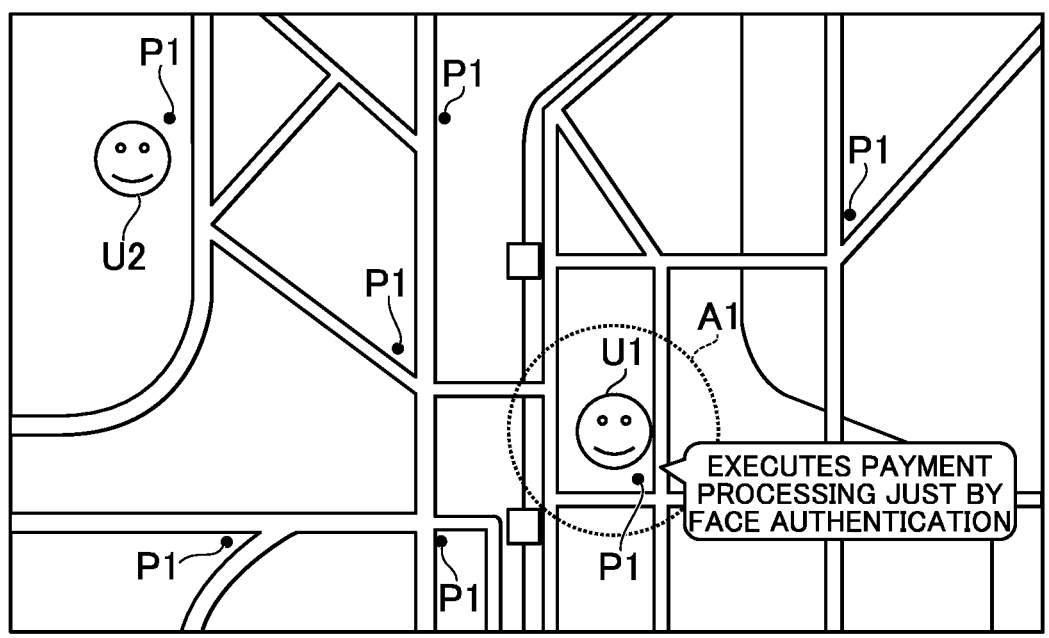
FIG. 20 is a diagram for illustrating an example of an authentication system of Modification Example 1-5.

FIG. 20 is a diagram for illustrating an example of the authentication system S of Modification Example 1-5. As illustrated in FIG. 20, a range within a fixed distance from the first position of the first user U1 is denoted by a reference symbol A1. In Modification Example 1-5, payment processing can be used by passing just face authentication at one first place P1 that is within the range A1 out of more than one first place P1. The server 10 can detect the presence of the first user U1 at this first place P1 by obtaining the first-position information. That is, the server 10 can detect that the first user U1 is not present at another first place P1.

When the first-position information of the user terminal 20 cannot be obtained for some reason, code authentication is required in order to execute the payment processing. For example, the first authentication module 102 may be designed so that face authentication can be executed when the first position indicated by the first-position information about the first position of the first user U1 is at or near the first place P1. That is, a place at which the payment processing can be executed just by face authentication is the first place P1 at the first position or the first place P1 near the first position.

"The first position is the first place P1" means that the first position is included in an area of the first place P1. In the example of FIG. 20, the fact that the premise of a shop located at the first place P1 includes the first position is equivalent to the first position being the first place P1. "The first position is near the first place P1" means that a distance between the first position and the position of the first place is less than a threshold value. In the example of FIG. 20, the first position being near the first place P1 is equal to a shop at the first place P1 being included in the range A1.

When the first position indicated by the first-position information is at or near the first place P1, the second-user determination module 104 determines whether the second user U2 is present at, or whether the second user U2 has arrived at, the first place P1. This determination may be made by code authentication, or based on second-position information, which is obtained for the second user U2 with the use of the user terminal 20 of the second user U2, as in Modification Example 1-7 described later.

The processing execution module 105 executes the payment processing based on face authentication when the first position indicated by the first-position information is at or near the first place P1. At another first place P1, the payment processing is not executed just by face authentication. With the payment processing by face authentication prohibited at another first place P1, an attempt at the payment processing by face authentication at another first place P1 by the second user U2 or a person resembling the first user U1 in facial features thus fails. The payment processing by face authentication succeeds only at the first position indicated by the first-position information, or at the first place P1 near the first position.

According to Modification Example 1-5, the payment processing is executed based on face authentication when the first position indicated by the first-position information is at or near the first place P1. This enables the authentication system S to limit a place at which execution of the payment processing by face authentication is allowed to the first place P1 at which the first user U1 is reliably present, and thus prevents impersonation at another first place P1, with the result that security is enhanced. In addition, convenience is raised for the first user U1 because the payment processing is executable by face authentication at the first place P1 at which the first user U1 is present.

Modification Example 1-6

For example, the processing execution module 105 may execute payment processing for the second user U2 when the second user U2 is present at or arrives at the first place P1. The payment processing is an example of the second processing. Accordingly, the payment processing in the description can be read as the second processing. The second processing can be any type of processing. For example, the second processing may be the unlocking processing or the check-in described in the first embodiment.

The second-user determination module 104 may determine whether the second user U2 is present at, or whether the second user U2 has arrived at, the first place P1 by determining whether the payment processing has been executed. For example, the server 10 can detect the presence of the second user U2 at the stadium in the example of FIG. 18 even when the second user U2 uses a paper ticket to enter the stadium, in a case in which the second user U2 executes the payment processing by code authentication inside the stadium.

In the case of the example of FIG. 19, when the second user U2 executes the payment processing by code authentication at one first place P1 out of more than one first place P1, the server 10 can detect that the second user U2 is present at this first place P1. The payment processing may be executed by any other method than code authentication. For example, the payment processing may be executed with the use of the IC chip 27 of the user terminal 20 or an IC card owned by the second user U2.

According to Modification Example 1-6, whether the second user U2 is present at, or whether the second user U2 has arrived at, the first place P1 is determined by determining whether the payment processing has been executed by the second user U2. In this manner, the presence or arrival of the second user U2 at the first place P1 is reliably detected, to thereby execute foolproof identity confirmation of the first user U1 and consequently enhance security.

Modification Example 1-7

For example, the second-user determination module 104 may determine whether the second user U2 is present at, or whether the second user U2 has arrived at, the first place P1 by determining whether a second position indicated by second-position information about the second position of the second user U2 is at the first place P1, or whether the second position is near the first place P1. The second-position information may be obtained by any method, as is the case for the first-position information. The second position is the current position of the second user U2. As illustrated in FIG. 20, when position information of the second user U2 can be obtained with the use of the user terminal 20, whether the second user U2 is at the first place P1, or whether the second user U2 is near the first place P1, can be determined. A situation in which distinction from the second user U2 is impossible is thus preventable.

According to Modification Example 1-7, whether the second user U2 is present at, or whether the second user U2 has arrived at, the first place P1 is determined by determining whether the second position indicated by the second-position information about the second position of the second user U2 is at the first place P1, or whether the second position is near the first place P1. In this manner, the presence or arrival of the second user U2 at the first place P1 is reliably detected, to thereby execute foolproof identity confirmation of the first user U1 and consequently enhance security.

Modification Example 1-8

For example, the authentication system S may further include the prediction module 106 for predicting a predicted period in which the second user U2 is not expected to be present at or arrive at the first place P1, based on at least one type of information out of the second-time information about the second time at which the second user U2 has been present at or has arrived at the second place P2 and the second-place information about the second place P2. The prediction module 106 is the same as in the second embodiment. The processing execution module 105 executes payment processing based on the first authentication executed in the predicted period. For example, when the second user U2 checks in at one first place P1 or executes the payment processing at one first place P1 in the example of FIG. 19, a predicted period is set to each first place P1. Within this predicted period, the first user U1 can execute the payment processing just by face authentication.

According to Modification Example 1-8, the payment processing is executed based on face authentication executed in the predicted period in which the second user U2 is not expected to arrive at the first place P1, based on at least one type of information out of the second-time information about the second time at which the second user U2 has been present at or has arrived at the second place P2 and the second-place information about the second place P2. This prevents a situation in which distinction between the first user U1 and the second user U2 is impossible, to thereby execute foolproof identity confirmation and consequently enhance security. For example, execution of the payment processing by the second user U2 impersonating the first user U1 can be prevented. The first user U1 can execute the payment processing just by face authentication within the predicted period, and hence convenience for the first user U1 is raised. In addition, with execution of passcode authentication unrequired, processing load on the authentication system S can be lightened in this case.

4-2. Modification Examples of Second Embodiment

Figure 21:
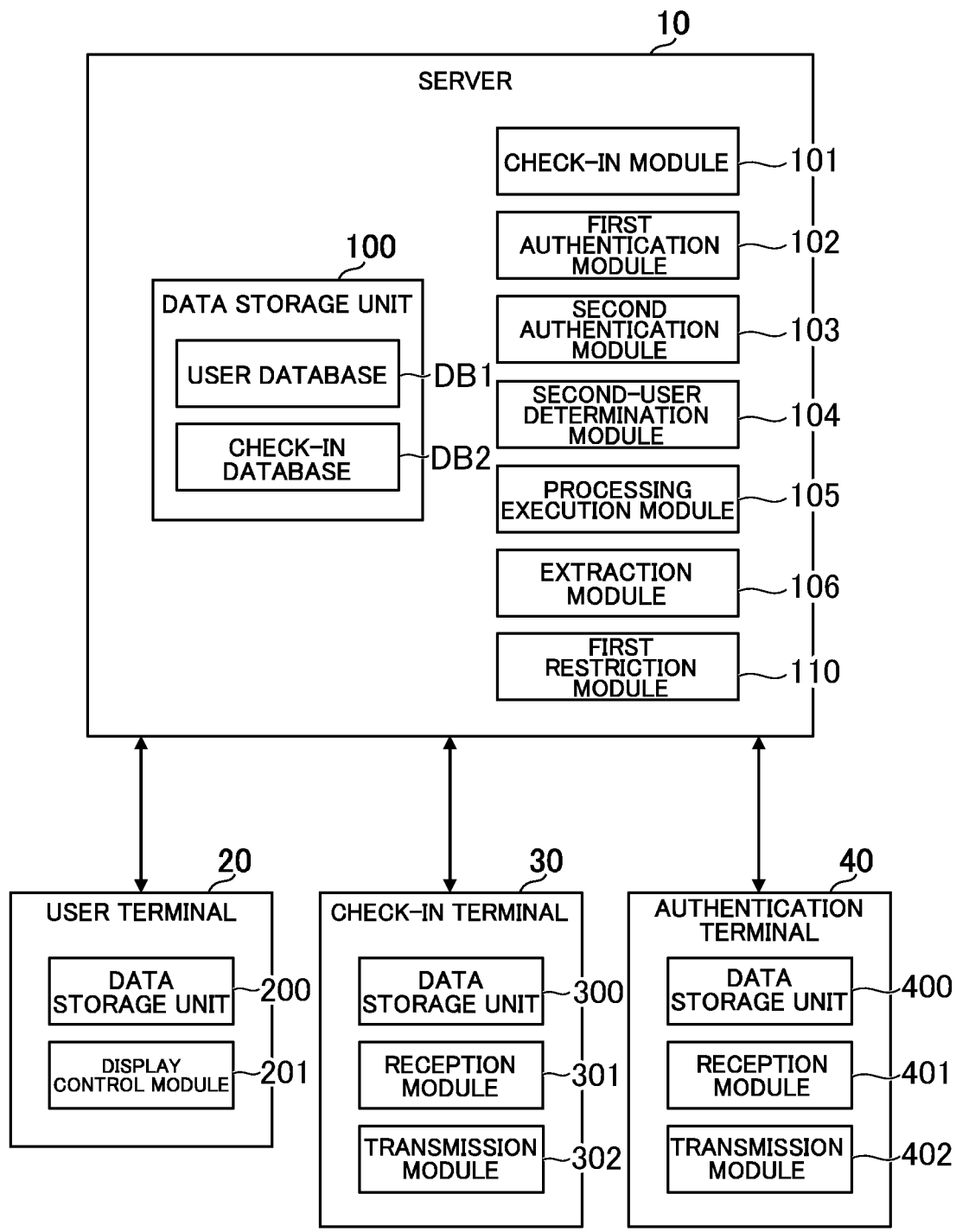
FIG. 21 is an example of a function block diagram in modification examples of the second embodiment.

Modification examples of the second embodiment are described. FIG. 21 is an example of a function block diagram in the modification examples of the second embodiment. As illustrated in FIG. 21, in the modification examples of the second embodiment, the second-user determination module 104 is implemented in addition to the functions described in the second embodiment with reference to FIG. 10. Description of the second-user determination module 104 focuses on differences from the description given in the first embodiment.

Modification Example 2-1

FIG. 22 is a diagram for illustrating an example of the authentication system S of Modification Example 2-1. As illustrated in FIG. 22, when the authentication system S is applied to an electronic payment service, payment processing using payment information of the first user U1 corresponds to the first processing described in the second embodiment. At first, the payment processing in Modification Example 2-1 is executed when face authentication and passcode authentication both succeed, as is the case for check-in in the second embodiment.

For example, as illustrated in FIG. 22, in a case in which the payment processing is executed by face authentication and passcode authentication for the second user U2 at 11:30 at the second place P2, the second user U2 is expected to be unable to finish a move to the first place P1 until 12:30, which is 1 hour after 11:30. The first user U1 can accordingly execute the payment processing just by face authentication at the first place P1 as long as the execution of the payment processing takes place before 12:30.

For example, in a case in which the first user U1 executes the payment processing just by face authentication at the first place P1 at 12:00, the first user U1 is expected to be unable to finish a move to the second place P2 until 13:00, which is 1 hour after 12:00. The second user U2 staying at the second place P2 can accordingly execute the payment processing just by face authentication at the second place P2, as long as the execution of the payment processing takes place before 13:00.

According to Modification Example 2-1, security is enhanced for a case in which payment processing is executed with the use of face authentication. For example, the first user U1 can execute the payment processing just by face authentication at the first place P1 within the predicted period in which the second user U2 is not expected to arrive at the first place P1, and convenience is accordingly raised for the first user U1. After the predicted period elapses, the second user U2 may arrive at the first place P1, and passcode authentication is therefore additionally demanded, to thereby enhance security.

Modification Example 2-2

FIG. 23 is a diagram for illustrating an example of the authentication system S of Modification Example 2-2. As illustrated in FIG. 23, there may be more than one second user U2 who resembles the first user U1 in facial features. When this is the case, the prediction module 106 may predict a predicted period based on at least one type of information out of the second-time information associated with each of the more than one second user U2 and the second-place information associated with each of the more than one second user U2. As in the second embodiment, a case of predicting the predicted period based on both of the second-time information and the second-place information is described. However, prediction of the predicted period may be based on one type of information out of the second-time information and the second-place information.

The example of FIG. 23 is a case in which one second user U2 and another second user U2, two in total, resemble the first user U1 in facial features. The one second user U2 is at one second place P2 and the another second user U2 is at another second place P2. An example in which the one second user U2 executes the payment processing by face authentication and passcode authentication at the one second place P2 at 11:30 is discussed. A move between this second place P2 and the first place P1 requires 1 hour. At this point, the location of the another second user U2 is unknown, and the first user U1 is accordingly not allowed to execute the payment processing just by face authentication.

At 11:35, for example, the another second user U2 executes the payment processing at the another second place P2. A move between this second place P2 and the first place P1 requires 30 minutes. In this case, a predicted period in which the one second user U2 is not expected to arrive at the first place P1 lasts until 12:30. A predicted period in which the another second user U2 is not expected to arrive at the first place P1 lasts until 12:05. The first user U1 in this case can execute the payment processing just by face authentication at the first place P1, as long as the execution of the payment processing takes place before 12:05, at which the earlier of the predicted periods ends.

As described above, when there is more than one second user U2, the prediction module 106 predicts a predicted period for each second user U2. The processing execution module 105 executes the payment processing based on face authentication executed in the predicted period that is the earliest of predicted periods each of which is associated with one second user U2 out of the more than one second user U2. That is, the processing execution module 105 allows the first user U1 to execute the payment processing just by face authentication at the first place P1 within the predicted period that ends earliest out of the predicted periods each associated with one second user U2 out of the more than one second user U2.

According to Modification Example 2-2, a predicted period is predicted based on at least one type of information out of the second-time information associated with each of the more than one second user U2 and the second-place information associated with each of the more than one second user U2. This prevents a situation in which distinction between the first user U1 and the second user U2 is impossible even when more than one second user U2 resembles the first user U1 in facial features, to thereby execute foolproof identity confirmation and consequently enhance security. The first user U1 can execute the payment processing just by face authentication within the predicted period, and hence convenience for the first user U1 is raised. In addition, with execution of passcode authentication unrequired, processing load on the authentication system S can be lightened in this case.

Modification Example 2-3

For example, payment processing may be executed based on face authentication executed in a predicted period, after the first user U1 is checked in at the first place P1. That is, the first place P1 may be a place at which the first user U1 has checked in. An example in which the stadium of FIG. 18 described in Modification Example 1-1 is located at the first place P1 of FIG. 22 or FIG. 23 is discussed. In this case, the check-in module 101 checks the first user U1 in, in the same manner as in Modification Example 1-1.

The first authentication module 102 may be designed so that face authentication is executable in a case in which the first user U1 has checked in at the first place P1 and is present at the first place P1. The processing execution module 105 executes the payment processing in the case in which the first user U1 has checked in at the first place P1 and is present at the first place P1. In this case also, a predicted time is predicted when the second user U2 checks in or executes the payment processing at the second place P2 different from the first place P1 at which the stadium is located.

The processing execution module 105 executes the payment processing based on face authentication executed in the predicted period after the checking in at the first place P1. As in FIG. 18 described in Modification Example 1-1, when the second user U2 checks in to the stadium at the first place P1, the first user U1 is no longer allowed to execute the payment processing just by face authentication, now that the first user U1 and the second user U2 are at the same place.

According to Modification Example 2-3, the payment processing is executed in the case in which the first user U1 has checked in at the first place P1 and is present at the first place P1. The first place P1 at which the first user U1 is present can thus reliably be identified from the check-in executed by the first user U1. This prevents a situation in which the payment processing by face authentication is erroneously permitted at a place that has not been visited by the first user U1, and someone having similar facial features visits this place and executes the payment processing in the predicted period, to thereby execute foolproof identity confirmation and consequently enhance security.

Modification Example 2-4

For example, payment processing may be executed based on face authentication executed in a predicted period, after the first user U1 executes payment processing by passcode authentication at the first place P1. That is, the authentication system S may be designed so that payment processing is executed based on face authentication executed in a predicted period, under a state in which the presence of the first user U1 at the first place P1 is known with certainty from successful passcode authentication of the first user U1.

For example, the second authentication module 103 is designed so that passcode authentication is executable when the first user U1 is present at or arrives at the first place P1. This passcode authentication is authentication in which a user ID and a passcode are input. The second authentication may be, as described above, authentication other than passcode authentication. For example, the second authentication may be code authentication that uses the code C displayed on the user terminal 20.

The processing execution module 105 executes payment processing based on the passcode authentication. The first authentication module 102 can execute face authentication after the payment processing based on the passcode authentication is executed. The prediction module 106 predicts a predicted period after the payment processing based on the passcode authentication is executed. The processing execution module 105 executes payment processing based on face authentication executed in the predicted period, after the payment processing based on the passcode authentication is executed.

According to Modification Example 2-4, the payment processing is executed based on the face authentication executed in the predicted period, after the payment processing based on the passcode authentication is executed. The first place P1 at which the first user U1 is present can thus be reliably identified from the payment processing executed based on passcode authentication by the first user U1. This prevents a situation in which the payment processing by face authentication is erroneously permitted at a place that has not been visited by the first user U1, and someone having similar facial features visits this place and executes the payment processing in the predicted period, to thereby execute foolproof identity confirmation and consequently enhance security.

Modification Example 2-5

For example, the user terminal 20 may obtain the first-position information about the first position of the first user U1 as in Modification Example 1-5. The first authentication module 102 may be designed so that face authentication is executable when the first position indicated by the first-position information about the first position of the first user U1 is at the first place P1 or near the first place P1. For example, as described in Modification Example 1-5 with reference to FIG. 20, the authentication system S may be designed so that payment processing by face authentication executed in a predicted period is permitted only at the first place P1 that is within the range A1 including the first position of the first user U1.

The prediction module 106 predicts a predicted period when the first position indicated by the first-position information is at the first place P1, or near the first place P1. That is, even when the first user U1 can visit more than one first place P1, the prediction module 106 predicts a predicted period only about the first place P1 that is within the range A1. When the position indicated by the first-position information is at the first place P1 or near the first place P1, the processing execution module 105 executes payment processing based on face authentication executed in the predicted period. Even in the case in which there is another first point P1, a predicted period is not predicted about the another first place P1 and, accordingly, the payment processing cannot be executed just by face authentication at the another first place P1.

According to Modification Example 2-5, the payment processing is executed based on the first authentication executed in the predicted period when the position indicated by the first-position information is at or near the first place P1. This enables the authentication system S to limit a place at which execution of the payment processing by face authentication is allowed to the first place P1 at which the first user U1 is reliably present, and thus prevents impersonation at another first place P1, with the result that security is enhanced. In addition, convenience is raised for the first user U1 because the payment processing is executable by face authentication at the first place P1 at which the first user U1 is present. In addition, the predicted period is predicted only about the first place P1 at which the first user U1 is present, and calculation of an extra predicted period is accordingly unrequired, with the result that processing load on the authentication system S can be lightened.

Modification Example 2-6

For example, the processing execution module 105 may execute check-in for the second user U2 when the second user U2 is present at or arrives at the second place P2. This check-in is checking in at the second place P2. In Modification Example 2-6, check-in corresponds to the second processing. The second processing may be any type of processing other than check-in. The second processing can be any processing through which the presence of the second user U2 is somehow detectable, and may be payment processing.

For example, although a case in which a predicted period is predicted when the second user U2 executes payment processing at the second place P2 is described in the example of FIG. 22 or FIG. 23, the presence of the second user U2 at the second place P2 is detectable also from execution of check-in, instead of payment processing, at the first place P2. The prediction module 106 may therefore predict a predicted period when check-in is executed for the second user.

According to Modification Example 2-6, check-in of the second user U2 is executed when the second user U2 is present at or arrives at the second place P2, and a predicted period is predicted when the check-in is executed. In this manner, the presence or arrival of the second user U2 at the second place P2 is reliably detected, to thereby execute foolproof identity confirmation of the first user U1 and consequently enhance security.

Modification Example 2-7

For example, the second time may be a time at which the second-position information about the second position of the second user U2 has been obtained. In Modification Example 2-7, the second place P2 is equivalent to the second position. For example, the user terminal 20 of the second user U2 obtains the second-time information in a case in which the second-position information is obtained. The second-time information may be obtained with the use of the GPS reception unit 28, or with the use of a real-time clock or the like. Modification Example 2-7 differs from the second embodiment only in that the second-position information indicates the position of the user terminal 20 of the second user U2, instead of a place at which the check-in terminal 30 or the authentication terminal 40 of the second place P2 is placed. The flow of processing steps using the second-position information and the second-time information is the same as in the second embodiment.

According to Modification Example 2-7, the second time is a time at which the second-position information about the second position of the second user U2 has been obtained by a second-position obtaining module for obtaining the second-position information, and the second place P2 is the second position. In this manner, the presence or arrival of the second user U2 at the second place P2 is reliably detected, to thereby execute foolproof identity confirmation of the first user U1 and consequently enhance security.

Modification Example 2-8

For example, the authentication system S may further include the second-user determination module 104 for determining whether the second user U2 is present at, or whether the second user U2 has arrived at, the first place P1. The second-user determination module 104 is as described in the first embodiment, and, for example, detects the presence or arrival of the second user U2 at the first place P1 from check-in executed by the second user U2. To give another example, the second user U2 may be determined to be present at or have arrived at the first place P1 when the second user U2 executes payment processing by face authentication and passcode authentication at the first place P1.

When it is determined that the second user U2 is not present at or has not arrived at the first place P1, the processing execution module 105 executes payment processing based on face authentication executed in a predicted period. For example, when it is determined that the second user U2 is present at or has arrived at the first place P1, the processing execution module 105 executes payment processing based not only on face authentication executed in a predicted period, but also on passcode authentication. In this case, execution of face authentication may be omitted as in Modification Example 1-2.

According to Modification Example 2-8, payment processing is executed based on face authentication executed in a predicted period, when it is determined that the second user U2 is not present at or has not arrived at the first place P1. In a case in which the second user U2 is present at or has not arrived at the first place P1 and the current time is within the predicted period, the absence of the second user U2 at the first place P1 is more certain. Payment processing is accordingly executed based on face authentication in this case, to thereby execute foolproof identity confirmation and consequently enhance security.

4-3. Modification Examples of Third Embodiment

Figure 24:
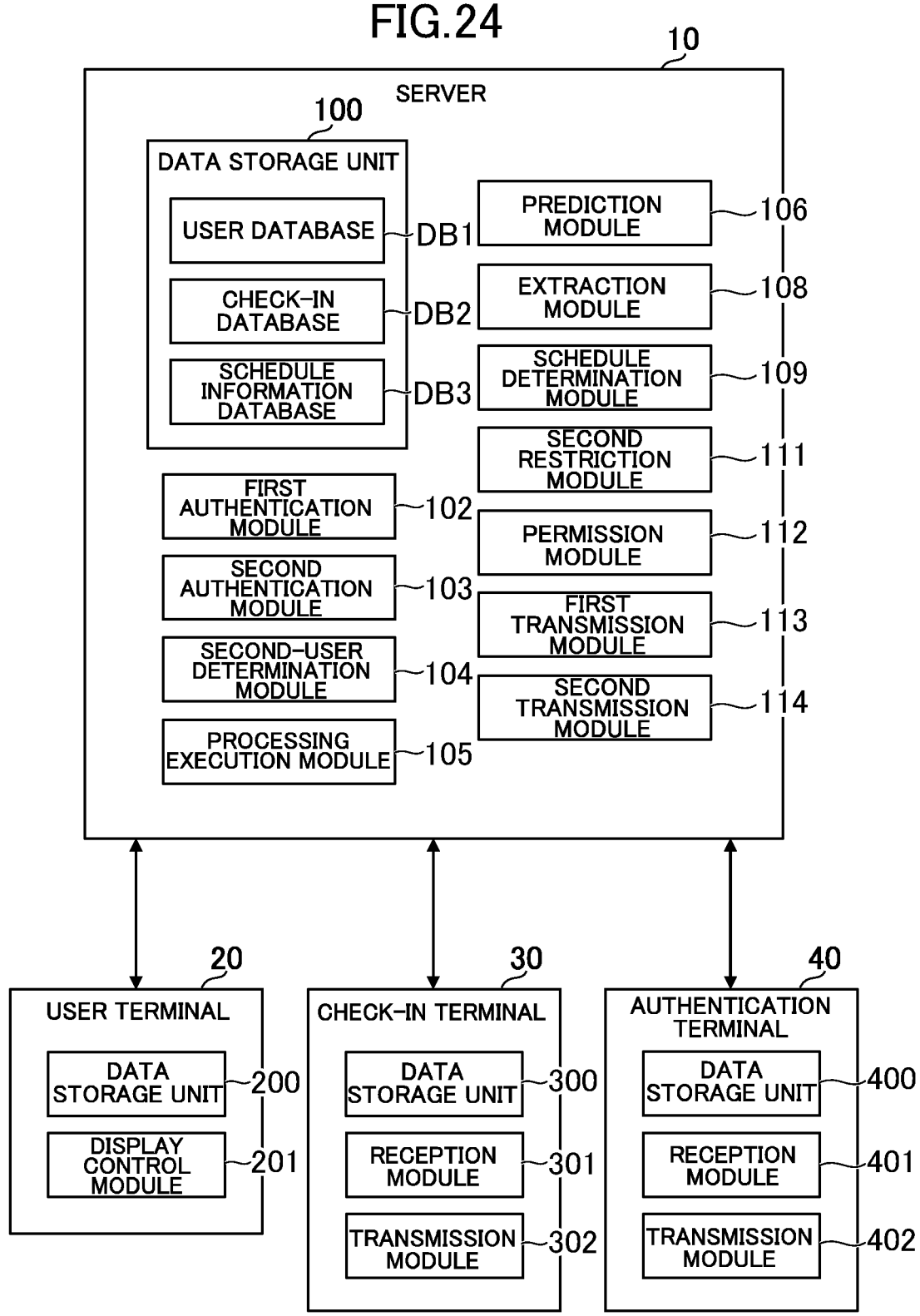
FIG. 24 is an example of a function block diagram in modification examples of the third embodiment.

Modification examples of the third embodiment are described. FIG. 24 is an example of a function block diagram in the modification examples of the third embodiment. As illustrated in FIG. 24, the second-user determination module 104, the prediction module 106, a second restriction module 111, a permission module 112, a first transmission module 113, and a second transmission module 114 are implemented in the modification examples of the third embodiment, in addition to the functions described in the third embodiment with reference to FIG. 14. Those functions are each implemented mainly by the control unit 11.

Modification Example 3-1

For example, the processing execution module 105 may execute check-in based on passcode authentication, not on face authentication, when it is determined that the second user U2 is going to be present at or arrive at the first place P1 at the first scheduled date or the first scheduled date/time. In this case, execution of face authentication may be omitted, or execution of face authentication may be included without using a result of the execution of face authentication as a condition for determining whether to execute check-in.

There is a case in which one user U and another user U who do not resemble each other in facial features have the same passcode, and passcode authentication in this modification example therefore uses user IDs as well. That is, when it is determined that the second user U2 is present at or has arrived at the first place P1, the processing execution module 105 executes check-in based on, instead of face authentication, passcode authentication that uses a user ID and a passcode. This passcode authentication is as described in Modification Example 1-1. Again, as described in Modification Example 1-1, the combination of the first authentication and the second authentication may be any combination of a type of authentication and another type of authentication.

According to Modification Example 3-1, when it is determined that the second user U2 is going to be present at or arrive at the first place P1 at the first scheduled date or the first scheduled date/time, check-in is executed based not on face authentication but on passcode authentication. In this manner, even when the first user U1 and the second user U2 are each scheduled to be present at or arrive at the first place P1 around the same time, and thus invite a situation in which distinction between the first user U1 and the second user U2 is impossible, foolproof identity confirmation is executed owing to passcode authentication, and security is consequently enhanced.

Modification Example 3-2

Figure 25:
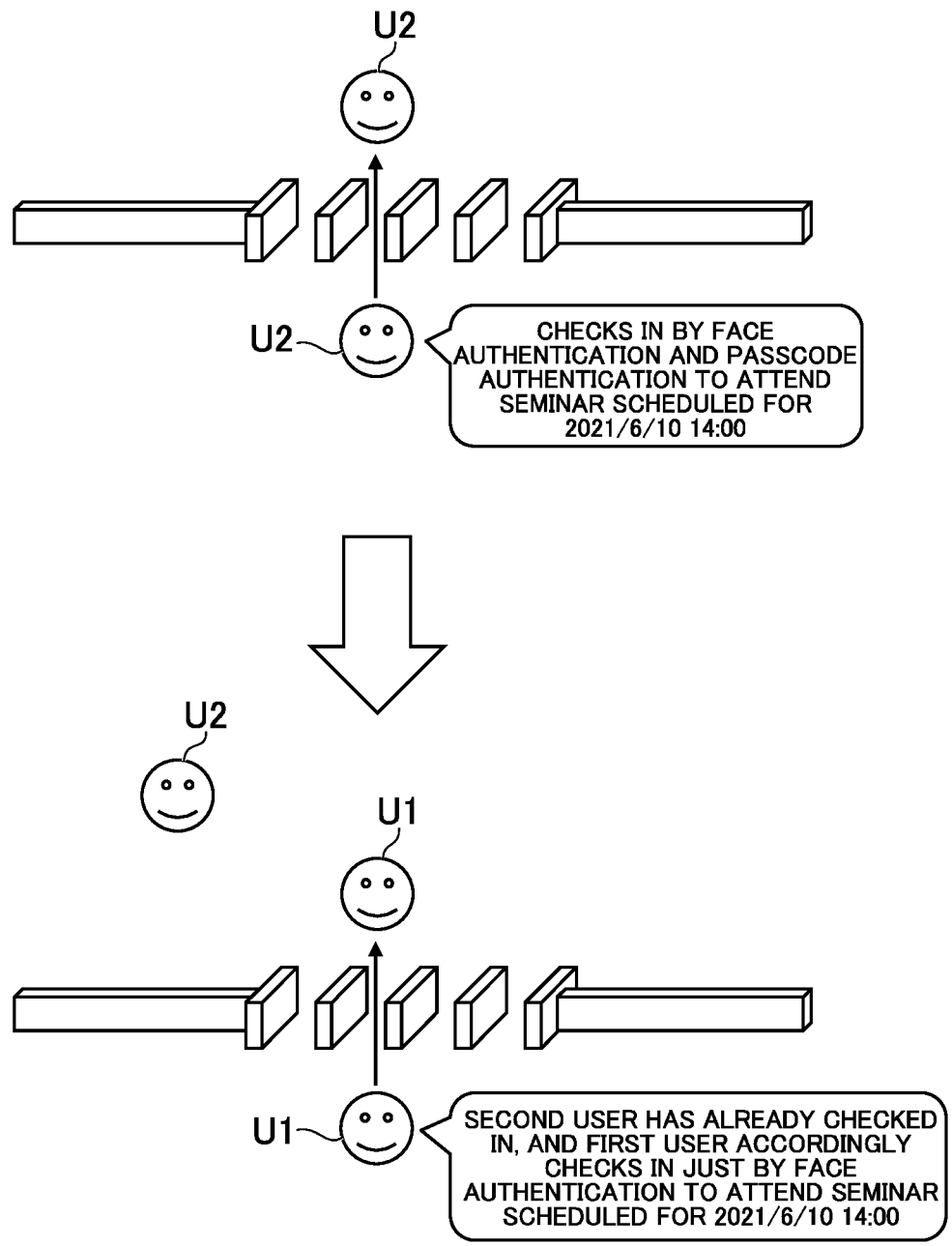
FIG. 25 is a diagram for illustrating an example of an authentication system of Modification Example 3-2.

FIG. 25 is a diagram for illustrating an example of the authentication system S of Modification Example 3-2. As illustrated in FIG. 25, the authentication system S may further include the second-user determination module 104 for determining, when it is determined that the second user U2 is going to be present at or arrive at the first place P1 at the first scheduled date or the first scheduled date/time, whether the second user U2 is present at, or whether the second user U2 has arrived at, the first place P1 prior to the presence or arrival of the first user U1 at the first place P1. Processing of the second-user determination module 104 is substantially the same as in the first embodiment, and whether the second user U2 has checked in is determined.

The example of FIG. 25 is a case in which the first user U1 and the second user U2 have each reserved a seat in a seminar to be held at 14:00 on Jun. 10, 2021. In this case, the first user U1 and the second user U2 visit the first place P1 around the same time, and face authentication and passcode authentication are accordingly demanded as a general rule. For example, it is assumed that the second user U2 visits first and executes face authentication and passcode authentication by following the same flow of steps as the flow of steps described in the third embodiment. The second-user determination module 104 determines that the second user U2 is present at or has arrived at the first place P1 when the second user U2 checks in. In this case, the fact that the second user U2 is already at the first place P1 is known, and the first user U1 may accordingly be allowed to check in at the first place P1 just by face authentication as illustrated in FIG. 25.

The processing execution module 105 executes check-in based on face authentication, not on passcode authentication, when it is determined that the second user U2 is present at or has arrived at the first place P1 prior to the presence or arrival of the first user U1 at the first place P1. In this case, execution of passcode authentication may be omitted, or execution of passcode authentication may be included without using a result of the execution of passcode authentication as a condition for determining whether to execute check-in.

In Modification Example 3-2, check-in is executed based on face authentication, not on passcode authentication, when it is determined that the second user U2 is present at or has arrived at the first place P1 prior to the presence or arrival of the first user U1 at the first place P1. Convenience is thus raised for the first user U1 who is allowed to check in at the first place P1 just by face authentication. In addition, processing load on the authentication system S can be lightened because the authentication system S does not execute passcode authentication of the first user U1.

Modification Example 3-3

FIG. 26 is a diagram for illustrating an example of the authentication system S of Modification Example 3-3. As illustrated in FIG. 26, the first user U1 operates the user terminal 20 to apply for a reservation for a seminar. A list of dates/times at which seminars are held is displayed on the user terminal 20. The user U can make a reservation for a seminar by selecting a seminar date of his or her choice. In this case, the authentication system S may further include the second restriction module 111 for imposing, based on the schedule information, a restriction on the specification of a second scheduled date or a second scheduled date/time at which the second user U2 is scheduled to be present at or arrive at the first place P1 as the first scheduled date or the first scheduled date/time.

An example in which the second user U2 has reserved a seat at a seminar to be held at 14:00 on Jun. 10, 2021 in the example of FIG. 26 is discussed. In this case, a reservation made by the first user U1 for a seminar to be held at this date/time results in a situation in which the first user U1 and the second user U2 cannot check in at the first place P1 by face authentication. The second restriction module 111 accordingly impose a restriction so that this date/time cannot be selected on the user terminal 20. This restriction may be imposed by stopping an input form for selecting this date/time from being displayed, invalidating the input form, stopping this date/time from being displayed, or other methods.

According to Modification Example 3-3, a restriction is imposed on the specification of the second scheduled date or the second scheduled date/time at which the second user U2 is scheduled to be present at or arrive at the first place P1 as the first scheduled date or the first scheduled date/time, based on the schedule information. This prevents a situation in which the first user U1 and the second user U2 attend the same seminar and cannot be distinguished from each other by face authentication alone, to thereby execute foolproof identity confirmation and consequently enhance security.

Modification Example 3-4

The authentication system S may further include the permission module 112 for permitting the specification of the second scheduled date or the second scheduled date/time as the first scheduled date or the first scheduled date/time when the first user U1 specifies a type of authentication other than face authentication. For example, when the first user U1 chooses to check in by an authentication method other than face authentication, such as passcode authentication or code authentication that uses the user terminal 20, the specification of a seminar to be held at the same date/time as the seminar date/time of the second user U2 may be permitted. For example, the first user U1 can specify, when making a reservation for a seminar on a screen of FIG. 26 or a similar screen, an authentication method to be used on the day of the seminar. The authentication method specified by the first user U1 is stored in the schedule information database DB3. On the day of the seminar, the first user U1 checks in by the authentication method specified by himself or herself. Various publicly known methods are usable for this authentication.

According to Modification Example 3-4, the specification of the second scheduled date or the second scheduled date/time as the first scheduled date or the first scheduled date/time is permitted when the first user U1 specifies another type of authentication different from the first authentication. This prevents a situation in which distinction between the first user U1 and the second user U2 is impossible, to thereby execute foolproof identity confirmation and consequently enhance security.

Modification Example 3-5

The authentication system S may further include the first transmission module 113 for transmitting, when the first user U1 specifies another type of authentication, a notification that prompts the first user U1 to avoid executing face authentication at the first place P1 to the first user U1. This notification can be transmitted by any method, for example, email, an SNS, an SMS, or a message app. A format of the notification is stored in the data storage unit 100. The notification is not transmitted when the first user U1 makes a reservation for a seminar to be held at a date/time different from the seminar date/time of the second user U2. The notification includes a message to the effect that face authentication is not to be executed at the first place P1. The first user U1 uses another authentication method, such as passcode authentication or code authentication.

According to Modification Example 3-5, the notification that prompts the first user U1 to avoid executing the first authentication at the first place P1 is transmitted to the first user U1 when the first user U1 specifies another type of authentication. This prevents a situation in which distinction between the first user U1 and the second user U2 is impossible, to thereby execute foolproof identity confirmation and consequently enhance security.

Modification Example 3-6

For example, the second user U2 may be scheduled to be present at or arrive at the first place P1 at the second scheduled date/time on the same day as the first scheduled date/time. That is, the first user U1 and the second user U2 are scheduled to arrive at the first place P1 on the same day but at slightly different times. For example, there is a gap of several minutes to half a day or so between a time at which the first user U1 is to arrive at the first place P1 and a time at which the second user U2 is to arrive at the first place P2.

In this case, the authentication system S may further include the second transmission module 114 for transmitting, to the first user U1, a notification that prompts the first user U1 to execute face authentication at the first place P1 at the first scheduled date/time, and to use another type of authentication in a case in which the first user U1 is present at or arrives at the first place P1 on the same day as the first scheduled date/time at a time different from the first scheduled date/time. As in Modification Example 3-5, this notification can be transmitted by any method. The notification is not transmitted when the first user U1 makes a reservation for a seminar to be held on a day different from the seminar date of the second user U2. The notification includes a message to the effect that face authentication is to be executed only at a time of arrival of the first user U1 at the first place P1, or only within a period that is a predetermined length of time counted from that time of arrival. The notification also includes a message to the effect that a type of authentication other than face authentication is to be executed in a case in which the first user U1 arrives at the first place P1 outside of that period. The first user U1 uses another authentication method, such as passcode authentication or code authentication.

According to Modification Example 3-6, the notification that prompts the first user U1 to execute face authentication at the first place P1 at the first scheduled date/time, and to use another type of authentication in a case in which the first user U1 is present at or arrives at the first place P1 on the same day as the first scheduled date/time at a time different from the first scheduled date/time is transmitted to the first user U1. This prevents a situation in which distinction between the first user U1 and the second user U2 is impossible, to thereby execute foolproof identity confirmation and consequently enhance security.

Modification Example 3-7

For example, the authentication system S may further include the prediction module 106 for predicting, when it is determined that the second user U2 is going to be present at or arrive at the first place P1 at the first scheduled date or the first scheduled date/time, a predicted period in which the second user U2 is not expected to be present or arrive at the first place P1, based on at least one type of information out of the second-time information about the second time at which the second user U2 has been present at or has arrived at the second place P2 and the second-place information about the second place P2. The prediction module 106 is as described in the second embodiment. For example, as described in the second embodiment, the prediction module 106 may obtain the distance between the first place P1 and the second place P2 based on the first-place information about the first place P1 and on the second-place information, and predict the predicted period based on the second-time information and on a travel time derived from the distance. As another example, the methods of predicting the predicted period described in the second embodiment are usable.

When it is determined that the second user U2 is going to be present at or arrive at the first place P1 at the first scheduled date or the first scheduled date/time, the processing execution module 105 executes check-in based on face authentication executed in the predicted period. A difference from the second embodiment is that a condition for determining whether to execute check-in is whether the second user U2 is going to be present at or arrive at the first place P1 at the first scheduled date or the first scheduled date/time. In other regards, the processing execution module 105 is as described in the second embodiment.

According to Modification Example 3-7, the first processing is executed based on face authentication executed in the predicted period when it is determined that the second user U2 is going to be present at or arrive at the first place P1 at the first scheduled date or the first scheduled date/time. This prevents a situation in which distinction between the first user U1 and the second user U2 is impossible, to thereby execute foolproof identity confirmation and consequently enhance security. For example, check-in of the second user U2 impersonating the first user U1 can be prevented. The first user U1 can check in just by face authentication as long as the checking in takes place within the predicted period, and hence convenience for the first user U1 is raised. In addition, with execution of passcode authentication unrequired, processing load on the authentication system S can be lightened in this case.

The authentication system S can also predict the predicted period with precision by obtaining the distance between the first place P1 and the second place P2 based on the first-place information about the first place P1 and the second-place information, and predicting the predicted period based on the second-time information and a travel time that is derived from the distance. Prediction of the accurate predicted period even more reliably prevents the situation in which distinction between the first user U1 and the second user U2 is impossible, to thereby execute foolproof identity confirmation and consequently enhance security.

Modification Example 3-8

The second-place information described in Modification Example 3-7 may be information about a position obtained with the use of another application different from an application for receiving a reservation pertaining to the first place P1. The application for receiving a reservation is an application for displaying the screen of FIG. 26. The another application is an application capable of obtaining, at the time of activation, position information with the use of the GPS reception unit 28, for example, an electronic payment application. Publicly known methods are usable for the method of obtaining position information at the time when the application is activated. It is assumed that a plurality of applications cooperate with one another and can exchange information with one another.

According to Modification Example 3-8, the second-place information is information about a position obtained with the use of another application different from the application for receiving a reservation pertaining to the first place P1. Accurate second-place information is thus obtained, and security is consequently enhanced.

4-4. Other Modification Examples

For example, the modification examples described above may be combined.

For example, authentication used as the second authentication may involve input of personal information such as a phone number or an email address. In this case, it is assumed that the personal information is stored in the user database DB1. The server 10 may identify, from the user database DB1, a part of personal information (for example, the last four digits of the phone number or a predetermined digit of the email address) in which the first user U1 and the second user U2 differ from each other, and execute authentication that demands input of the differing part. To give another example, the server 10 may automatically generate an ID for the second authentication in a case in which the first user U1 and the second user U2 check in at the same first place P1, and transmit the ID for the second authentication to the user terminal 20 of each of the first user U1 and the second user U2. This ID may be used as the second authentication. In this case, authentication may be executed by encoding the ID and reading the encoded ID with the authentication terminal 40 or other means, or the ID may be transmitted to the authentication terminal 40 or another device with the use of near field communication. For example, in the second embodiment, there may be a place to which the first user U1 and the second user U2 can each travel at a middle point between the first place P1 at which the first user U1 is present and the second place P2 at which the second user U2 is present. A predicted period may be set by taking into consideration the travel of the first user U1 to this place and the travel of the second user U2 to this place.

Although a case in which the user U holds the user terminal 20 above the check-in terminal 30 to execute check-in is described above, check-in may be executed by, for example, reading, with the check-in terminal 30, some ID recorded on the IP chip 27 instead of using an image. To give another example, check-in may be executed by only one terminal out of the user terminal 20 and the check-in terminal 30. For example, in a case in which a code posted at the first place P1 or displayed on some computer at the first place P1 is photographed with the photographing unit 26 of the user terminal 20, information by which this place is identifiable and a code ID stored on the user terminal 20 may be transmitted from the user terminal 20 to the server 10. The check-in terminal 30 is unrequired in this case.

For example, check-in may be executed when the current position detected by the GPS reception unit 28 of the user terminal 20 is near the first place P1. In this case, the check-in terminal 30 is unrequired. To give another example, check-in may be executed by the user by reading a physical card or a magnetic card with the check-in terminal 30. The user terminal 20 is unrequired in this case. In still another example, check-in may be executed by biometric authentication of the user U on the check-in terminal 30. The user terminal 20 is unrequired in this case as well.

For example, the authentication system S is applicable to any other service than the check-in service and the electronic payment service. In another example, a place at which check-in takes place may be a place for which an application for a reservation or the like is unrequired. This place may be, for example, a shopping mall, a supermarket, a convenience store, a day-spa facility, a game center, a department store, or a similar facility. The user U visits those facilities without specially making a reservation. The user U follows the same steps as the steps in the first embodiment, the second embodiment, the third embodiment, and the modification examples to execute check-in on the check-in terminal 30 placed at each of those facilities.

For example, the functions described as functions to be implemented on the server 10 may be divided among a plurality of computers. The data described as data to be stored in the server 10 may be stored in an external computer. It is sufficient to implement the functions on at least one computer.

The invention claimed is:

1. An authentication system, comprising:
   at least one memory configured to store program code;
   at least one processor configured to read the program code and operate as instructed by the program code, the program code comprising:
   checking code configured to cause the at least one processor to check a first user in at a first place;
   first authentication executing code configured to cause the at least one processor to execute a first authentication process for the first user based on determining that the first user has checked in at the first place and is present at the first place, wherein the first authentication process is biometric authentication using biometric information;
   second authentication executing code configured to cause the at least one processor to execute a second authentication process for the first user based on determining that the first user has checked in at the first place and is present at the first place, wherein the second authentication process is a different type of authentication process from the first authentication process;
   associating code configured to cause the at least one processor to associate second user identifying information with the first user based on determining a difference in the biometric information between the first user and a second user is less than a threshold value;
   referring code configured to cause the at least one processor to refer to the second user identifying information associated with the first user;
   second user determining code configured to cause the at least one processor to determine whether the second user, who is identified by the second user identifying information, has checked in at the first place based on determining that the first user has checked in at the first place and is present at the first place; and processing executing code configured to cause the at least one processor to execute first processing for the first user in accordance with the first authentication process based on determining that the second user has not checked in at the first place, and execute the first processing for the first user in accordance with the second authentication process based on determining that the second user has checked in at the first place.

2. The authentication system according to claim 1, wherein the processing executing code is further configured to cause the at least one processor to execute the first processing in accordance with the first authentication process based on determining the second user is determined to be present at or have arrived at the first place and is subsequently determined to be not present at or have not arrived at the first place.

3. The authentication system according to claim 1, wherein the processing executing code is further configured to cause the at least one processor to execute the first processing in accordance with the first authentication process and the second authentication process based on determining that the second user is present at or has arrived at the first place.

4. The authentication system according to claim 1, wherein the processing executing code is further configured to cause the at least one processor to execute the first processing in accordance with the second authentication process, instead of the first authentication process, based on determining that the second user is present at or has arrived at the first place.

5. The authentication system according to claim 1, wherein the second user determining code is further configured to cause the at least one processor to: determine whether the second user is scheduled to check in at the first place at a first scheduled date or a first scheduled date/time at which the first user is scheduled to check in at the first place based on schedule information about scheduled check-in at the first place, and wherein the checking code is further configured to cause the at least one processor to check the first user in at the first place in accordance with the first authentication process based on determining that the second user is not scheduled to check in at the first place at the first scheduled date or the first scheduled date/time.

6. The authentication system according to claim 1, wherein the program code further comprises third authentication executing code configured to cause the at least one processor to: execute a third authentication process for the first user based on determining the first user is present at or arrives at the first place, wherein the processing executing code is further configured to cause the at least one processor to execute the first processing in accordance with the third authentication process, wherein the first authentication executing code is further configured to cause the at least one processor to execute the first authentication process after the first processing is executed in accordance with the third authentication process, wherein the second user determining code is further configured to cause the at least one processor to determine, after the first processing is executed in accordance with the third authentication process, whether the second user is present at the first place, or whether the second user has arrived at the first place, and wherein the processing executing code is further configured to cause the at least one processor to execute, after the first processing is executed in accordance with the third authentication process, the first processing in accordance with the first authentication process.

7. The authentication system according to claim 1, wherein the first authentication executing code is further configured to cause the at least one processor to execute the first authentication process based on determining a first position indicated by first-position information about the first position of the first user is at the first place or near the first place, wherein the second user determining code is further configured to cause the at least one processor to determine whether the second user is present at the first place, or whether the second user has arrived at the first place based on determining the first position indicated by the first-position information is at the first place or near the first place, and wherein the processing executing code is further configured to cause the at least one processor to execute the first processing in accordance with the first authentication process based on determining the first position indicated by the first-position information is at the first place or near the first place.

8. The authentication system according to claim 1, wherein the checking code is further configured to cause the at least one processor to: check the second user in at the first place based on determining the second user is present at or arrives at the first place, and wherein the second user determining code is further configured to cause the at least one processor to determine whether the second user is present at the first place, or whether the second user has arrived at the first place by determining whether the second user has checked in at the first place.

9. The authentication system according to claim 1, wherein the processing executing code is further configured to cause the at least one processor to:

execute second processing for the second user based on determining the second user is present at or arrives at the first place, and wherein the second user determining code is further configured to cause the at least one processor to determine whether the second user is present at the first place, or whether the second user has arrived at the first place by determining whether the second processing has been executed.

10. The authentication system according to claim 1, wherein the second user determining code is further configured to cause the at least one processor to determine whether the second user is present at the first place, or whether the second user has arrived at the first place by determining whether a second position indicated by second-position information about the second position of the second user is at the first place, or whether the indicated second position is near the first place.

11. The authentication system according to claim 10, wherein the program code further comprises predicting code configured to cause the at least one processor to: predict a predicted period in which the second user is not expected to be present at or arrive at the first place, based on at least one type of information out of second-time information about a second time at which the second user has been present at or has arrived at a second place and second-place information about the second place, and wherein the processing executing code is further configured to cause the at least one processor to execute the first processing based on the first authentication process executed in the predicted period.

12. The authentication system according to claim 1, wherein the first processing is payment processing using payment information of the first user.

13. An authentication method, comprising:

checking a first user in at a first place;

executing a first authentication process for the first user based on determining the first user has checked in at the first place and is present at the first place, wherein the first authentication process is biometric authentication using biometric information;

executing a second authentication process for the first user based on determining that the first user has checked in at the first place and is present at the first place, wherein the second authentication process is a different type of authentication process from the first authentication process;

associating second user identifying information with the first user based on determining a difference in the biometric information between the first user and a second user is less than a threshold value;

referring to the second user identifying information associated with the first user;

determining whether the second user who is identified by a second user identifying information, has checked in at the first place based on determining that the first user has checked in at the first place and is present at the first place; and executing first processing for the first user in accordance with the first authentication process based on determining that the second user has not checked in at the first place, and execute the first processing for the first user in accordance with the second authentication process based on determining that the second user has checked in at the first place.

14. A non-transitory computer-readable medium having instructions stored therein, which when executed by a processor cause the processor to execute a method comprising:

checking a first user in at a first place;

executing a first authentication process for the first user based on determining the first user has checked in at the first place and is present at the first place, wherein the first authentication process is biometric authentication using biometric information;

executing a second authentication process for the first user based on determining that the first user has checked in at the first place and is present at the first place, wherein the second authentication process is a different type of authentication process from the first authentication process;

associating second user identifying information with the first user based on determining a difference in the biometric information between the first user and a second user is less than a threshold value;

referring to the second user identifying information associated with the first user;

determining whether the second user who is identified by the second user identifying information has checked in at the first place based on determining that the first user has checked in at the first place and is present at the first place; and executing, first processing for the first user in accordance with the first authentication process based on determining the second user has not checked in at the first place, and execute the first processing for the first user in accordance with the second authentication process based on determining that the second user has checked in at the first place.

15. An authentication system, comprising:

at least one memory configured to store program code at least one processor configured to read the program code and operate as instructed by the program code, the program code comprising:

associating code configured to cause the at least one processor to associate second user identifying information with a first user based on determining a difference in biometric information between the first user and a second user is less than a threshold value;

referring code configured to cause the at least one processor to refer to the second user identifying information associated with the first user;

schedule determining code configured to cause the at least one processor to determine whether the second user, who is identified by the second user identifying information, is scheduled to check in at a first place and has checked in at the first place at a first scheduled date or a first scheduled date/time at which the first user is scheduled to check in at the first place based on schedule information about scheduled check-in at the first place;

first authentication executing code configured to cause the at least one processor to execute a first authentication process based on determining that the first user is present at or arrives at the first place, wherein the first authentication process is biometric authentication that uses the biometric information;

checking code configured to cause the at least one processor to check the first user in at the first place based on the first authentication process based on determining that the second user is not scheduled to check in at the first place and has not checked in at the first place at the first scheduled date or the first scheduled date/time;

second user determining code configured to cause the at least one processor to determine whether the second user is present at the first place, or whether the second user has arrived at the first place based on determining that the first user is present at the first place at which the first user has checked in; and processing executing code configured to cause the at least one processor to execute, based on determining that the first user is present at the first place at which the first user has checked in and the second user is not present at or has not arrived at the first place, first processing for the first user based on the first authentication process.

16. An authentication system, comprising:

at least one memory configured to store program code at least one processor configured to read the program code and operate as instructed by the program code, the program code comprising:

first authentication executing code configured to cause the at least one processor to execute a first authentication process for a first user based on determining that the first user is present at or arrives at a first place, wherein the first authentication process is biometric authentication using biometric information;

associating code configured to cause the at least one processor to associate second user identifying information with the first user based on determining a difference in the biometric information between the first user and a second user is less than a threshold value;

referring code configured to cause the at least one processor to refer to the second user identifying information associated with the first user;

second user determining code configured to cause the at least one processor to determine whether the second user, who is identified by the second user identifying information, is present at the first place, or whether the second user has arrived at the first place by determining whether a second position indicated by second-position information about the second position of the second user is at the first place, or whether the indicated second position is near the first place;

predicting code configured to cause the at least one processor to predict a predicted period in which the second user is not expected to be present at or arrive at the first place, based on at least one type of information out of second-time information about a second time at which the second user has been present at or has arrived at a second place and second-place information about the second place; and processing executing code configured to cause the at least one processor to execute, based on determining that the second user is not present at or has not arrived at the first place, first processing for the first user based on the first authentication process executed in the predicted period.

\* \* \* \* \*